United States Patent [19]
Khouja et al.

[11] Patent Number: 5,682,320
[45] Date of Patent: Oct. 28, 1997

[54] METHOD FOR ELECTRONIC MEMORY MANAGEMENT DURING ESTIMATION OF AVERAGE POWER CONSUMPTION OF AN ELECTRONIC CIRCUIT

[75] Inventors: Adel Khouja, Saratoga; Shankar Krishnamoorthy, Sunnyvale; Frederic G. Mailhot, Palo Alto; Stephen F. Meier, Sunnyvale, all of Calif.

[73] Assignee: Synopsys, Inc., Mountain View, Calif.

[21] Appl. No.: 458,531

[22] Filed: Jun. 2, 1995

Related U.S. Application Data

[63] Continuation-in-part of Ser. No. 400,103, Mar. 7, 1995, abandoned, which is a continuation-in-part of Ser. No. 400,232, Mar. 3, 1995, abandoned, which is a continuation-in-part of Ser. No. 253,538, Jun. 3, 1994, abandoned.

[51] Int. Cl.$^6$ ...................................................... G06F 17/50
[52] U.S. Cl. ............................................ 364/489; 364/488
[58] Field of Search ........................................ 364/483, 488, 364/489, 490, 491, 578; 395/500

[56] References Cited

U.S. PATENT DOCUMENTS

| | | | |
|---|---|---|---|
| 4,698,760 | 10/1987 | Lembach et al. | 364/340 |
| 5,331,568 | 7/1994 | Pixley | 364/489 |
| 5,459,673 | 10/1995 | Carmen et al. | 364/489 |
| 5,469,367 | 11/1995 | Puri et al. | 364/489 |
| 5,481,469 | 1/1996 | Brasen et al. | 364/483 |
| 5,557,531 | 9/1996 | Rostoker et al. | 364/489 |
| 5,731,683 | 12/1994 | Fukazawa et al. | 364/489 |

FOREIGN PATENT DOCUMENTS

0582918A2  7/1993  European Pat. Off. .................. 15/60

OTHER PUBLICATIONS

R. Bryant et al., "CAD Applications of Binary Decision Diagrams", 1993, OBDD Tutorial.
Randal E. Bryant, "Final Thoughts", 1993, OBDD Tutorial.
Randal E. Bryant, "Symbolic Boolean Manipulation With Ordered Binary-Decision Diagrams", Sep. 1992, ACM Computing Surveys, vol. 24, No. 3.
A. Ghosh et al., "Estimation of Average Switching Activity in Combinational and Sequential Circuits", 1992, IEEE, 29th ACM/IEEE Design Automation Conference.
A. Shen et al., "On Average Power Dissipation and Random Pattern Testability of CMOS Combinational Logic Networks".
B. Krishnamurthy et al., "Improved Techniques for Estimating Signal Probabilities", 1986, IEEE, 1986 International Test Conference.
Mehmet A. Cirit, "Estimating Dynamic Power Consumption of CMOS Circuits" 1987, IEEE.
K. Roy et al., "Circuit Activity Based Logic Synthesis for Low Power Reliable Operations", Dec. 1993, IEEE, vol. 1, Issue 4.
A. Yang et al., "Estimating Power Dissipation in VLSI Circuits" Jul. 1993, IEEE.
M. Xakellis et al., "Statistical Estimation of the Switching Activity in Digital Circuits" 1994, 31st ACM/IEEE Design Automation Conference.
F. Najm et al., "Power Estimation in Sequential Circuits", Jun. 1995, 32nd Design Automation Conference.

(List continued on next page.)

*Primary Examiner*—Hassan Kizou
*Attorney, Agent, or Firm*—Wagner, Murabito & Hao

[57] ABSTRACT

This is a method of quickly computing the power dissipated by a digital circuit using information available at the gate library level. It estimates the short-circuit power by modeling the energy dissipated by the cell per input transition as a function of the transition time or edge rate, and multiplying that value by the number of transitions per second for that input.

25 Claims, 27 Drawing Sheets

OTHER PUBLICATIONS

Farid N. Najm, "A Survey of Power Estimation Techniques in VLSI Circuits" 1994, IEEE.

Shin–ichi Minato, "Implicit Manipulation of Polynomials Using Zero–Suppressed BDDs", 1995, IEEE.

D. Singh et al., "Power Conscious CAD Tools and Methodologies: A Perspective", May 14, 1994.

Synopsys, Inc. "Design Compiler Family Reference Manual" Mar. 1994, Version 3.1a.

G. Hachtel et al., "Probabilistic Analysis of Large Finite State Machines", 1994, 31st ACM/IEEE Design Automation Conference.

C. Tsui et al., "Exact and Approximate Methods for Calculating Signal and Transition Probabilities in FSMs" 1994, 31st ACM/IEEE Design Automation Conference.

J. Monteiro et al., "A Methodology for Efficient Estimation of Switching Activity in Sequential Logic", 1994, 31st ACM/IEEE Design Automation Conference.

F. Najm et al., "Probabilistic Simulation for Reliability Analysis of CMOS VLSI Circuits", Apr. 1990, IEEE vol. 9, No. 4.

Farid N. Najm, "Transition Density: A New Measure of Activity in Digital Circuits", Feb. 1993, IEEE vol. 12, No. 2.

R. Burch et al., "Pattern–Independent Current Estimation for Reliability Analysis of CMOS Circuits", 1988, 25th ACM/IEEE Design Automation Conference.

Farid N. Najm, "Transition Density, A Stochastic Measure of Activity in Digital Circuits", 1991, 28th ACM/IEEE Design Automation Conference.

S. Devadas et al., "Estimation of Power Dissipation in CMOS Combinational Circuits Using Boolean Function Manipulation", Mar. 1992, IEEE vol. 11, No. 3.

$$f(N_1) = I_1 \cdot I_2$$

Logical "AND"

BDD(N3) + BDD(I_9) = BDD(N4)

METHOD FOR ELECTRONIC MEMORY MANAGEMENT DURING ESTIMATION OF AVERAGE POWER CONSUMPTION OF AN ELECTRONIC CIRCUIT

RELATED APPLICATIONS

This application is a continuation-in-part of U.S. application Ser. No. 08/400,103 filed Mar. 7, 1995 (abandoned); which is a continuation-in-part of Ser. No. 08/400,232 filed Mar. 3, 1995 (abandoned); which is a continuation-in-part of Ser. No. 08/253,538, filed on Jun. 3, 1994 (abandoned).

FIELD OF INVENTION

This invention is related to the field of designing digital circuits. In particular, this invention is related to estimating the power that would be dissipated by a digital circuit.

DESCRIPTION OF THE RELATED ART

Power as a Factor in Digital Design

With the advent of portable applications such as notebook computers, cellular phones, palm-top computers etc., there is a growing emphasis in the hardware design community for Computer Aided Design (CAD) tools for low power IC design. Today, the predominant differentiator of portable applications in the marketplace is their "battery life" not their performance. Even designers of high performance ICs are expressing a need for such tools because clocks are running faster, chips are getting denser and packaging and thermal control are playing a dominant role in determining the cost of such ICs. The cost of upgrading from a plastic packaging, which typically can handle peak power dissipation of approximately 1 Watt, to a ceramic packaging, which has lower thermal resistivity, can be roughly a tenfold increase in cost.

Managing Power in a Typical Digital Design Flow

An important part of minimizing power dissipated by a system is reducing the power dissipated by the chips in the system. Because fabricating chips is expensive and time consuming, a chip designer often uses CAD tools to estimate the power dissipation of a particular design before actually fabricating the chip in silicon. From this power estimate the designer can modify the design before fabrication to reduce the power dissipation. However, the conventional method of estimating power at the design phase has its own problems. FIG. 1 is a flow diagram illustrating a conventional design used by a designer to reduce the power dissipated on a chip.

A general description of the process and techniques used to design and analyze digital designs can be found in the *Principles of CMOS VLSI Design* by Neil H. E. Weste and Kamran Eshraghian, published in 1992 by Addison-Wesley Publishing Company, ISBN 0-201-53376-6, which is hereby incorporated by reference. Another overview of the design process can be found in U.S. patent application Ser. No. 08/226,147 entitled "Hardware Description Language Source Debugger" by Gregory, et al, filed on Apr. 12, 1994 now abandoned, which is hereby incorporated by reference. Another overview of the design process can be found in co-pending U.S. application Ser. No. 08/253,470 entitled "Architecture and Methods for A Hardware Description Language Source Level Debugging System", filed on Jun. 3, 1994, which is hereby incorporated by reference. In FIG. 1, the general design flow begins with a semiconductor vendor constructing a library of cells, as shown in step 1000. These cells perform various combinational and sequential functions. The semiconductor vendor, with the help of CAD tools, characterizes the electrical behavior of those cells. For example, the vendor provides estimates of the delay through each cell and how much substrate area the cells will occupy. This establishes a library of components that a designer can use to build a complex chip.

Recently, semiconductor vendors have also started characterizing the power dissipation of the library cells as a single static value. However, the power dissipation of a cell is a complex function of the loading on the cell's output(s), toggle rates of the cell's inputs and outputs, and transition times of the cell's inputs. Without a model that allows them to capture the dependence of the cell's power on those three principal factors, semiconductor vendors have instead resorted to characterizing a single static value normally in units of Joules per KHz). Because this model ignores all of the key factors that influence power dissipation, its results are only utilized as very rough estimates. In step 1010, the designer specifies the functional details of the design. One method that the designer can use to describe the design is to write a synthesis source description in a Hardware Description Language (HDL). The designer could also describe the design with a schematic capture tool bypassing steps 1010 and 1020.

In step 1020, the CAD system creates a network of gates that implements the function specified by the designer in step 1010. This is commonly referred to as the synthesis step. Importantly, at this step, the CAD system has information about which cells are going to be used and how the cells will be connected to each other.

In step 1030, the CAD system determines where the cells identified in step 1020 will be placed on the chip substrate, and how the connections between the cells will be routed on the substrate. This is commonly referred to as the layout or "Place & Route" step. This step establishes the physical layout of the chip. Ordinarily, it requires a significant amount of computation time.

In step 1035, the CAD system extracts a transistor level netlist for the design from the layout.

In step 1040, the CAD system estimates the power used by the chip from the netlist extracted in step 1035. This is done by applying a representative set of input stimuli to a simulation model derived from the netlist. Constructing the input stimuli and simulating the stimuli requires a significant amount of computation time. This detailed simulation, however, can produce an accurate estimate of the power that the final chip will dissipate. The accuracy of the estimates depends on how representative the input stimuli set is compared to the actual operation of the design. Sometimes, the stimuli set is selected for purposes of functional testing of the design in which case the stimuli set will not be representative of the normal operation of the design.

In step 1050, the designer determines whether the power dissipated by the chip is sufficiently low to meet the designer's needs with respect to battery life and the package used. If not, the designer modifies the design in step 1060, and repeats steps 1020, 1030, and 1040. If the power dissipation is within bounds, and the design meets all other requirements, the chip is fabricated in step 1070.

Limitations of Existing Power Estimation Methods

The general design flow of FIG. 1 presents several obstacles to a designer seeking insight about the power dissipated by the design. Steps 1030, 1035, and 1040 are time consuming because they involve constructing layout information and simulating the design. A designer concerned about power dissipation may have to iterate through the loop indicated by steps 1020, 1030, 1035, 1040, and 1050 several times to obtain an acceptable result. This can substantially delay the development of a chip. Alternatively, because of the perceived development delay, the designer may be forced to proceed with a design that may not necessarily meet the specified power budget or that may dissipate power unnecessarily.

A power estimation method that doesn't rely on layout information and that doesn't require input stimuli to be simulated would allow designers to more easily understand and manage their power problems earlier in the design flow and in a more cost-effective manner. This is similar to problems in the timing of digital designs. Until recently, designers usually simulated their designs to understand if there were any timing problems in the design. In the last several years, however, static timing analysis has been adopted by many digital designers as a fast and accurate replacement for timing simulation. Static timing analysis predicts the timing problems in a design without performing any dynamic simulation of the design.

Several journal articles and conference papers have described methods of performing a similar static power analysis to estimate the dynamic power of combinational designs. These include the following which are hereby incorporated by reference:

1) Estimating Power Dissipation in VLSI Circuits by F. Najm, IEEE Circuits and Devices Magazine. Vol 10, Issue 4, pp. 11–19, July, 1994.

2) Estimation of Average Switching Activity in Combinational and Sequential Circuits, by A. Ghosh, S. Devadas, K. Keutzer, and J. White, 29th ACM/IEEE Design Automation Conference, pp. 253–259, June 1992.

3) Transition Density, a Stochastic measure of activity in digital circuits, by F. Najm, 28th ACM/IEEE Design Automation Conference, pp. 644–649, June 1991.

4) Efficient estimation of dynamic power consumption under a real delay model, by C.-Y. Tsui, M. Pedram, and A. M. Despain, IEEE International Conference on Computer-Aided Design, pp. 224–228, November, 1993.

5) On Average Power Dissipation and Random Pattern Testability of CMOS Combinational Logic Networks, by A. Shen, A. Ghosh, S. Devadas, and K. Keutzer, IEEE/ACM International Conference on Computer-Aided Designs, pp. 402–407, November, 1992.

6) Estimating Dynamic Power Consumption of CMOS Circuits, by M. A. Cirit, IEEE International Conference on Computer-Aided Design, pp. 534–537, November, 1987.

In addition, there are other articles and papers that describe power estimation techniques that are similar to one or more of the above papers. However, the approaches described in all of these papers and articles focus on purely combinational designs with a manageable number of cells, and they all use simplified models for power dissipation. Consequently the applicability of the above approaches is limited to small combinational designs that contain no sequential elements (flip-flops, latches, or memory components).

Estimation of Switching Activity in sequential circuits with applications to synthesis for low power, by J. Monteiro, S. Devadas, and B. Lin, in the 31st ACM/IEEE Design Automation Conference, pp. 12–17, 1994, describes extensions to the original combinational propagation methods to allow those techniques to operate on designs that contain sequential elements, and it is hereby incorporated by reference. However, this paper utilizes very simplified models of sequential elements allowing it to only operate on simple D-type flip-flops without any asynchronous inputs or clock-gating signals. Moreover, like the earlier combinational propagation techniques, they also used a simplified power model that ignores all but net switching power dissipation. Finally, the overall strategy that they described for processing designs requires significant computation time and can only work on relatively small designs. Limitations in the prior art point to a strong need for a power estimation method that can:

1) robustly deal with a range of design styles including designs that contain a combination of combinational and sequential cells, pipelined designs, state machine designs, hybrid designs that contain a mix of pipelined structures and state machines, complex clocking schemes, gated clocks, and latchbased designs.

2) process arbitrarily complex combinational logic 3) efficiently model all of the principal types of power dissipation.

Circuit Design Structure

The basic functional element of a digital design is a transistor. As digital design has progressed, the level of abstraction has been raised to the gate- or cell-level. A cell contains a collection of transistors connected into an electrical circuit that performs a combinational or sequential function. A typical cell might implement a NAND function or act as a D flip-flop. A design consists of an interconnected collection of cells. A cell's inputs and outputs are referred to as pins. Generally, the interconnections between cells are referred to as nets. The primary input and output interface ports of the design are the means by which external components can interact with the design. These ports will be referred to as the primary inputs and primary outputs of the design, respectively.

Sometimes a cell performs a more complicated function, such as an AND-OR combination. In some situations, some of the internal connections within such a cell need to be treated by the CAD tools as though those connections were nets, and were connecting different cells. For example, in an AND-OR cell, the connection between the AND component of the cell and the OR component of the cell may need to be treated as a net.

Types of Power Dissipation

There are three kinds of power dissipation in a digital CMOS circuit: leakage and net switching power and cell internal power. FIG. 2 shows a transistor level schematic of a CMOS inverter that will be used to illustrate the different types of power dissipation. For simplicity, input 1 can be in one of four states: held at a high voltage; held at a low voltage; transitioning from a high voltage to a low voltage; or transitioning from a low voltage to a high voltage. From a functional point of view, when input 1 is at a high voltage, transistor 2 is turned off, and transistor 6 is turned on pulling the voltage at output net 4 to the same potential as ground 7. When input 1 is at a low voltage, transistor 2 is turned on and transistor 6 is turned off pulling output net 4 to approximately the same potential as VDD 3.

For improved accuracy, a power estimation method must model all three components of power dissipation. Existing power estimation methods tend to completely ignore the cell internal and leakage power. However, as was pointed out by Harry J. M. Veendrick in Short-Circuit Dissipation of Static CMOS Circuitry and its impact on the Design of Buffer Circuits in the IEEE Journal of Solid-State Circuits, Vol.

SC-19, No. 4, pp. 468–473 (August, 1984), which is hereby incorporated by reference, in some cases cell internal power can be as great as the net switching power.

Leakage or Static Power Dissipation

In both of the cell's steady states (Logic-0 and Logic-1), a small leakage current flows from the gates source to its drain. This is referred to as subthreshold leakage, and it is due to the fact that the gate is not completely shut off causing some current to flow from VDD through the gate to GND. In addition, leakage current can flow through the reverse-biased junction between the diffusion and substrate layers. These leakage currents cause leakage power.

Leakage power is also referred to as static power because leakage power is dissipated with time regardless whether the circuit is active or not. That is a cell will always have a small amount of leakage current whether the cell's output is transitioning or stable. For some gates, the leakage current may be so minimal that it can be effectively ignored.

The total leakage power dissipated in a design is the sum of the leakage power for all cells in the design.

Dynamic Power Dissipation

In contrast to static power, dynamic power is only dissipated when the circuit is active. That is a cell only consumes dynamic power if the cell's outputs (or internal nodes) are transitioning from one voltage level to another. For example, in FIG. 2, the cell will dissipate dynamic power when input 1 is making a transition.

The two principal types of dynamic power are net switching power (or simply switching power) and cell internal power (or simply internal power). The total switching power dissipated in a design is the sum of the switching power for all nets in the design. The total internal power dissipated in a design is the sum of the internal power for all cells in the design.

Net Switching Power Dissipation

In FIG. 2, output net 4 behaves electrically as though there were a capacitor connecting it to ground. This capacitive effect is modeled with capacitor 5. Net switching power results from the current that flows to charge or discharge capacitor 5. For example, during the period where the input 1 transitions from a high voltage to a low voltage, transistor 2 acts as a resistor. Transistor 2 and capacitor 5 act as an RC circuit that eventually puts a high voltage at output net 4. The amount of energy dissipated during a single transition is given by $\frac{1}{2}CV^2$ where C represents the capacitance of capacitor 5 and V is the voltage at VDD 3. The capacitance, C, is determined primarily by the wiring connections between cells and the input capacitance of loads on the net. C is therefore a function of what the cell is connected to, and can be estimated from libraries and the gate level design at step 1020. This would use the wire load model in the library. Alternatively, C can be obtained using back annotation from extracted layout data. A reasonable estimate of the switching power dissipated is therefore the number of transitions per second times the energy dissipated per transition.

Cell Internal Power Dissipation

During a transition, both transistor 1 and transistor 2 are turned on, and behave as non-linear resistors. This creates a current flow from VDD 3 to ground 7. Cell internal power dissipation is caused by this current flow. Internal power also accounts for current dissipated in the charging or discharging of any capacitances that are internal to the cell. For example, a sequential cell comes internal power during the charging and discharging of capacitances at nodes of the internal clock tree whenever the clock signal transitions.

Estimating the Number of Transitions for every Net

As described above, one way to estimate the switching power dissipated at a net is to compute the energy dissipated per transition at that net, and multiply it by the number of transitions expected per second at that net. The number of transitions per second is referred to as the toggle rate, transition density, or activity factor of that net. Depending on the complexity of the design, estimating a net's toggle rate can be a computationally expensive task.

One method for computing the toggle rate associated with a net is to develop stimuli and simulate the entire design. During the simulation, the simulator keeps hack of the number of transitions occurring at each net. Dividing the transition count of a net by the simulated time provides an estimate for the toggle rate of that net. However, this approach requires a substantial amount of computation to allow complete simulation of the circuit. The following papers describe various simulation-based analysis methods, and they are hereby incorporated by reference:

1) Accurate Simulation of Power Dissipation in VLSI Circuits by S. M. Kang, IEEE Journal of Solid-State Circuits, vol. SC-21, no. 5, pp. 889–891. October 1986.

2) An Accurate Simulation Technique for Short-Circuit Power Dissipation based on Current Component Isolation, by G. Y. Yacoub and W. H. Ku, IEEE International Symposium on Circuits and Systems, pp. 1157–1161, 1989.

3) McPOWER: A Monte Carlo Approach to Power Estimation, by R. Burch, F. Najm, P. Yang, and T. Trick, IEEE/ACM International Conference on Computer-Aided Designs, pp. 90–97, November, 1992.

Another method for estimating the number of transitions at each point in a combinational logic circuit relies on a static analysis of the circuit. A combinational logic is composed of cells connected together by nets without any feedback. The inputs to the entire combinational logic circuit are referred to as primary inputs while the final outputs of the entire combinational logic circuit are referred to as primary outputs. The nets between cells are referred to as internal nets of the design. One method estimating the toggle rates at each net in the combinational logic circuit involves assigning static probabilities and toggle rates to each primary input, and computing the toggle rates at other places in the design as a function of the static probability and toggle rate values of the primary inputs.

The static probability of a particular net or input in a circuit is the probability that the net will be at the value of Logic-1 at any point in time. Physically, the static probability represents the fraction of time that the net will hold the value of VDD.

This method involves computing and storing a representation of the Boolean logic function at each internal node in the circuit. One of the problems of this approach is that the functional representation may consume large amounts of memory for combinational logic circuits. In addition, this method has not been applied to circuits containing sequential elements.

BACKGROUND SUMMARY

Power dissipation in an integrated circuit presents an important design consideration. Estimating the power dissipated by a design involves considerations of computation time and accuracy. Conventional circuit power estimation techniques have involved evaluating circuits that have been specified to the layout or transistor level. This requires a substantial amount of computation time to analyze the design at this level.

Conventional circuit power estimation techniques have also involved simulation. The power estimate obtained from simulation requires computation time proportional to the number of test patterns used. The utility of the power estimate obtained from simulation also depends on the test patterns used. If the test patterns do not represent typical conditions, then the power estimate will not provide meaningful guidance to a designer.

Existing power estimates which are not based on simulation are faster than those which are. However, they only apply to a limited class of circuits, namely combinational logic. This greatly limits the use of this type of technique.

Existing power estimation techniques rely on a simple model of the power dissipated by a cell. Such models ignore leakage and cell internal power. Ignoring these effects reduces the accuracy of the estimate.

SUMMARY OF THE INVENTION

One aspect of the present invention provides a designer with a fast method of estimating the power dissipated by a circuit. The method reduces the time required to get an estimate of a design's power, because the design does not need to be mapped to the layout level, and instead uses information available at the gate level. The method avoids the requirement of gate level simulation by estimating the probabilities and the toggle rate at all nodes in the circuit, utilizing static probability and toggle rate values inputs of the circuit. Thus, this method returns a power estimate in less cpu time than earlier approaches.

Another aspect of the present invention provides a method of estimating the toggle rates in a circuit containing sequential elements (flip-flops). This is accomplished by constructing a state element graph for the circuit, breaking cycles in the graph, computing the toggle rate in the combinational logic using the levels in the state element graph, and transferring the toggle rates and probabilities across sequential elements. Transferring the toggle rates and probabilities across sequential elements is achieved by modeling any conventional sequential element as a generic sequential element with additional combinational logic.

To enable handling of large circuits, a memory blow-up strategy has been developed. Large circuits require large amount of memory to represent their logic functions. This issue is addressed by approximating the static probabilities at local inputs when computational problems are detected. This strategy achieves good accuracy of power estimates while limiting memory use and execution time.

An aspect of the present invention provides for improved accuracy and fast computation in estimating the internal power dissipated by a cell. This is achieved by a model which characterizes the power dissipated by the cell during an output transition. The model is a function of the edge rate (or transition time of the inputs to a cell) and the output capacitive loading of the cell output. This power model of a cell reduces the time required to estimate dissipated power, and represents a substantial improvement over previous transistor level simulation methods.

BRIEF DESCRIPTION OF THE FIGURES

FIG. 13 illustrates a set of primary outputs from the circuit of FIG. 12 ranked in order from lowest maximum logic level depth to highest maximum logic level depth.

DETAILED DESCRIPTION OF THE PREFERRED EMBODIMENT

The present invention comprises a novel method and apparatus for quickly estimating the power in a digital circuit. The following description is presented to enable any person skilled in the art to make and use the invention, and is provided in the context of particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiment shown, but is to be accorded the widest scope consistent with the principles and features disclosed herein.

Figure 2A:
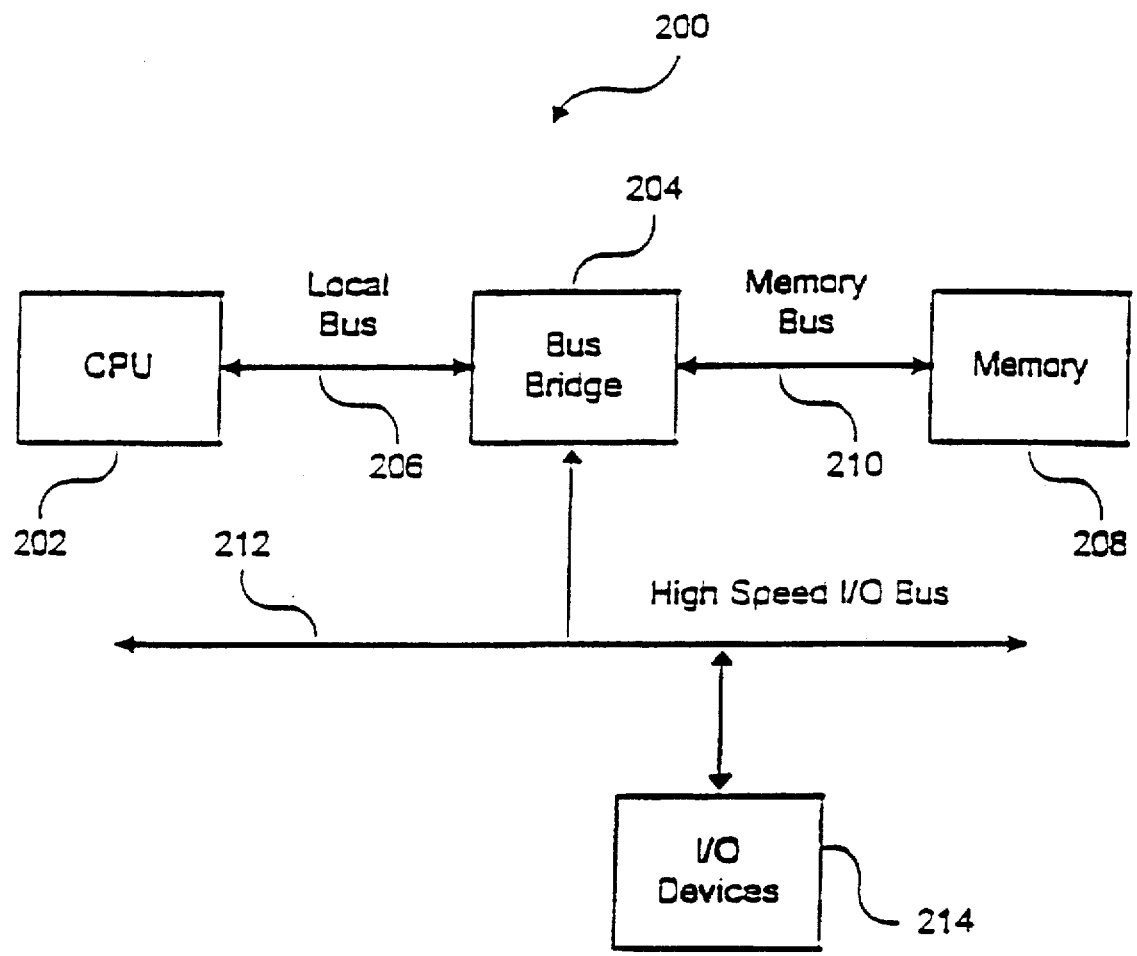
FIG. 2A is a block diagram of a general purpose computer system used in conjunction with an embodiment of the present invention.
Figure 2B:
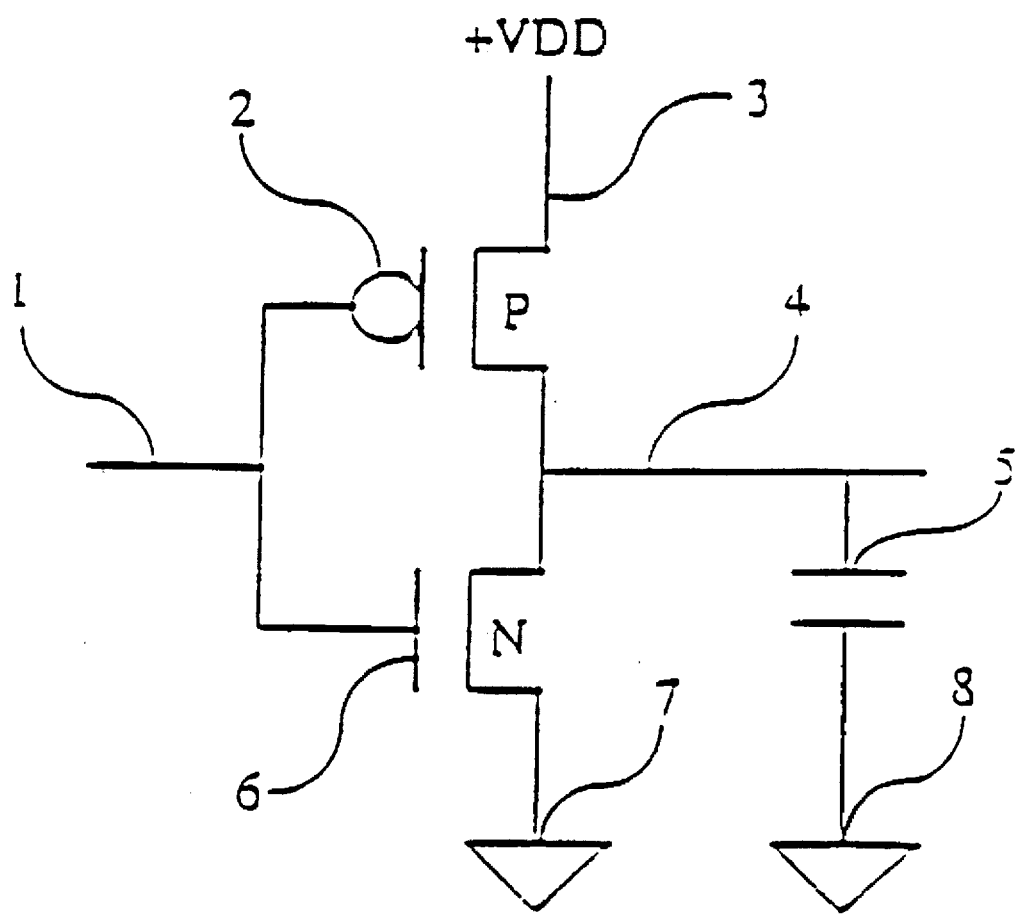
FIG. 2B shows a CMOS inverter.

FIG. 2A is a simplified block diagram illustrating a general purpose programmable computer system, generally indicated at 200, which may be used in conjunction with a first embodiment of the present invention. In the presently preferred embodiment, a Sun Microsystems SPARC Workstation is used. Of course, a wide variety of computer systems may be used, including without limitation, workstations running the UNIX system, IBM compatible personal computer systems running the DOS operating system, and the Apple Macintosh computer system running the Apple System 7 operating system. FIG. 2A shows one of several common architectures for such a system. Referring to FIG. 2A, such computer systems may include a central processing unit (CPU) 202 for executing instructions and performing calculations, a bus bridge 204 coupled to the CPU 202 by a local bus 206, a memory 208 for storing data and instructions coupled to the bus bridge 204 by memory bus 210, a high speed input/output (I/O) bus 212 coupled to the bus bridge 204, and I/O devices 214 coupled to the high speed I/O bus 212. As is known in the art, the various buses provide for communication among system components. The I/O devices 214 preferably include a manually operated keyboard and a mouse or other selecting device for input, a CRT or other computer display monitor for output, and a disk drive or other storage device for non-volatile storage of data and program instructions. The operating system typically controls the above-identified components and provides a user interface. The user interface is preferably a graphical user interface which includes windows and menus that may be controlled by the keyboard or selecting device. Of course, as will be readily apparent to one of ordinary skill in the art, other computer systems and architectures are readily adapted for use with embodiments of the present invention.

Figure 3:
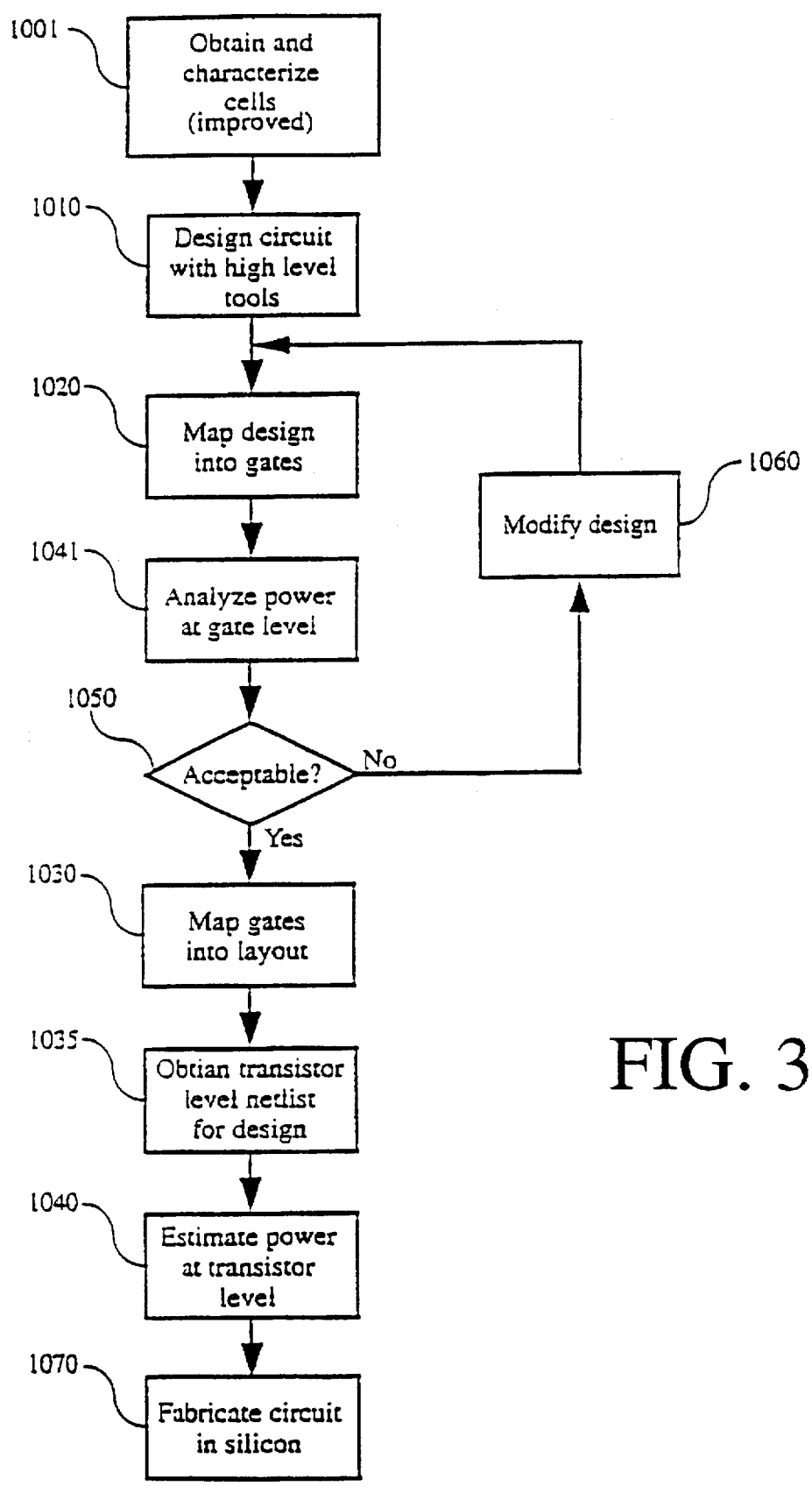
FIG. 3 shows an improved design process for a designer to analyze and evaluate a design for power dissipation.

FIG. 3 shows a revised general design approach incorporating the new estimation techniques. In step 1001, the semiconductor vendor and CAD tool supplier cooperate to produce cell libraries much as was done in step 1000 of FIG. 1. However, in addition to the other characterization activities, the semiconductor vendor also estimates the internal energy dissipated in a cell as a function of the input edge rate and output load, and adds this information to the cell library description. This power modeling information is supplied to power analysis tool to provide for estimation of internal energy of the cell.

Figure 1:
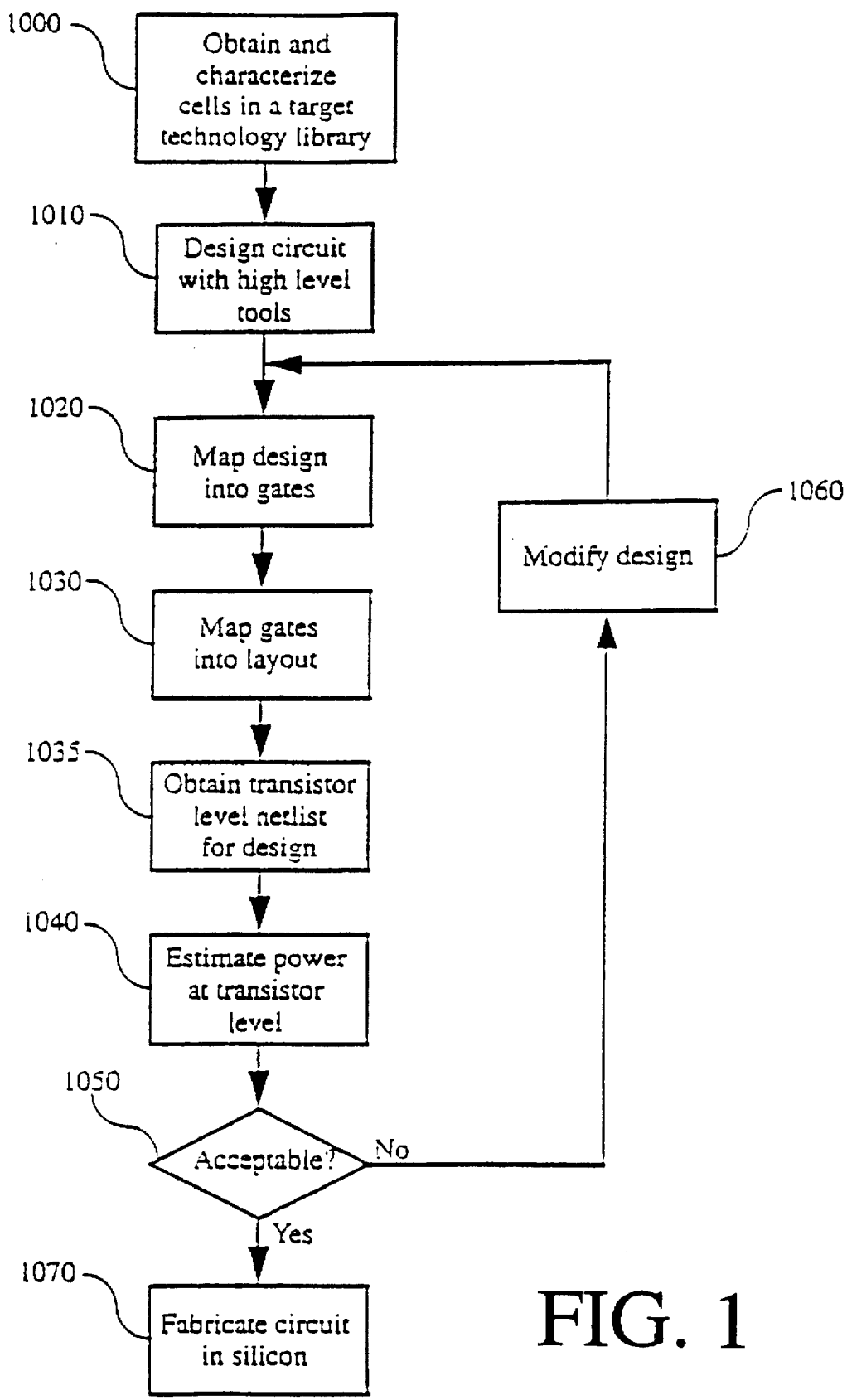
FIG. 1 shows the conventional design process for a designer to analyze and evaluate a design for power dissipation.

The designer specifies the design in step 1010 as was done in the process of FIG. 1. The design is mapped to gates in step 1020 as it was done before. However, in 1041, the power dissipated by the design is estimated at the gate level using methods described later. The CAD system uses conventional techniques to compute the transition times and capacitive loads on each net. The remainder of the design process proceeds as it did in FIG. 1.

The revised design approach has distinct advantages over the previous approach. The previous approach (FIG. 1), did not perform power analysis until the final stages of the design process. Power estimation is only done at the transistor level and requires more memory and execution time than the revised design approach. The revised approach can be used earlier in the design cycle which enables power estimates to be included in the design process at an earlier stage.

1.0 Power Estimation

As described previously, there are three sources of power dissipation: leakage, switching, and internal. The total power dissipated by a design can be computed by summing up the power dissipated by each of these sources.

1.1 Leakage Power Estimation

As previously described, leakage power represents the static or quiescent power dissipated. It is generally independent of switching activity. Thus, library developers can annotate gates with the approximate total leakage power that is dissipated by the gate. Normally, leakage power is only a very small component of the total power (<<1%), but it is important to model for designs that are in an idle state most of the time for example, circuits used for pagers and cellular phones are often idle. Leakage power will be specified by a single cell-level attribute in the library developed during step 1001 of FIG. 3. The leakage power of each cell is summed over all cells in the design to yield the design's total leakage power dissipation.

1.2 Switching Power Estimation

As previously described, switching power comes from the current that flows to or discharges the nets that connect cells. It occurs when the output of a cell transitions from one voltage level to another. Switching power for the entire design is the sum over all nets in the circuit of the power dissipated on each net. The power dissipated on each net is the energy dissipated on a transition at that net toggle rate times the number of transitions per second at that net. The energy dissipated in a transition is given $\frac{1}{2}C_{net}VDD^2$ where $C_{net}$ represents the capacitance of that particular net. It can be computed readily from the gate level libraries. The number of transitions per second is the toggle rate. A new method for computing the toggle rates will be described in a later section.

1.3 Internal Power Estimation

The total internal power dissipated in a design is the sum over all cells in the design of the internal power dissipated in each cell. Part of the internal power dissipation of a cell arises from the momentary electrical connection between VDD and ground that occurs while an input is transitioning, and thus turning on the P and N transistors simultaneously. This is called short-circuit power. Another part of the internal power comes from the current that flows while charging and discharging the internal capacitance of the cell. This is called internal capacitive power.

Figure 9:
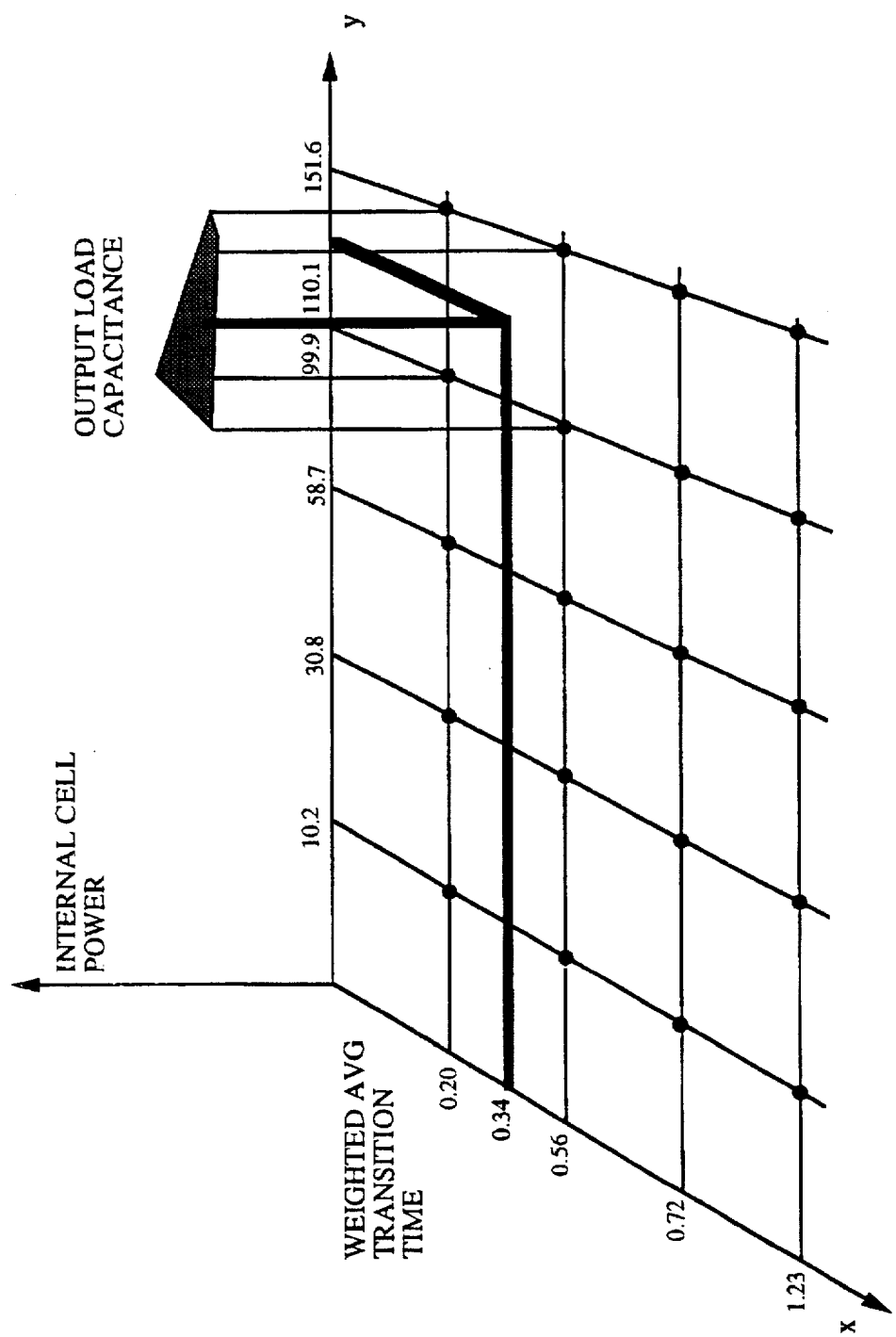
FIG. 9 shows a interpolation into a 2 dimensional lookup table for cell internal power.

A new internal power model is defined to model energy which is consumed internal to the gate using input/output port characteristics. The representation of the model used here is a data structure in the RAM of a computer system operating a Computer-Aided Design system. The model variables include: input edge rates, port toggle rates and output load capacitance. Each pin of the library gate can be annotated with an internal power table reference. The reference names a table of data values which represent internal energy consumed due to a logic transition at that pin. The table can vary from 1) a single scalar value, 2) a vector of values indexed by weighted input transitions, or 3) a 2 dimensional table indexed by weighted input transition times and output load capacitance. An energy value (Ej) is extracted from the table by performing a linear interpolation from values extracted from adjacent table values as shown in FIG. 9. The weighted transition time $T_{wavg}$ is computed by taking transition time $T_i$ of each cell pin i, and weighing by pin's toggle rate $Tr_i$ using the following formulation: $T_{wavg} = ((\Sigma(T_i \times Tr_i)/(\Sigma Tr_i))$ Internal cell power for a given cell can be estimated as $\Sigma EjTrj$ where Ej represents the energy dissipated due to a transition on signal j, while Trj represents the toggle rate on pin j.

An important aspect of this model is that it models the variation of energy dissipated due to the variation of both input transition times and output load capacitances. If a signal transition takes a long time, then the P and N transistors are both on for a longer period of time, thus allowing more charge to flow and dissipate more energy. On the other hand, a fast transition limits the amount of time that the P and N transistors in a cell can be on simultaneously. From information available in the gate libraries, a static timing analyzer (example: DesignTime from Synopsys, MOTIVE tool from Quad Design) can compute the transition time $T_i$ at each cell input net i.

Method for Determining Input Transition Times in Circuit Netlist

Figure 10:
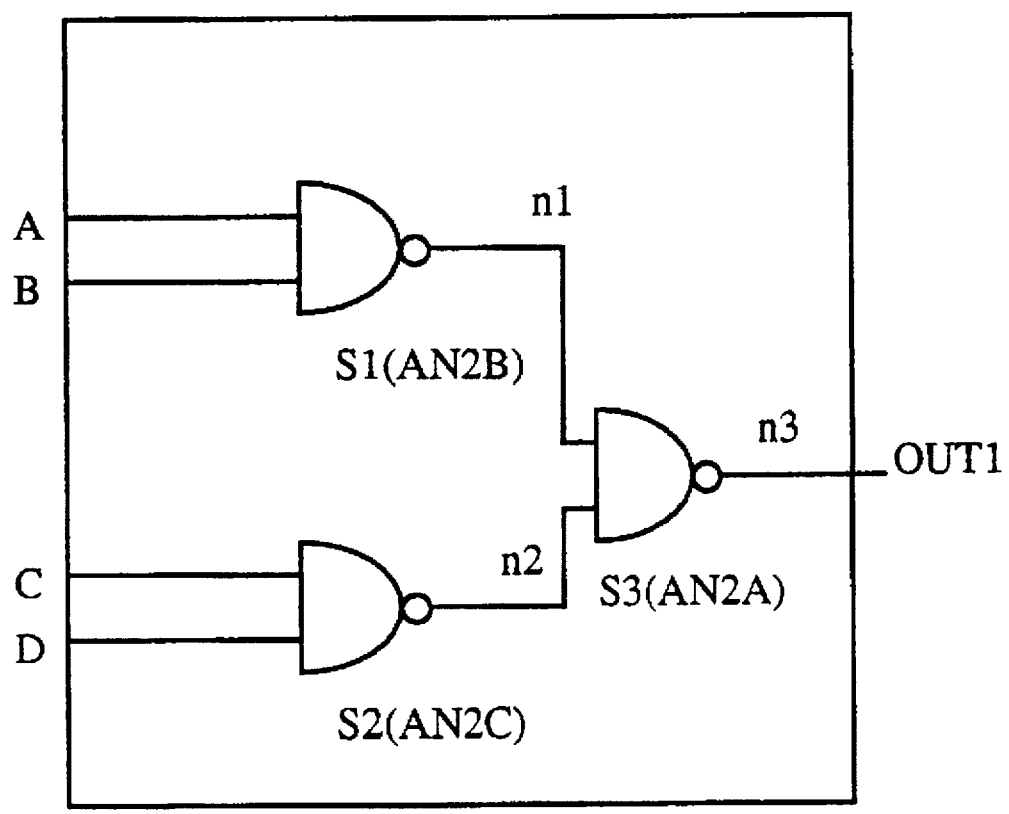
FIG. 10 illustrates a gate level netlist in which three different library cells are instantiated.

FIG. 10 is a drawing of a gate level netlist in which three different library cells are instantiated. The name shown for each cell shows the instance name, and the library cell name in parentheses. The available technology library provides several different library cells which provide same logic function (AN2), but provide different circuit implementations with different electrical characteristics. The library cells are stored in a function table indexed by the function type (i.e. NAND2), shown in FIG. 11. To compute transitions times, the circuit netlist is traversed in a breadth first fashion. At each cell instance the output transition time is accessed based on the electrical characteristics of its attached pins, from a table of values for that library cell. For example in FIG. 10, the first cell S1 is traversed and the output net n1 transition time is computed by accessing the transition time values for the input nets A and B. Next the second cell S2 is traversed and the output net n2 transition time is similarly computed by accessing the transition time values for the attached input nets C and D. Finally, the first cell on the next level S3 is traversed and its output net n3 transition time is computed by accessing the transition time values for the attached input nets n1 and n2.

Method for Determining Output Load Capacitance

The output load capacitance of each net is determined using the following pseudo code traversal:

```
1000    for (all nets in circuit netlist){
1000        output_load_cap = 0;
1001        for (all attached pins of net){
1002            output_load_cap = output_load_cap + cap of pin;
1003        }
1004        store output_load_cap on net data structure;
1005    }
```

The method works by traversing all nets in the circuit netlist data structure, and then for each attached pin on the net, a capacitance value is accessed and added to a sum for that net. Once a total value for the net is calculated, it is stored onto a circuit netlist data structure.

1.4 Method for Reducing Circuit Power Dissipation

The following describes how a power model can be used by a designer to minimize power dissipation in a gate level circuit. The following pseudo code describes a method by which a designer can reduce the power consumption of a design.

```
1000    current_power = compute power of circuit netlist;
1000    for (each cell in circuit netlist){
1001        for (each alternative library cell which provides same function){
1002            current_library_cell name is saved;
1003            instantiate alternative library cell;
1004            new_power = comput power of circuit netlist;
1005            if (new_power >current_power) {
1006                revert instantiate back to current_library_cell
1007            }
1008            else {
1009                current_power = new_power;
1010            };
1011        }
1012    }
```

Figure 11:
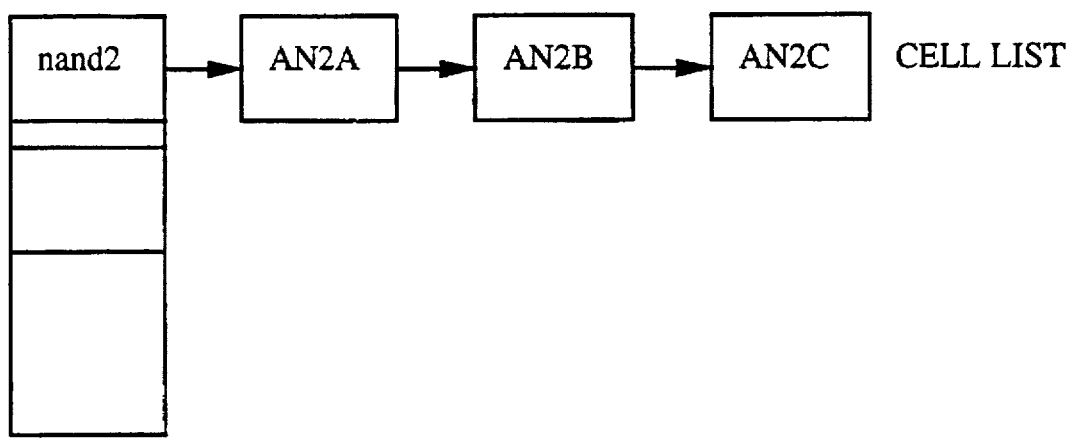
FIG. 11 illustrates a library function data structure (table) indexed by the function type.

In this pseudo code, the designer is using the power estimation tool to evaluate alternative library cell instantiations in the circuit netlist to determine which instantiation provides the least power dissipation. After each instantiation of an alternative library cell, the designer uses the power estimation tool to compute the power dissipation of the entire circuit. At line 1001, the library function data structure in FIG. 11 is accessed to find all the library cells which implement the same function as the original library cell.

1.5 Calculating Cell Energy as a Function of Edge Rates

Today, semiconductor manufacturers provide libraries of standard cells that perform various functions to designers. Designers use CAD tools to select appropriate cells to construct a larger circuit. Some CAD tools use logic synthesis to select cells from the library. To evaluate the behavior of the resulting total design, the CAD tool determines the characteristics of the entire design from the particular characteristics of individual cells as well as from the interactions of connected cells. To allow the CAD tool to perform this global analysis, the semiconductor vendor computes various characteristics of each cell and passes the results of those computations along to the CAD tool vendor and to the designer. Analysis tools in the CAD tool suite use this information to provide the designer with information about the area, power and delay associated with a particular design.

Each cell is specified as a geometric pattern of different layers of various materials. Each cell performs a particular logic function using the electrical circuits formed from these patterns. As part of providing the library to the designer, the semiconductor vendor routinely use tools such as SPICE to determine, for example, how long the circuit takes to generate an output from a given set of inputs.

The semiconductor vendor (or tool user) provides a library of cells, with characterization data for each the library cells. The characterization data includes: 1) pin capacitance values, 2) internal power model, 3) delay model information. The model information is extracted from a transistor level netlist using a process termed cell characterization. During characterization, a transistor level simulation (SPICE) is performed using set of input stimuli which model signal transitions under various conditions. A power value for each of the set of conditions is extracted into a table of raw internal energy data values. The raw data is then compressed into power model values by using a straight forward averaging compression scheme. An aspect of the invention provides for a mechanism by which this data can be supplied to a power analysis tool as described above.

One method for constructing the relevant energy tables for each cell would be to input different patterns to each cell with different transition times (transition), and output capacitive loads (capacitance) and compute the average energy dissipated for a given transition time and output load. In one embodiment, the tables are a data structure in the memory of a computer system. In particular, the energy tables for a particular cell could be constructed by a cell characterization system using the following pseudo-code approach:

```
1000 for each output
1001 {
1002   for (capacitance = cap_start; capacitance <= cap_end; ++cap_step)
1003   {
1004     for (transition = trans_start; transition <= trans_end; ++trans_step)
1005     {
1006       for (input = 1; input <= N_input; ++input)
1007       {
1008         /* Simulate rise and fall at the output */
1009         rise_energy = get_rise_energy();
1010         fall_energy = get_fall_energy();
1011         avg_energy[input] = (rise_energy + fall_energy)/2;
1012       }
1013       max_energy_of_inputs = max(avg_energy[input]);
1014       write_table_output(transition, capacitance, max_energy_of_inputs);
1015     }
1016   }
1017 }
```

Here capacitance is output load capacitance, transition is input pin transition time, $N_{input}$ is the number of cell inputs. Rise_energy is the energy dissipated during a low to high signal transition, and fall_energy is the energy dissipated during a high to low transition.

In this approach, a 2 dimensional table of data values with indexes of input transition (transition) and output load (capacitance) is developed. This table is supplied to the power analysis tool in the cell library description to be used during power estimation calculation. An example description is provided below.

```
1018 library(power2_sample) {
1019   time_unit: "1ns";/* required for power units calculation*/
1020   voltage_unit: "1V";/* required for power units calculation*/
1021   current_unit: "1uA";
1022   capacitive_load_unit (0.1,ff);/* required for power */
1023   pulling_resistance_unit: "1kohm";
1024
1025   /*
1026     Units for internal energy table must be (V**2) * C
1027     for this example Internal power = (1v)**2 * .1 ff= .1fJoules
1028
1029     The # displayed by Design power in report_power command
1030     is V**2 * C * (1/time_unit) for this example is .1 uW
1031   */
1032
1033   /* define unit for leakage power values    */
1034   leakage_power_unit: 1nW;
1035   default_cell_leakage_power : 0.2;
1036
1037   /* define scaling for leakage power values to
1038   compensate for changes in voltage, temperature
1039   and process      */
1040   k_volt_cell_leakage_power : 0.000000;
1041   k_temp_cell_leakage_power : 0.000000;
1042   k_process_cell_leakage_power : 0.000000;
1043
1044   k_volt_internal_power : 0.000000;
1045   k_temp_internal_power : 0.000000;
1046   k_process_internal_power : 0.000000;
1047
1048   /* Define template for 2 dimensional table , indexes are defined
1049   to be the total output net capacitance and the input pin transition
1050   time. The index values by which table values will be determined
1051   are listed in the index_1 and index_2 attributes */
1052   power_lut_template(output_by_cap_and_trans) {
1053     variable_1 : total_output_net_capacitance;
1054     variable_2 : input_transition_time;
1055     index_1 ("0.0, 5.0, 20.0");
1056     index_2 ("0.1, 1.00, 5.00");
1057   }
1058   /* Define template for 1 dimensional table , index isdefined to be the
1059   the input pin transition time. The index values by which table values
1060   will be determined are listed in the index_1attribute */
1061
1062   power_lut_template(input_by_trans) {
1063     variable_1 : input_transition_time;
1064     index_1 ("0.1, 1.00, 5.00");
1065   }
1066
1067   /*******************************************/
1068
1069   /* 2 input combinational logic cell description AND2*/
1070   cell(AN2) {
1071     area : 2;
1072     pin(A) {
1073       direction : input;
1074       capacitance : 1;
1075     }
1076     pin(B) {
1077       direction : input;
1078       capacitance : 1;
1079     }
1080     pin(Z) {
1081       direction : output;
1082       function : "A B";
1083       timing() {
1084         intrinsic_rise : 0.48;
1085         intrinsic_fall : 0.77;
1086         rise_resistance : 0.1443;
1087         fall_resistance : 0.0523;
1088         slope_rise : 0.0;
1089         slope_fall : 0.0;
1090         related_pin : "A";
1091       }
1092       timing() {
1093         intrinsic_rise : 0.48;
1094         intrinsic_fall : 0.77;
1095         rise_resistance : 0.1443;
1096         fall_resistance : 0.0523;
1097         slope_rise : 0.0;
1098         slope_fall : 0.0;
1099         related_pin : "B";
1100       }
1101     }
1102     /*******************************************/
1103     Output Power for Z Output
1104     Defines 2d table values for internal
1105     power consumed during transition at pin Z
1106     /*******************************************/
1107     cell_leakage_power : 1;
1108     internal_power(output_by_cap_and_trans) {
1109       values("4.000000, 8.000000, 40.000000",\
1110         "2.000000, 6.000000, 35.000000",\
1111         "1.000000, 5.000000, 30.000000");
1112       related_inputs : "A B"
1113       related_outputs : "Z";
1114     }
1115   }
1116
1117   /* Cell description for a basic flip-flop sequential element */
1118   cell(flop1) {
1119     area : 7;
1120     pin(D) {
1121       direction : input;
1122       capacitance : 1;
1123       timing() {
1124         timing_type : setup_rising;
1125         intrinsic_rise : 0.8;
1126         intrinsic_fall : 0.8;
1127         related_pin : "CP";
1128       }
1129       timing() {
1130         timing_type : hold_rising;
1131         intrinsic_rise : 0.4;
1132         intrinsic_fall : 0.4;
```

```
1133        related_pin : "CP";
1134    }
1135 }
1136 pin(CP) {
1137    direction : input;
1138    capacitance : 1;
1139    min_pulse_width_high : 1.5;
1140    min_pulse_width_low : 1.5;
1141 }
1142 ff(IQ, IQN) {
1143    next_state : "D";
1144    clocked_on : "CP";
1145 }
1146         /*******************************************/
1147         Internal Power for Clock Input:
1148         describes table for internal power consumed
1149         during a transition at input pin CP.
1150         /*******************************************/
1151         internal_power(input_by_trans) {
1152             values("0.550000, 0.600000, .700000");
1153             related_input : "CP";
1154         }
1155 pin(Q) {
1156    direction : output;
1157    function : "IQ"
1158    timing() {
1159        timing_type : rising_edge;
1160        intrinsic_rise : 1.09;
1161        intrinsic_fall : 1.37;
1162        rise_resistance : 0.1458;
1163        fall_resistance : 0.0523;
1164        related_pin : "CP";
1165    }
1166 }
1167/*********************************************/
1168 Output Power for QN,Q Outputs Defines 2d table values for internal
1169 power consumed during transition at pin Q,QN
1170/*********************************************/
1171    cell_leakage_power : 1;
1172    internal_power(output_by_cap_and_trans) {
1173        values("4.000000, 8.000000, 40.000000",\
1174        2.000000, 6.000000, 35.000000",\
1175        1.000000, 5.000000, 30.000000");
1176        related_inputs : "CP D"
1177        related_outputs : "Q QN";
1178    }
1179 pin(QN)
1180    direction : output;
1181    function : "IQN"
1182    timing() {
1183        timing_type : rising_edge;
1184        intrinsic_rise : 1.59;
1185        intrinsic_fall : 1.57;
1186        rise_resistance : 0.1458;
1187        fall_resistance : 0.0523;
1188        related_pin : "CP";
1189    }
1190 }
1191}
1192} /* End of library power_sample */
1193
```

2.0 Computing toggle rates

As previously described, CMOS gates dissipate energy during output transitions one to zero or from zero to one. In order to compute the power dissipated by a gate in the circuit the energy dissipated by the gate per transition is computed and multiplied by the number of transitions per second (also referred to as toggle rate) that occurs at the output of the gate. The average power dissipated by the design is obtained by summing up the power values for each gate in the circuit.

One method of computing toggle rates for the nets in the circuit is by simulating the circuit with a set of input stimuli and counting the number of transitions at each net, and dividing by the appropriate time unit. This method gives accurate values for the toggle rates of nets in the circuit. The simulation-based method is slow because the entire circuit has to be simulated for each input vector that is applied. A faster but potentially less accurate method is the probabilistic method. As described previously, static probability at a point in a net is an estimate of the total fraction of time that the node spends at the logic value of one. This method takes static probability values and toggle rates for every primary input and estimates the toggle rates at the internal nodes and outputs from the values at the primary inputs. The probabilistic method can be several orders of magnitude faster than the simulation-based mechanism because there are no vectors required. This method is very advantageous in situations where a quick estimate of the average power dissipation is desired. This situation typically arises in a high-level design environment where for example, designers will make tradeoffs between different implementations for modules. In this situation, it is not necessary to get a highly accurate power value because it is very early in the design cycle. However it is important to produce the estimate quickly.

The next section explains how to compute the toggle rates for a circuit containing only combinational logic. The section following that describes how to use the combinational logic method as part of the process of computing toggle rates for circuits for containing both sequential and combinational elements.

2.1 Computing toggle rates for a Combinational Logic Circuit

In order to compute the toggle rates in a combinational circuit, probabilities and toggle rates are first annotated on the primary inputs. After that is completed, the logic function is computed at each net in the circuit with respect to the primary inputs in the transitive fan in of the net. For each function, boolean difference functions and their probabilities are computed with respect to each input. The toggle rate for the function (and hence the associated net) is calculated using these values and the toggle rates of the primary inputs (which are already given). Transition Density, A Stochastic Measure of Activity in Digital Circuits, by Farid N. Najm, paper 38.1 in the 28th ACM/IEEE Design Automation Conference, 1991, explains a basic process for computing what are referred to here as toggle rates, and is hereby incorporated by reference. Estimation of Average Switching Activity in Combinational and Sequential Circuits, Abhijit Ghosh, Srinivas Devadas, Kurt Keutzer and Jacob White, in the 29th ACM/IEEE Design Automation Conference in 1992 provides another process for computing what are referred to here as toggle rates, and is hereby incorporated by reference.

As described in the literature, computing toggle rates in circuits requires computing various boolean functions. Computing these functions requires data structures and algorithms. One efficient method of processing boolean functions involves Binary Decision Diagrams (BDDs). Efficient Implementation of a BDD Package, by Karl S. Brace, Richard L. Rudell, and Randal E. Bryant in paper 3.1 of the 27th ACM/IEEE Design Automation Conference, 1990, describes how to implement and use BDDs, and is hereby incorporated by reference. Logic Verification using Binary Decision Diagrams in a Logic Synthesis Environment, by Sharad Malik, Albert R. Wang, Robert K. Brayton, and Alberto Sangiovanhi-Vincentelli, Proceedings of ICCAD, 1988, describes methods of efficiently building BDDs for large circuits and is hereby incorporated by reference. Software for manipulating BDDs can be obtained from SIS-BDD package available electronically using the FTP command from ic.berkeley.edu.

Figure 4:
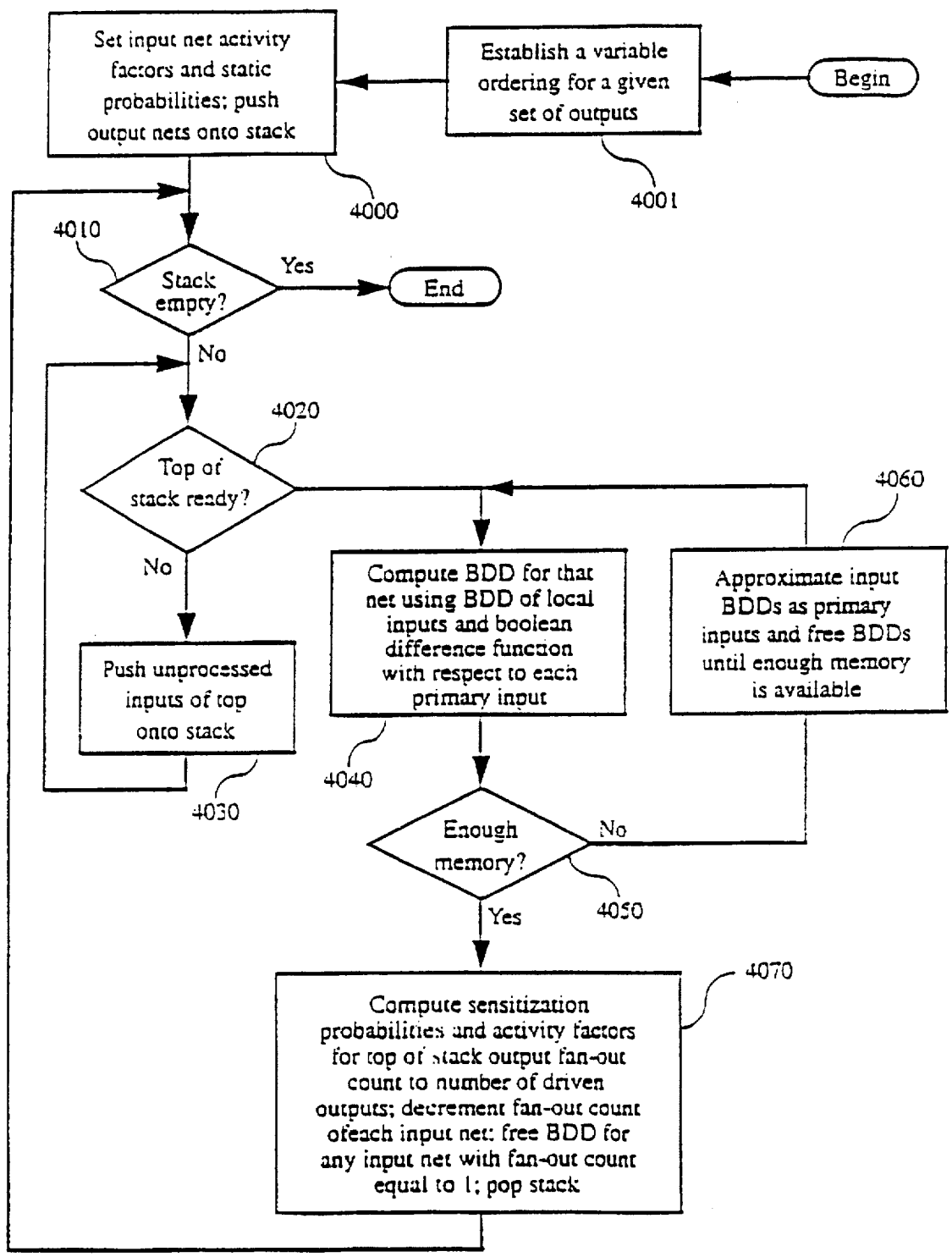
FIG. 4 shows a method of computing the stationary probabilities and activity factors for a combinational logic circuit.

FIG. 4 provides a flow chart for a method of computing the toggle rates of a combinational logic function assuming zero delay on the gates. The choice of delay model affects the accuracy of the power computation. A more accurate the delay model provides a more accurate power estimate. However, zero delay power estimates are computationally cheaper to compute than unit delay or general delay models. In a preferred embodiment, zero delay models are used.

The process begins at step 4000 by ordering the primary outputs based on their depth (in terms of levels of logic) from the primary inputs of the network. The primary outputs with smaller depth are placed before primary outputs with greater depth. The intuition here is that: more the number of levels of logic for a primary output, larger is the BDD required to represent that output. The ordering of the primary inputs is derived from the primary output ordering by placing "deeper" variables ahead of "shallow" variables. This approach to variable ordering is similar to the one described in Logic Verification using Binary Decision Diagrams in a Logic Synthesis Environment, described earlier. It also describes a framework for building BDDs in large networks and it addresses some memory issues. In addition, Dynamic Variable ordering for OBDDs, by Richard Rudell in Proceedings of ICCAD, 1993 describes other methods for doing this, and is hereby incorporated by reference.

The process continues to step 4001 by specifying the toggle rate on each primary input net as well as the static probability for each primary input. The static probability for each input is the probability that the input is equal to a logical one. A BDD variable is created for each primary input. The ordering of the inputs (and hence the BDD variables) is determined by step 4000. The output nets are pushed onto a stack such that the "shallowest" output (from step 4000) is at the top of the stack. Each net in the circuit that is not a primary input is marked unprocessed. Each net in the circuit is given an integer value that is set to the number of fanouts of that net (fan-out count).

If the stack is empty, then the process terminates with the toggle rates computed, as shown in step 4010.

At step 4020, it is determined if the net at the top of the stack is ready to have its static probability and toggle rate computed. A net is ready if all of the inputs to the gate driving it have been processed, or the net is a primary input.

If the top of the stack is not ready, push all nets that are unprocessed inputs to the gate driving the net at the top of the stack onto the stack as shown in step 4030, and return to step 4020.

If the top of the stack is ready, then compute the boolean function of the net at the top of the stack from its inputs using the BDD package as shown in step 4040. In addition, compute the boolean difference functions for the each inputs as required by Transition Density, A Stochastic Measure of Activity in Digital Circuits, which is described above.

Step 4050 tests to see if the BDD package had enough memory to complete the computations in step 4040. As will be explained later, during the course of processing, it may be necessary for a particular internal net to be treated as though it were an independent input. Such a net is referred to as a pseudo-primary input.

If there was enough memory, then the toggle rate and the static probability of net i, on the top of the stack can be computed as indicated by step 4070. Compute the static probability of the net by computing the probability that the boolean function, $f_i$ is one. Compute the toggle rate, $Tr_i$ of the net i using $$Tr_i = \Sigma [Pr(f(x_0, \ldots, x_j, \ldots, x_{N-1}) \oplus f(x_0, \ldots, \neg x_j, \ldots, x_{N-1})) \cdot Tr_{x_j}]$$

where $\oplus$ denotes the "exclusive or" operator, Pr denotes the probability operator, $x_j$ denotes the j-th primary or pseudo-primary input. The operation described above to compute the toggle rate for the net i is an expensive one. This is because we have to build as many boolean differences (represented as BDD formulas) as there are primary variables. In addition, for each boolean difference BDD we have to compute the static probability in order to obtain the coefficient of the corresponding primary input's toggle rate. In order to address this CPU bottleneck, the idea of "pooling" is used. The static probabilities of the boolean differences BDDs are evaluated simultaneously instead of individually. This is because the static probability computation remits in several intermediate results (i.e. BDDs for smaller formulas) getting computed for free. So if we group all the boolean differences and then compute the static probability, there is greater likelihood of sharing intermediate formulas (and hence results) across the different static probability computations. This method will ensure that the same subformula is never evaluated twice. The "pooling" mechanism helps to reduce considerably the run time of the probabilistic analysis, and thus permits an increase in the size of the circuit that can be evaluated.

Note that evaluated net i is driven by a particular gate. For every input net to this gate, ensure that it is not a primary input or pseudo-primary input and decrement the fan-out count on that net. If the fan-out count on an input to the gate corresponding to this net reaches 0, release the BDD associated with the function on that input net because it will not be needed any more i.e., all the gates that needed that net's formula have already used them. A crucial advantage of this technique is the efficient usage of BDD formulas in the circuit. No BDD formula remains allocated unless it is required for a later computation. This helps conserve memory which in turn lowers the peak memory usage of this software. Pop the stack and return to the decision of step 4010.

2.2 Memory recovery techniques

One of the most important characteristics of this probabilistic estimation method is its speed. Usually BDD based approaches suffer from capacity as well as run time problems i.e., they do not work for large circuits and work slowly for relatively large circuits. The advantage of the technique presented in FIG. 4 is its efficiency in dealing with all circuits, regardless of size. An important factor of the speed of this method vis-a-vis other methods is the efficient algorithm that is used to reclaim memory during the BDD manipulation steps.

Step 4040 in FIG. 4 contains two operations where there may not be enough memory to perform the computations required. These are the BDD building step for a net and the toggle rate computation step. Since BDD building operations can lead to dramatic increase in the number of BDD nodes, we place a memory capacity on the BDD package. Placing an upper bound on the number of nodes in the BDD automatically restricts the amount of memory the BDD package can allocate and hence controls the behavior of the BDD package when large BDDs are being processed. Since a cap is placed, it is also important to come up with a strategy to deal with the memory overflow problem. This is also referred to as the "blowup" problem.

The blowup strategy that is used has three important properties. First, it only frees those formulas from which large chunks of memory can be recovered. In addition, it also tries to minimize the number of BDDs freed. Finally, it should account for a small fraction of the overall runtime of the power analysis. Whenever a BDD at an intermediate net is freed, that point in the circuit is treated as a pseudo-primary input. The static probability and the toggle rate is computed for that node and the new node is assumed to be an independent primary input i.e., it is not correlated to any of the other primary inputs that exist in the circuit. This assumption is a source of inaccuracy, because two inputs to a gated downstream from the newly created primary input, may be treated as unrelated when in reality, they share some common primary inputs. Due to the accuracy implications of creating pseudo-primary inputs, the blowup strategy used tries to minimize the number of BDDs that have to be freed. Since re-claiming memory is another important goal, it is important for the blowup strategy to be effective in recovering memory. The blowup operations appear in Step 4060 of FIG. 4.

In the previous section, a method was described to conserve memory by storing only those BDDs that are needed for future evaluation. These BDDs correspond to those gates in the circuit which are connected to inputs of unprocessed gates in the network. This set of gates which have BDDs is referred to as the "frontier." Each of the gates in the frontier also has the property that their fan-out counts are non-zero. The frontier is a dynamically changing set of gates that keeps getting updated every time a gate is processed in Step 4070. In the blowup strategy, the first step is to identify the set of candidate BDDs that can be freed. This is directly obtained by examining the frontier. In order to speedup the blowup step, the frontier is maintained dynamically by removing gates from it as every gate in the circuit is being traversed.

Compute the size of each BDD in the frontier. These BDDs are then sorted in decreasing order of size. Starting with largest BDD and its associated net, free that BDD and create a new BDD variable associated with that net. These variables are pseudo-primary inputs. Then define the static probability and toggle rate of the new variable as the static probability and toggle rate of that net (already computed in Step 4040). Continue replacing BDDs with variables until the memory used by the active BDDs (number of non-variable modes in the BDD) reaches a predetermined level. In one embodiment, BDDs are freed until the memory used is less than 50% of the memory available to the BDD package. When the predetermined level is reached, the blowup strategy terminates and the normal traversal of the circuit resumes to compute and evaluate BDDs at the unprocessed gates in the circuit. In practice, this strategy is known to work very well for several large circuits. The average percentage of formulas freed by one embodiment of the strategy is 8% (2 or 3 BDDs) and the runtime impact is about 1% of the overall runtime of the power analysis.

2.3 Accuracy improvements for combinational logic circuits

In the method of FIG. 4, step 4060 showed one way to recover memory. This method is very fast but there is a loss of accuracy resulting from this step. If more accuracy is desireable, an alternate method can be used to compute the static probabilities and toggle rates without possibly having to create pseudo primary inputs. This method involves re-trying failed outputs (i.e., outputs of the circuit for which BDDs could not be built) and trying a different variable ordering for their inputs.

After determining at step 4050 that there is insufficient memory, one could abort the processing for that output (instead of firing off the blowup strategy) and add that primary output to a list of failed outputs. This way, at the end of one pass of the algorithm shown in FIG. 4, some of the primary outputs would have been successfully processed (without memory blowup) and there might be some which could not be processed due to the given variable ordering. Prune the circuit to remove the successful outputs and run another pass (step 4000) of the algorithm on the pruned circuit. This may result in a different input order being derived for the primary inputs. As a result some of the outputs that failed with the earlier order could succeed with the new order. Continue to iterate until all outputs have been evaluated or there are a set of outputs for which an input order could not be derived.

For the unresolved set of outputs (usually a small subset of the original set of outputs), we could go back to Step 4000 with the blowup strategy enabled in Step 4050, to estimate toggle rate and static probabilities for these outputs. This would impact the accuracy of the estimates, but not as much as if all the primary outputs were processed using the blowup strategy. Alternately, to be even more accurate, each primary output in the failed list, could be taken in turn and processed using the method in FIG. 4.

2.3.1. Additional Examples of Combinational Logic Analysis

Figure 12:
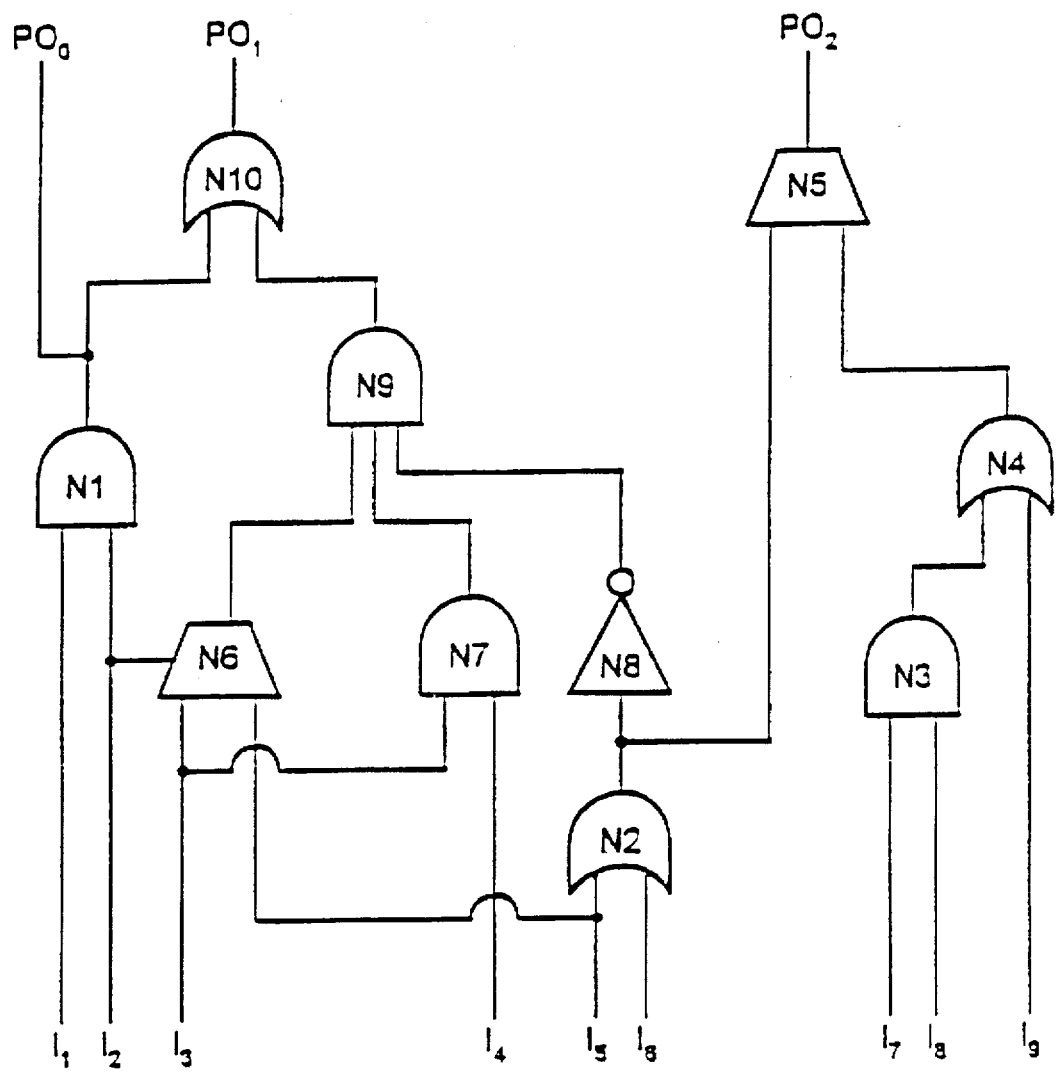
FIG. 12 is an illustrative schematic diagram of an exemplary electronic circuit and also represents a netlist stored in memory representative of the circuit.

Referring to FIG. 12 there is shown an illustrative schematic diagram of an exemplary electronic circuit. The circuit has multiple primary inputs I1–I9 and has multiple primary outputs $PO_0$, $PO_1$ and, $PO_2$ and has multiple gates N1–N10. Each gate is represented by a netlist node stored in memory. Each wire connection between gates is represented by a net stored in memory. Each primary input and each primary output also is represented by a netlist node. The FIG. 12 diagram also serves to illustrate a netlist stored in electronic memory that represents the circuit.

A presently preferred technique for estimating average power consumption by the exemplary electronic circuit of FIG. 12 in accordance with the invention involves first ranking the primary outputs, in an order which depends upon the maximum number of logic levels between each primary output and the primary inputs that feed such primary output. For example, the maximum number of combinational logic levels below primary output $PO_0$ and the primary inputs that feed into primary output $PO_0$ is one. The only logic gate that feeds $PO_0$ is N1. The maximum number of logic levels that feed $PO_1$ is four. Primary inputs $I_5$ and $I_6$ feed into $PO_1$ through gates N2, N8, N9 and N10. The maximum number of logic levels that feed $PO_2$ is three. Primary inputs I7 and I8 feed into $PO_2$ through N3, N4 and N5.

The primary outputs are ranked in increasing order of maximum logic level depth. That is, the primary output with the lowest maximum number of logic levels between it and a primary input is ordered fast, and the primary output with the highest maximum number of logic levels between it and a primary input is ranked last. Referring to the illustrative drawings of FIG. 13, the set of primary outputs from the electronic circuit are shown ranked in order from lowest maximum logic level depth to highest maximum logic level depth: $PO_0$, followed by $PO_2$, followed by $PO_1$.

Figure 14:
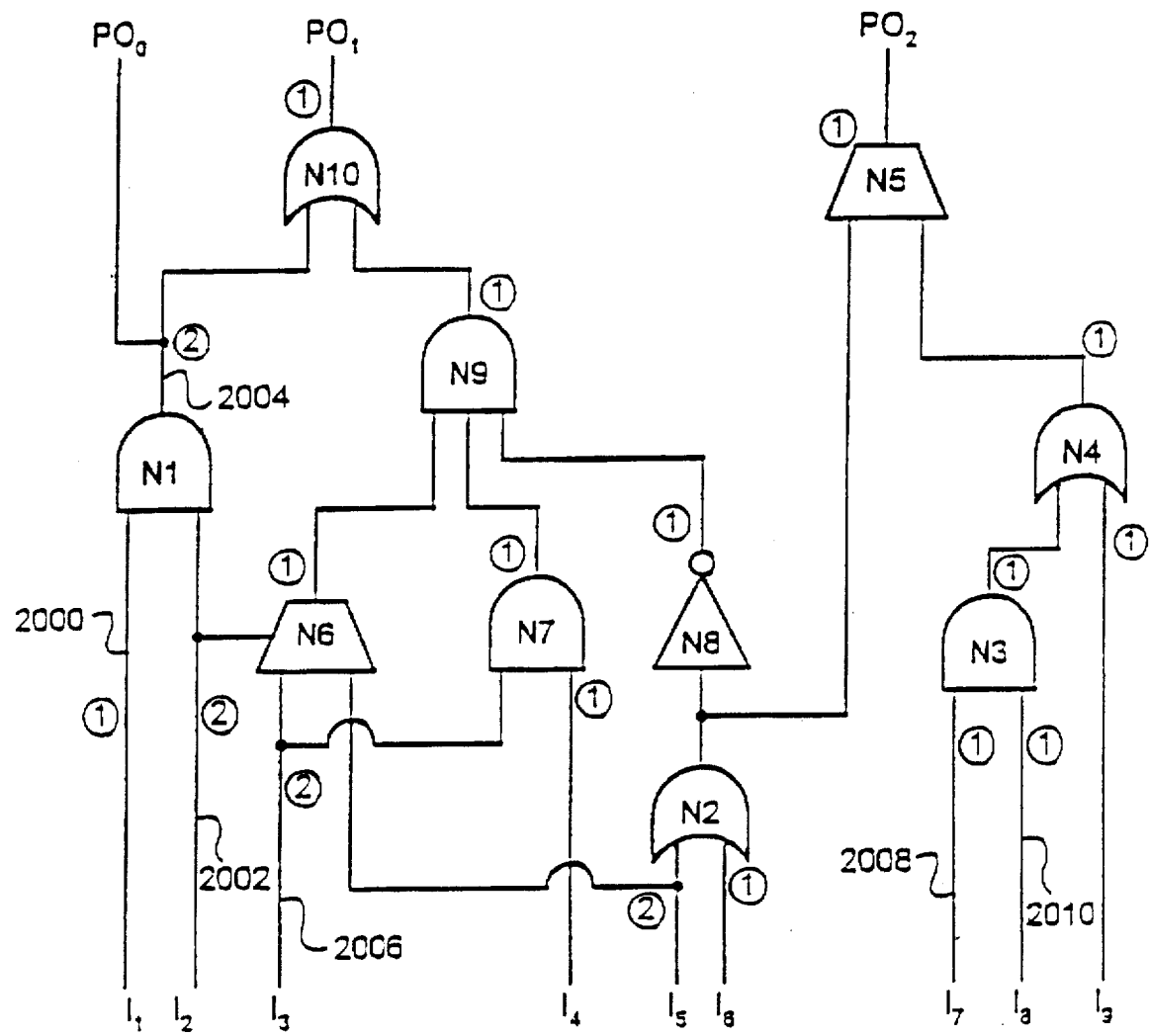
FIG. 14 illustrates a diagram of the exemplary netlist of FIG. 12 with nets annotated in accordance with fanout numbers.

Referring to the illustrative drawings of FIG. 14, the diagram of the exemplary netlist with nets annotated in accordance with fanout numbers. The netlist that represents the circuit will be described with reference to FIG. 12 since netlist nodes represent circuit gates and netlist nets represent circuit wires. The fanout count of a given net equals the number of gates that receive an input from that net. For example, net 2000 has a fanout count of 1, since it only feeds a netlist node representing a single gate N1. The fanout count of net 2002 is 2, since it feeds two netlist nodes representing gates N1 and N6. The fanout count of net 2004 also is two since it feeds two netlist nodes representing gates $PO_0$ and gate N10. Net 2006 has a fanout count of 2 since it feeds two netlist nodes representing gate N6 and gate N7. Nets 2008 and 2010 each have fanout counts of one since they each only feed the netlist node representing gate N3. The fanout counts annotated on the remaining nets will be appreciated from the previous discussion. Thus, it will be understood that a fanout count is stored for every net in the netlist stored in the electronic memory.

A depth-fast traversal is a technique to "process" all the netlist nodes in the electronic memory such that nodes at prior or deeper levels of logic are processed before nodes at subsequent or shallower levels. Netlist nodes at subsequent or shallower levels of a netlist often are referred to as parent nodes of netlist nodes that feed into them from the next prior or deeper logic level. In a depth-first traversal, all child nodes of a parent node are "processed" before that parent node is processed. In the current embodiment that means that BDDs for child nodes are constructed and have switching activity values computed for them before a BDD is constructed for the parent node.

A significant reason for ranking is to enable construction of BDDs using fewer bytes of electronic memory. The ranking affects the size in memory of BDDs. Larger BDDs increase running time of the software power estimation tool due to excessive paging of memory.

Figure 13:
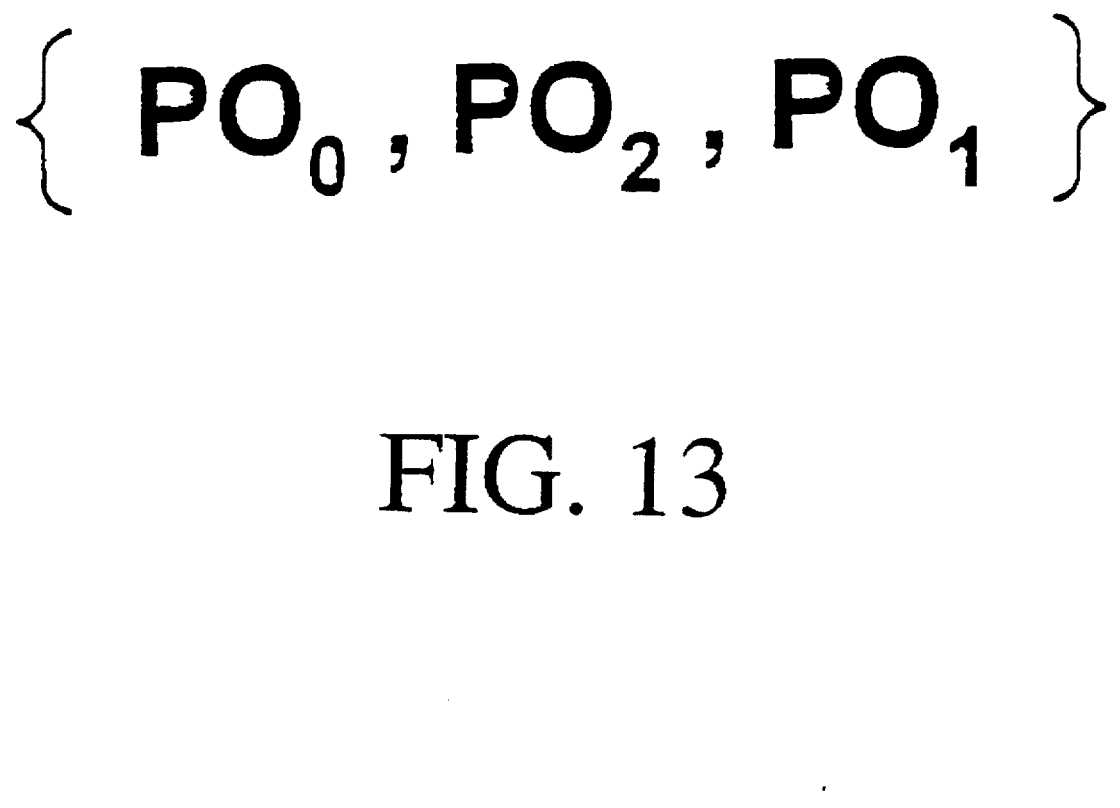
Figure 15:
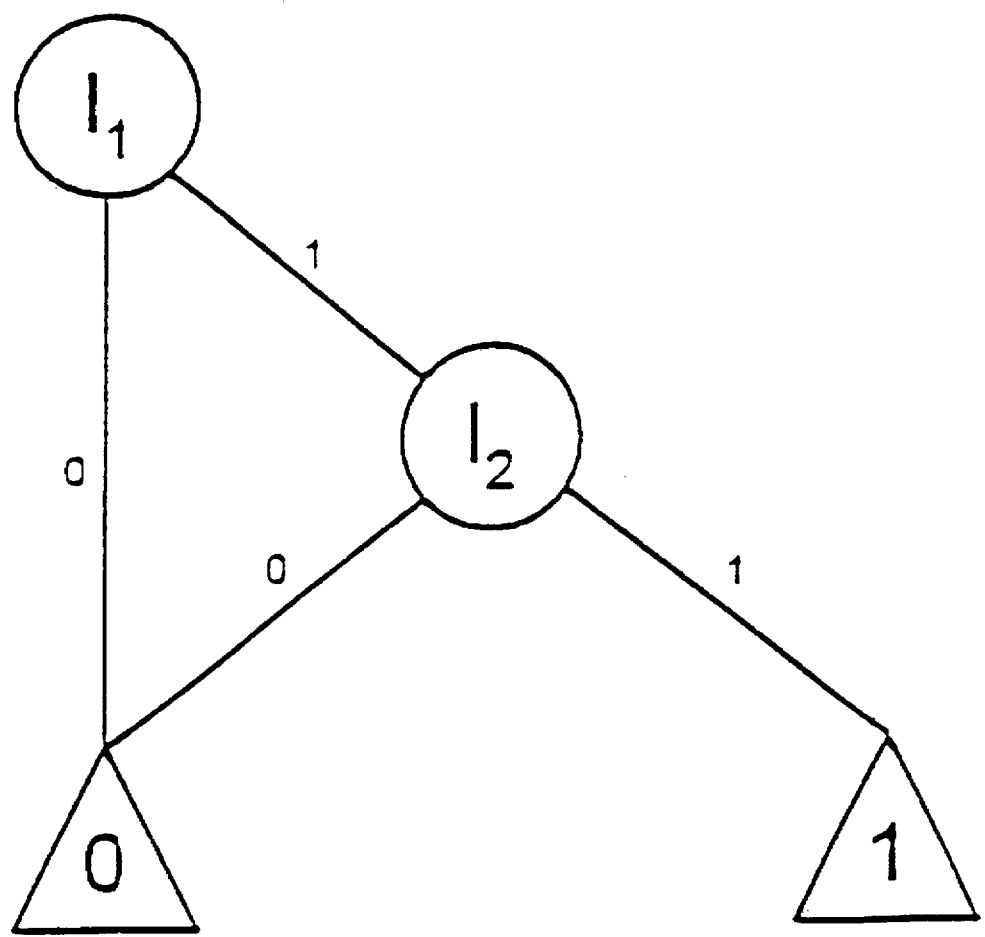
FIG. 15 illustrates a BDD for the netlist node that represents gate N1 of FIG. 14.
Figure 16:
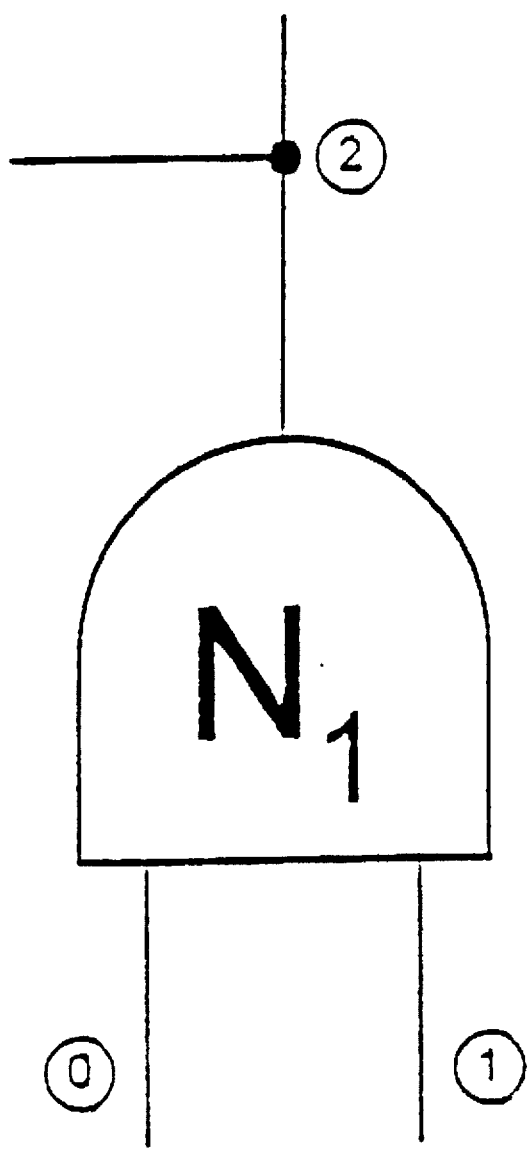
FIG. 16 illustrates the fanout counts of two nets that feed BDD (N1) illustrating that each are decremented by one to indicate that one of the netlist nodes fed by each of the fanouts has been processed.

A depth-first traversal begins with $PO_0$ based on the ranking illustrated in FIG. 13. The stored netlist representing the exemplary electronic circuit proceeds by first constructing a BDD for the netlist node representing the deepest logic level gate that feeds $PO_0$. Since the only gate that feeds $PO_0$ is N1, a BDD is constructed for the netlist node that represents gate N1. Referring to the illustrative drawings of FIG. 15, there is shown an illustrative BDD for the netlist node that represents gate N1. BDD (N1) is substituted into the netlist in place of the netlist node representing N1. Values then are calculated for static probability (SP) and toggle rate (TR) for the constructed BDD (N1). Next, as illustrated in FIG. 16, the fanout counts of the two nets that feed BDD (N1) each are decremented by one to indicate that one of the netlist nodes fed by each of the fanouts has been processed. The fanout counts that annotate the stored nets are used to monitor the processing of netlist nodes fed by the nets.

Figure 17:
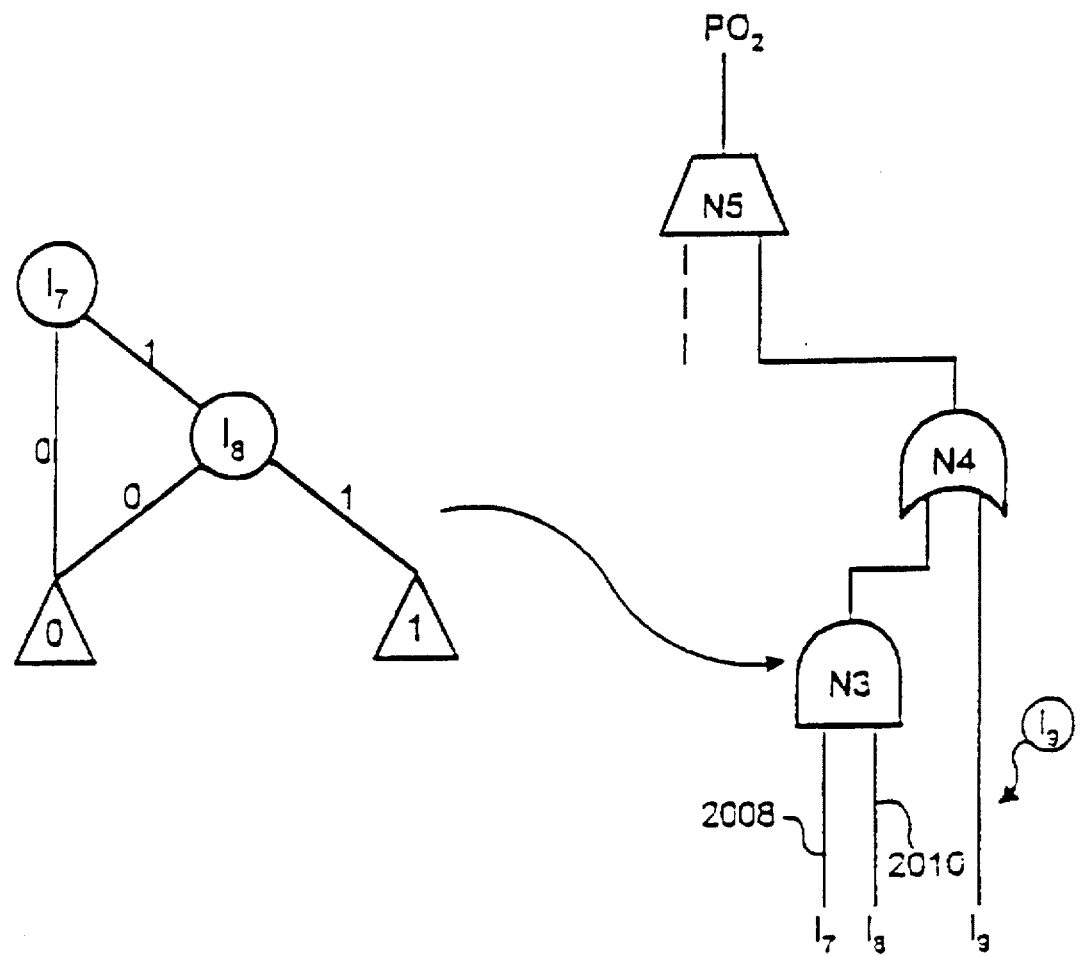
FIG. 17 illustrates a portion of the combinational logic that feeds into $PO_2$ of FIG. 14 for the exemplary circuit.

After the depth-first traversal for $PO_0$ has been completed, a depth-first traversal begins for the next ranked primary output $PO_2$. $PO_2$ has the next highest maximum logic level depth. Referring to the illustrative drawings of FIG. 17, there is shown a portion of the combinational logic that feeds into $PO_2$. Specifically, there is shown gate N3 which is at the deepest logic level feeding $PO_2$. N3 is three logic levels below $PO_2$. Gate N4 is two logic levels below N5. Gate N5 is one logic level below $PO_2$. As part of the depth-first traversal of $PO_2$, BDD (N3) is substituted into the netlist for the netlist node that represents N3. SP and TR values are computed for BDD (N3). The fanout controls on nets 2008 and 2010 are decremented by one so that each now equals 0.

Figure 18:
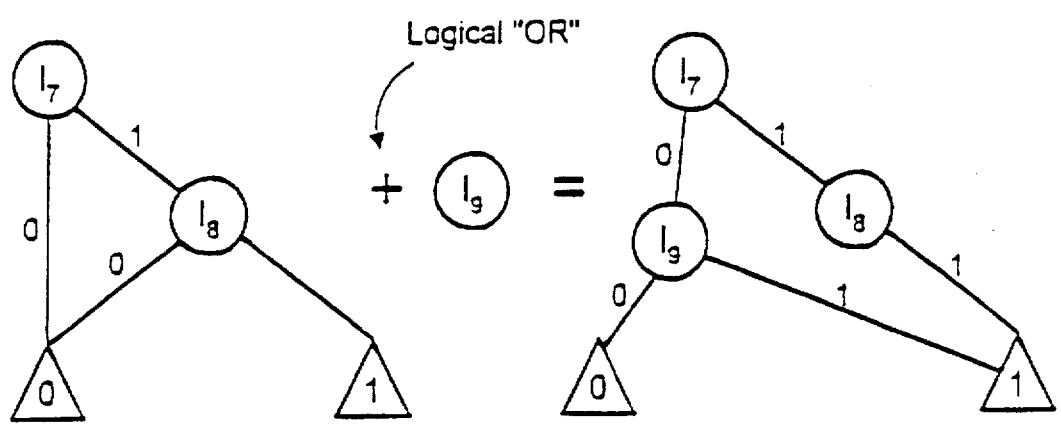
FIG. 18 illustrates a logic configuration of the exemplary circuit wherein BDD (N4) is composed from BDD (N3) and BDD (19).
Figure 19:
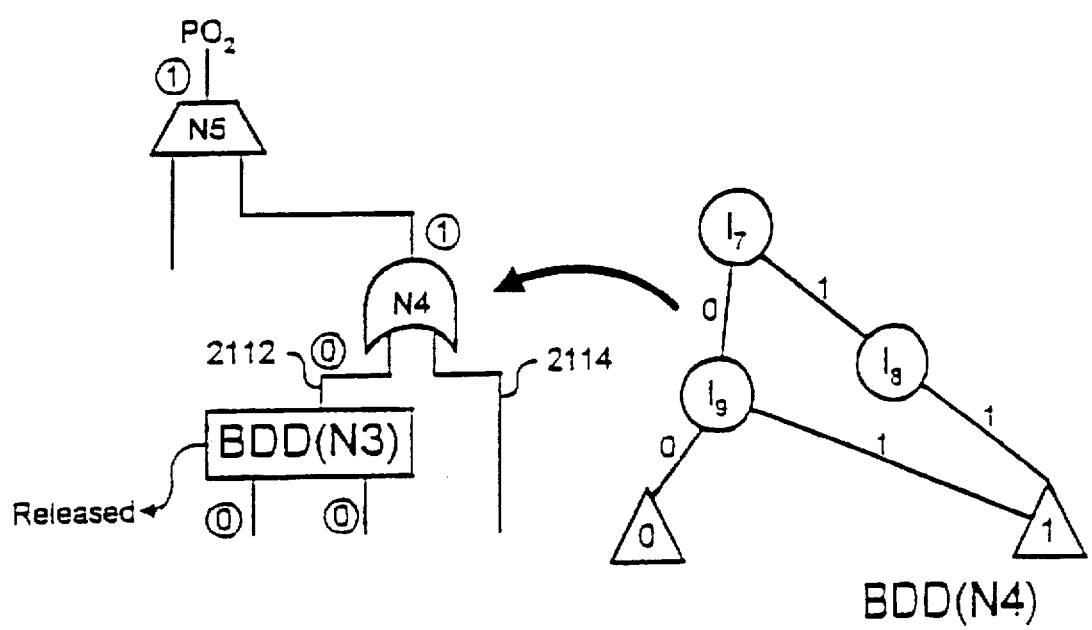
FIG. 19 is an illustration of a logic configuration of the exemplary circuit illustrating the substitution of BDD (N4) into the netlist for the netlist node representing gate N4.

Next, as indicated in FIG. 18, BDD (N4) is composed from BDD (N3) and BDD (I9). BDD (N4) is composed in accordance with a logical OR function consistent with the functionality of gate N4. FIG. 19 illustrates the substitution of BDD(N4) into the netlist for the netlist node representing gate N4. SP and TR values are computed for BDD (N4). The fanout counts of nets 2112 and 2114 each are decremented by one to indicate that one BDD fed by each of these two nets has been constructed, and has had an SP and a TR value computed for it. Since the fanout count of net 2112 is 0, BDD (N3) is released from the electronic memory. Likewise, a BDD(I3) representing primary input I9 can be released from memory. The release of BDD(N3) and BDD (I9) frees memory for other uses such as construction of further BDDs to replace further netlist nodes.

Figure 20:
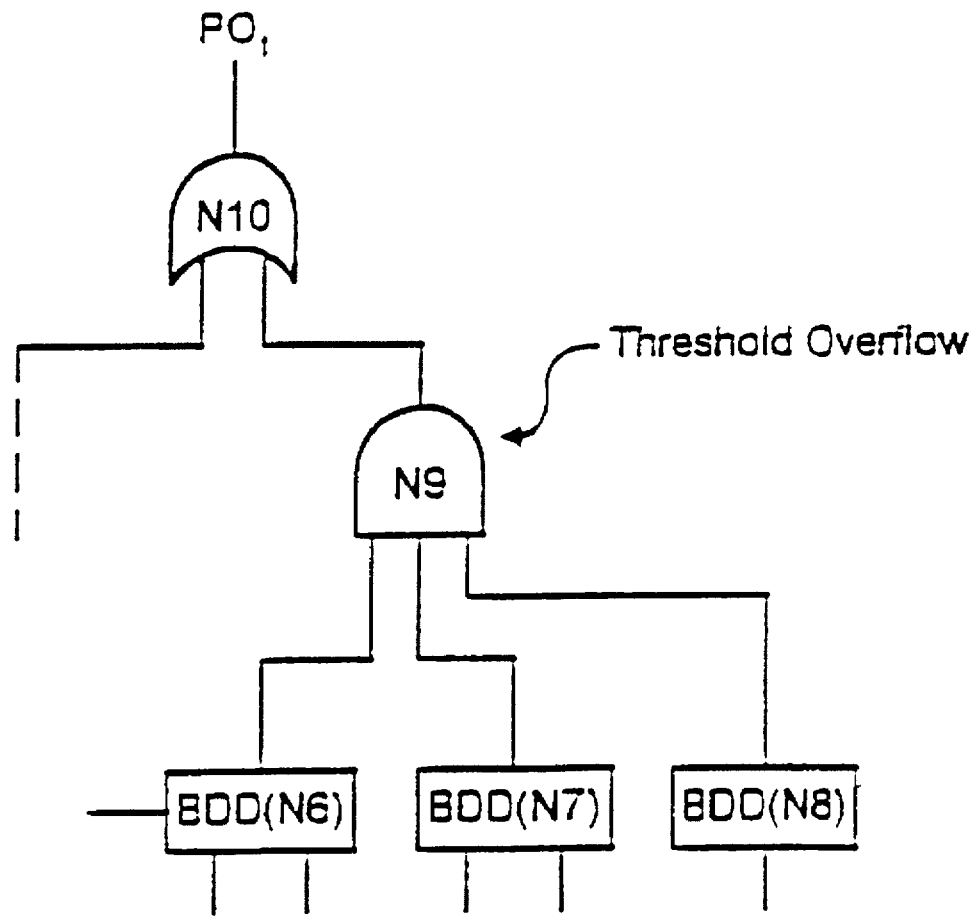
FIG. 20 illustrates a fragment of the electronic circuit which feeds $PO_1$ of FIG. 14 for the exemplary circuit configuration.

Referring to the illustrative drawing of FIG. 20, there is shown a fragment of the electronic circuit which feeds $PO_1$. A depth-first traversal of the combinational logic that feeds $PO_1$ is perforated last, since $PO_1$ has the largest maximum logic levels depth. In FIG. 20, it is presumed that depth-first traversal has progressed to the point that: BDD (N6) has been substituted for the netlist node that represents gate N6; BDD (N7) has been substituted for the netlist node that represents gate N7; and BDD (N8) has been substituted for the netlist node that represents gate N8. It is also presumed that during the construction of BDD (N9), there is an overflow of memory beyond the defined threshold value. That is, the amount of memory occupied by BDDs has "blown up" beyond a user defined threshold. It is further presumed in this example that the frontier includes BDD (N6), BDD (N7), BDD (N8).

In accordance with the techniques of the present invention, a BDD in the frontier that feeds the netlist node representing gate N9 and which occupies the largest amount of memory is released fast. A determination is made as to whether the memory freed through the release of that particular BDD is sufficient to bring the memory usage below the threshold. If it is not, then the BDD which occupies the next greatest amount of memory and that feeds the netlist node that represents the N9 is released from memory. A further determination is made as to whether the release of this additional BDD frees enough memory to bring BDD memory usage below the threshold.

Figure 21:
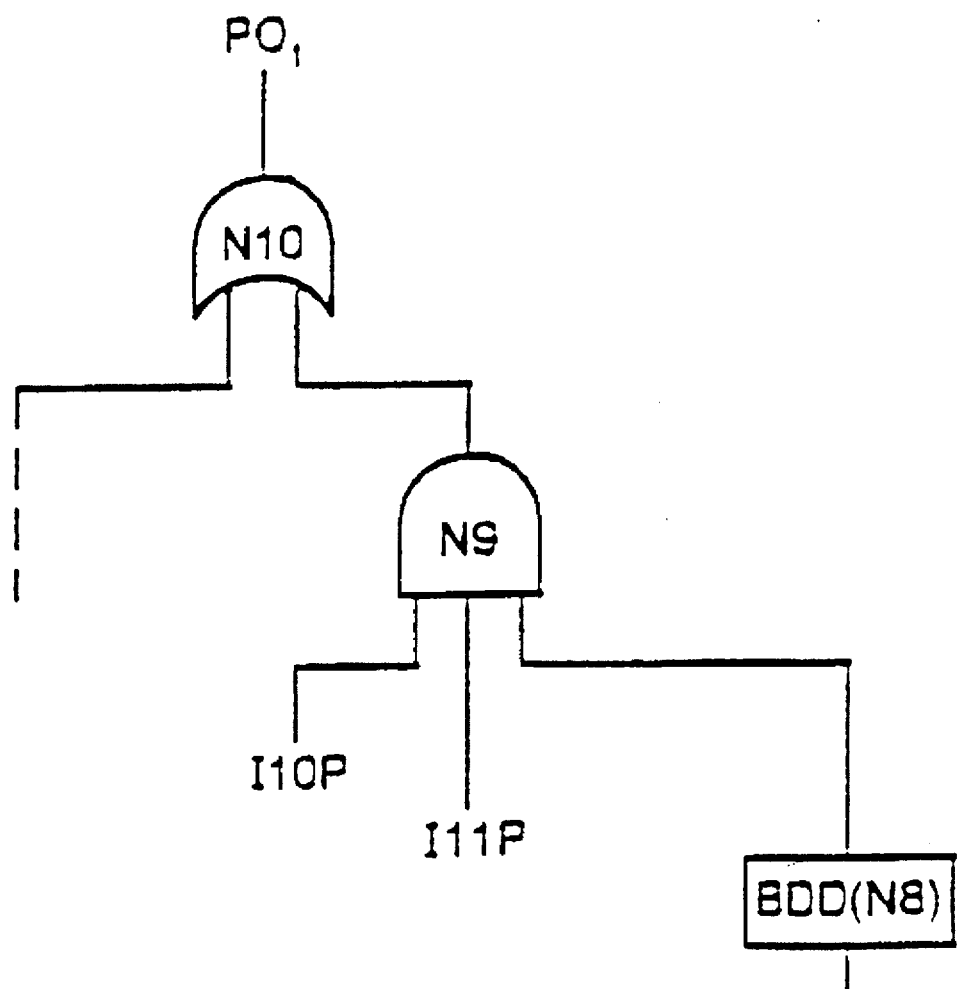
FIG. 21 illustrates an exemplary structure stored in the electronic memory after the removal of BDD (N6) and the removal of BDD (N7) for the exemplary circuit configuration.

It will be presumed that BDD (N6) and BDD (N7) occupy more memory than BDD (N8), and that both were released before BDD memory usage fell below the defined limit. Referring to the illustrative drawings of FIG. 21, there is shown an exemplary drawing of the structure stored in the electronic memory after the removal of BDD (N6) and the removal of BDD (N7). BDD (N6) is replaced with pseudo primary input I10P, and BDD (N7) is replaced with pseudo primary input I11.

The substitution of pseudo primary inputs reduces accuracy of the power estimation because any correlation that may have existed between this node and any other netlist node is now ignored for consequent analysis.

The technique for setting the memory threshold involves computing a value which is a percent (%) of the maximum allowed memory for the BDD construction. This number is computed empirically using rigorous experimentation. The goal is to release sufficient electronic memory to allow the consequent analysis to complete without running out of memory too often. For example, if maximum capacity set for a given circuit is 100 bytes then threshold may be 30% i.e. 30%×100=30 bytes.

2.4 Computing Toggle-rates in a Sequential Circuit: Overview 2.41 Constructing a State Element Graph (SEG)

Figure 5:
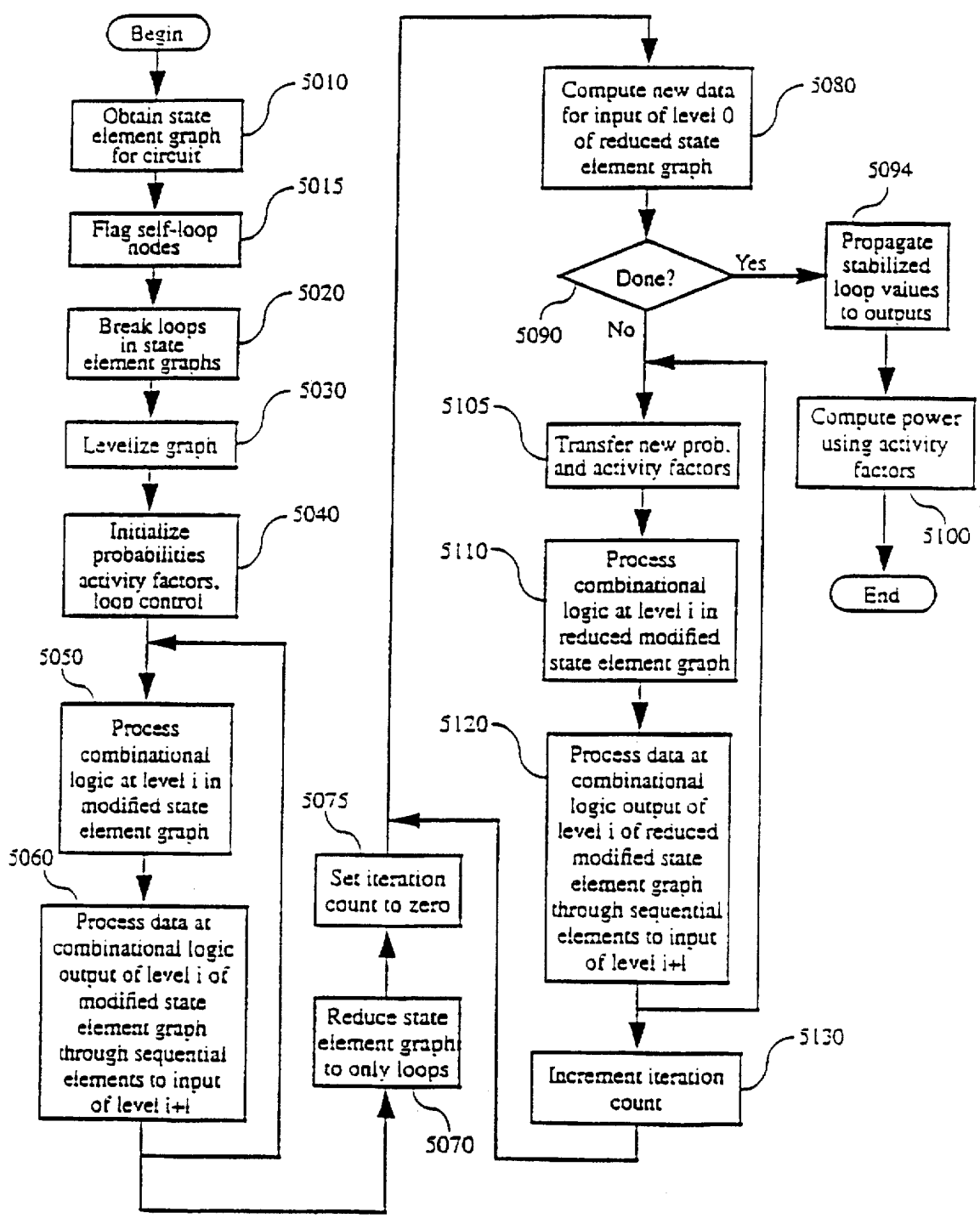
FIG. 5 shows a method for computing the stationary probabilities and activity for a circuit containing sequential elements.
Figure 6:
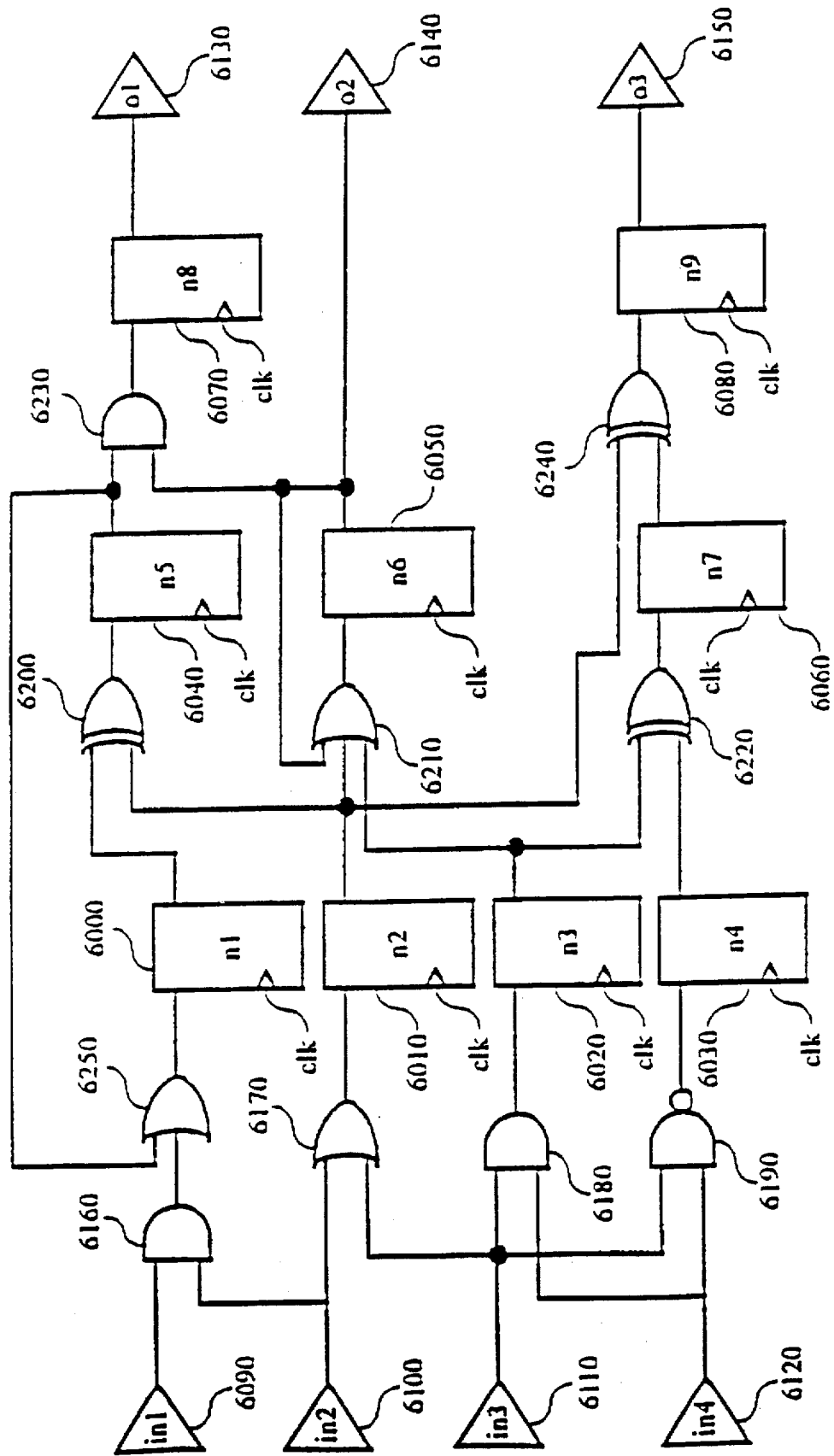
FIG. 6 shows a simple design containing combinational and sequential cells with nets connecting the gates.
Figure 7:
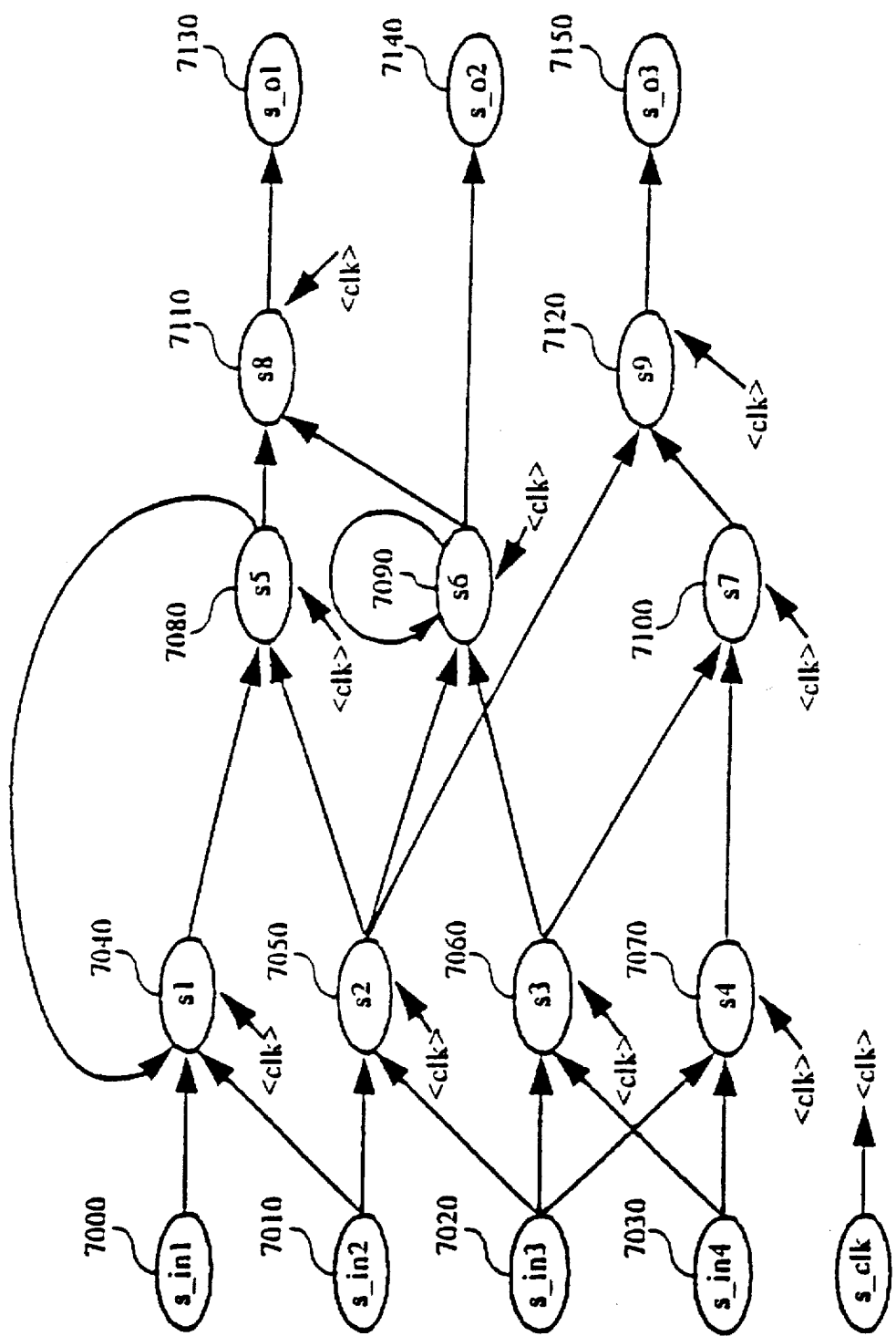
FIG. 7 shows a sample State Element Graph (SEG).

FIG. 5 shows the process for evaluating the toggle rates for a circuit that includes sequential elements. The process begins with step 5010 by obtaining a state element graph (SEG) for the circuit which represents the sequential elements as nodes and combinational logic connections between the sequential elements as directed arcs connecting the nodes. FIG. 6 shows an electronic circuit consisting of combinational gates (AND's, OR's and exclusive OR's), sequential gates (D flip-flops), and input/output ports. FIG. 7 shows the SEG derived from the circuit shown in FIG. 6. Initially there is a node for each sequential element. For example, flip-flops n1 through n9 in FIG. 6 become nodes s1 through s9 in FIG. 7. A directed arc connects sequential element i to sequential element j if there is a combinational logic path from the output of sequential element i to an input of sequential element j. For example, there is an arc between nodes s1 and s5 in FIG. 7 because of a combinational path (through an exclusive-OR) from flip-flops n1 to n5 in FIG. 6. The design's primary input ports and primary output ports are also represented as nodes in the SEG with appropriate arcs to nodes that correspond to sequential elements that are connected to the ports through combinational logic. For example, nodes s_in1 to s_in4 in FIG. 7 correspond to input ports in1 to in4 in FIG. 6. Similarly, nodes s_o1 to s_o3 in correspond to output ports o1 to o3 in FIG. 6.

The state element graph formed in step 5010 can contain cycles (also referred to as loops). A cycle exists if a path exists from a node back to itself traversing one or more directed arcs. Cycles can be self-loops where a node has an arc that originates and terminates at itself, or a cycle can consist of multiple cells. For example, there are two loops in the SEG shown in FIG. 7, one loop that goes through nodes s1 and s5, and one self-loop around node s6. Whether they are self-loops or multiple cells loops, cycles must be treated specially as the objective of the SEG is to transform the circuit into an acyclic representation of the circuit to enable serial processing of the design.

2.4.2 Flagging self-loops in the SEG

Before any changes are performed on the SEG, all self-loop nodes are flagged in step 5015. For example, the loop around node s6 is flagged during step 5015. By being able to distinguish nodes that have self-loops, the sequential propagation (step 5120) can be streamlined for the common case of non-self-loop nodes. This will be discussed further in Section 2.4.5.

2.4.3 Breaking cycles in the SEG

Figure 8:
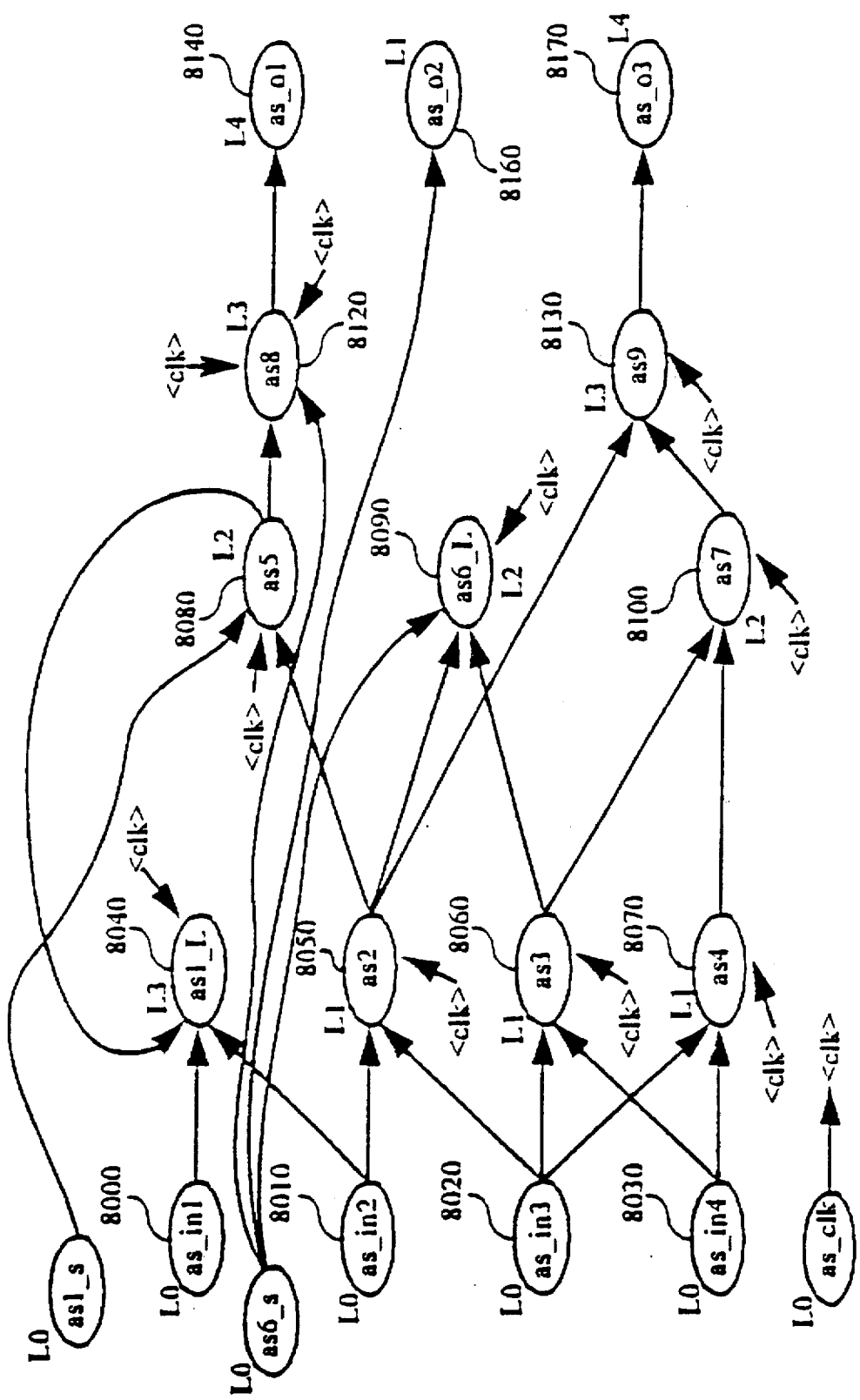
FIG. 8 shows a Modified State Element Graph that is created after all cycles in SEG are broken.

In step 5020, every cycle in the graph is broken by choosing one node of the cycle. When appropriate, the same node can be chosen to break multiple loops if the same node is contained in multiple loops. For example in FIG. 7, the loop through nodes s1 and s5 is broken by choosing either nodes s1 or s5. The self-loop around node s6 has to be broken by choosing node s6. After the selected nodes are chosen, each selected node is replaced with two nodes called the loop source node and the loop sink node. The arcs that terminated at the selected node are instead routed to that selected loop node's loop sink node. The arcs that originated from the selected node are instead connected to the corresponding loop source node. For example, FIG. 8 shows a SEG graph after loops have been broken. Nodes as2 to as5 correspond to nodes s2 to s5 in FIG. 7. Nodes as1_s and as1_l in FIG. 8 represent the source and loop versions of node s1 in FIG. 7. Similarly, nodes as6_s and as6_l in FIG. 8 correspond to the source and loop versions of node s6 in FIG. 7. After replacing all selected nodes, the state element graph will become acyclic.

One method for identifying the selected nodes to break the SEG is as follows. First work with a copy of the SEG. Determine which nodes to select to break the SEG in the steps below using the copy.

Second, identify any node that has an arc that comes back to itself. Mark every such self-loop node as a selected node, delete it from the copy of the SEG, and delete all arcs originating from it and entering into it. For example, node s6 in FIG. 7 is marked as a self-loop and then deleted. This will reduce the size of the SEG copy. As mentioned previously, the objective of this stage is to transform a cyclic SEG to an acyclic one. As nodes in the SEG are processed and deleted from the SEG, the size of the SEG will become reduced until the eventual stage when no nodes are left in the SEG copy. At that point, every cycle in the SEG has been broken.

Third, find every node that has no arcs entering it. Delete that node, and delete all arcs leaving such nodes. Again, this results in a smaller SEG. Repeat the third step on the compacted SEG until every node has arriving arcs.

Fourth, find every node that has no arcs originating from it. Delete that node, and delete all arcs entering such nodes. This too results in a smaller SEG. Repeat the fourth step on the compacted SEG until every node has departing arcs.

Fifth, identify every node that has exactly one arc entering and one are leaving (and that isn't a self-loop node). Delete that node and the departing arc. Reroute the arriving arc to the node where the departing arc went. Note that the new destination maybe the node where the arriving arc originated. Repeat this step on the SEG until there are no nodes with exactly one arc entering and one arc leaving.

Sixth, if any node at this point has a self-loop, mark it as a selected node, and delete it as was done in the second step, and return to the third step.

Seventh, if the sixth step did not result in the deletion of at least one node, identify the node that has the largest sum of the number of arcs entering and exiting. Mark that node as a selected node and delete it from the graph. Also delete any arcs entering or leaving the deleted node. Return to the third step. Repeat the third through seventh step until there are no nodes left in the SEG copy. The selected nodes are the ones to break the original SEG into a directed acyclic graph (DAG).

Another method for breaking cycles in a graph is given in *Introduction to Algorithms* by Thomas H. Cormen, Charles E. Leiserson and Ronald L. Rivest on pages 477–483. The book was published in 1993, has ISBN 0-262-03141-8, and is hereby incorporated by reference.

2.4.4 Processing the SEG

Step 5020 produces a modified state element graph (MSEG) from the SEG. Because the cycles are broken, the MSEG is a directed acyclic graph. The MSEG is used as an acyclic representation of the circuit to allow serial propagation of static probabilities and toggle rates from the MSEG's primary inputs to the MSEG's primary outputs. The MSEG's primary inputs consist of the design's primary input ports as well as outputs of sequential elements that were selected to break cycles in the original SEG. The MSEG's primary outputs consist of the design's primary output ports as well as inputs of sequential elements that were selected to break cycles in the original SEG.

The serial processing of the MSEG can be performed in two ways which tradeoff complexity versus efficiency. The first approach will be referred to as "Uniform MSEG Processing" because it always propagates static probabilities and toggle rates for every cell regardless of the step in the MSEG processing that is being performed. The second approach, referred to as "Modal MSEG Processing," is more efficient than the first approach, but it involves distinguishing the mode of the propagation based on the step in the MSEG processing that is being performed.

The Uniform MSEG processing strategy will be described fast followed by a description of how the Modal MSEG processing strategy differs from the Uniform processing strategy.

2.4.4.1 Uniform MSEG Processing

Step 5020 produces a modified state element graph (MSEG) from the SEG. Because the cycles are broken, the MSEG is a directed acyclic graph. In step 5030, the nodes of the MSEG are labeled with their appropriate level numbers. To do this, label each node having no inputs with 0. The level number of a node is 0 if it has no predecessor, or its level number is one more than the maximum level number of any of that node's immediate predecessors.

In step 5040, assign static probabilities and toggle rates to the inputs of the combinational logic circuits corresponding to the arcs in the MSEG that originate from any level 0 node or from any primary input. The static probabilities and toggle rates could be user specified, they could be estimated from simulation, or they could be chosen arbitrarily. Define a level counter and set it equal to one.

In step 5050, compute the toggle rates and the static probabilities of the internal nets of the combinational logic that terminates at a node whose level number equals the current level counter value using the methods described in FIG. 4.

In step 5060, compute the toggle rates and the static probabilities of the outputs of the sequential elements at nodes with level equal to the level counter value. As described in Section 2.4.5, the toggle rates and static probabilities of the outputs of sequential elements are computed as a function of the toggle rates and static probabilities of the sequential element's inputs.

After this, increment the level counter and repeat steps 5050 and 5060 until all of the levels have been processed.

At this point, the static probabilities and toggle rates have been computed for every net in the design. This method will produce static probabilities and toggle rates at the output of the loop sink nodes. Recall that each node in the state element graph that was selected to break cycles in the state element graph has a loop source node and a loop sink node. These nodes correspond to the same sequential element, and therefore the output of a loop sink node and the output of the loop source node correspond to the same physical point in the circuit (an output of a sequential cell), and they should have the same static probabilities. However, because the initial probabilities for the selected node loop source nodes (assigned in step 5040) may have been arbitrary estimates or defaults, a single pass through the design (steps 5050–5060) will generally not yield convergence of static probabilities values for the selected nodes. Therefore, iterate on the entire design until the static probabilities of the loop sink nodes and loop source nodes converge.

Step 5070 reduces the MSEG to eliminate nodes that can not be affected by iteration. Step 5070 constructs the reduced modified state element graph (RMSEG). As was described in step 5020, the selected node set contains all nodes that were chosen to break cycles in the SEG. In the MSEG, every selected node actually consists of two nodes (a source node and a loop node) that correspond to a single sequential element. Construction of the RMSEG starts by determining the nodes that can be reached from the selected node source nodes. A particular node is reached if there is a path in the MSEG from a selected node source node to that particular node. All unreached nodes can be deleted. In addition, the nodes that are not part of any path leading to a loop sink node can be temporarily deleted until the iteration is complete. The RMSEG should be relevelized using the method of step 5030. Also, set an iteration count equal to zero as shown in step 5085.

Step 5080 determines whether the static probabilities at the output of the selected node sink nodes are sufficiently close to the static probabilities at the output of the selected node source nodes. If the smaller value is within a certain tolerance (e.g. 1%) of the larger value, then the sequential cell's values are assumed to have converged. If the static-probabilities have converged for all of the selected nodes in the MSEG, or if the number of iterations (through the loop comprising step 5080, step 5090, step 5105, step 5110, step 5120, and step 5130) has exceeded a predefined threshold number, then the iteration is terminated.

If the result of step 5080 terminates the iteration, then the toggle rates and static probabilities need to be propagated through the nodes that were temporarily deleted (in step 5070) because they were not part of a path leading to a loop sink node. Step 5094 percolates the toggle rates and static probabilities through the remainder of the circuit as was done with the MSEG in step 5050 and 5060.

If, on the other hand, the remit of step 5080 indicates that the static probabilities of the selected sequential cells have not converged to steady-state values, then the iteration must continue. In that case, step 5105 transfers the static probabilities and toggle rates from the loop sink node output to the corresponding loop source node output. The RMSEG is processed in step and step 5120 as the MSEG was processed in step 5050 and step 5060.

After completing one iteration of the RMSEG, the iteration-count is incremented in step 5130 and the convergence criteria is re-evaluated in step 5080.

2.4.4.2 Extensions for Modal MSEG Processing

During Modal MSEG processing, every net that feeds into an MSEG node (e.g. sequential input nets) can be in one of two modes:

1) "sp-only" mode: Under this mode, MSEG processing only propagates static probabilities (not toggle rates) for an endpoint net and all of the nets in the transitive fanin of its combinational paths.

2) "sp-and-tr" mode: Under this mode, MSEG processing propagates both static probabilities and toggle rates for an endpoint net and all of the nets in the transitive fanin of its combinational paths.

These modes modify the behavior of steps 5040, 5050–5060, 5110–5120, and 5094. Otherwise, the MSEG processing steps described in Section 2.4.5.3 are unaffected.

When Modal processing is enabled, step 5040 must also determine the mode of every endpoint net for each level. These endpoint nets represent inputs of sequential cells or primary output ports of the design. The mode of each such output net defaults to "sp-only". However, if the net is being used to drive any asynchronous logic (e.g. asynchronous preset, latch enable, or flip-flop clock), the net's mode is set to "sp-and-tr". The mode of a net applies to that net and all of its transitive fanin nets in combinational logic paths that feed that endpoint. Distinguishing the nets in this manner is valid because the toggle rates of synchronous sequential inputs doesn't affect the toggle rate of the sequential cell's output(s). Therefore, it is unnecessary to spend the time to compute those toggle rates during the MSEG processing, and, consequently, significant processing time can be saved. For example, for a standard D flip-flop with two inputs, D and CLK, and one output, Q, the toggle rate of Q is a function of the static-probability of D and the toggle rate of CLK, but not the toggle rate of D. The formulation for propagating static probabilities and toggle rates across sequential elements is described further in Section 2.4.5.

Depending on the mode of an endpoint net, it will be handled differently by steps 5050–5060 and steps 5110–5120. If an endpoint was marked as an "sp-only" net, then the combinational propagation strategy only computes the static-probability of that net. This enables significant run-time improvements since toggle rate values don't need to be computed for that endpoint nor for any of the nets in the transitive fanin of the combinational path that feeds that endpoint. If, however, the endpoint is marked as an "sp-and-tr" net, the net will be processed normally as described in Section 2.4.4.1 (steps 5050–5060 and steps 5110–5120).

When Modal processing is enabled, step 5094 is extended to operate on all nets in the design. Normally, after step 5090 terminates iteration on the MSEG, step 5094 only operates on nets that are in the transitive fanout of the selected node sink nodes to ensure that all nets in the design are annotated with valid static probability and toggle rate values. If Modal processing is enabled, step 5094 instead operates on all nets in the design. This ensures that toggle rates are computed for any nets which may have only had their static probabilities computed during the Model MSEG processing.

2.4.4.3 Additional Examples of SEG and MSEG Processing

Figure 22A:
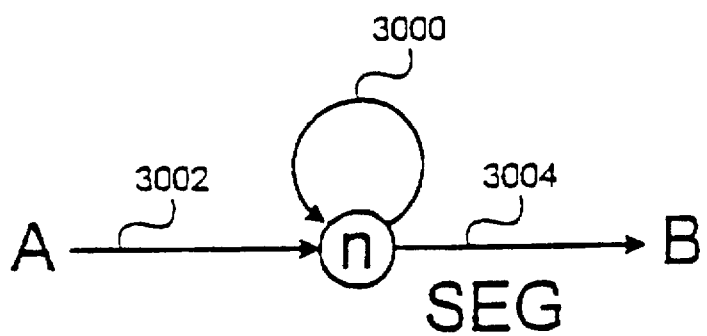
FIG. 22A and FIG. 22B illustrate simplified illustrative drawings of a sequential element graph (SEG) and a corresponding modified sequential element graph (MSEG) in accordance with the present invention.
Figure 22B:
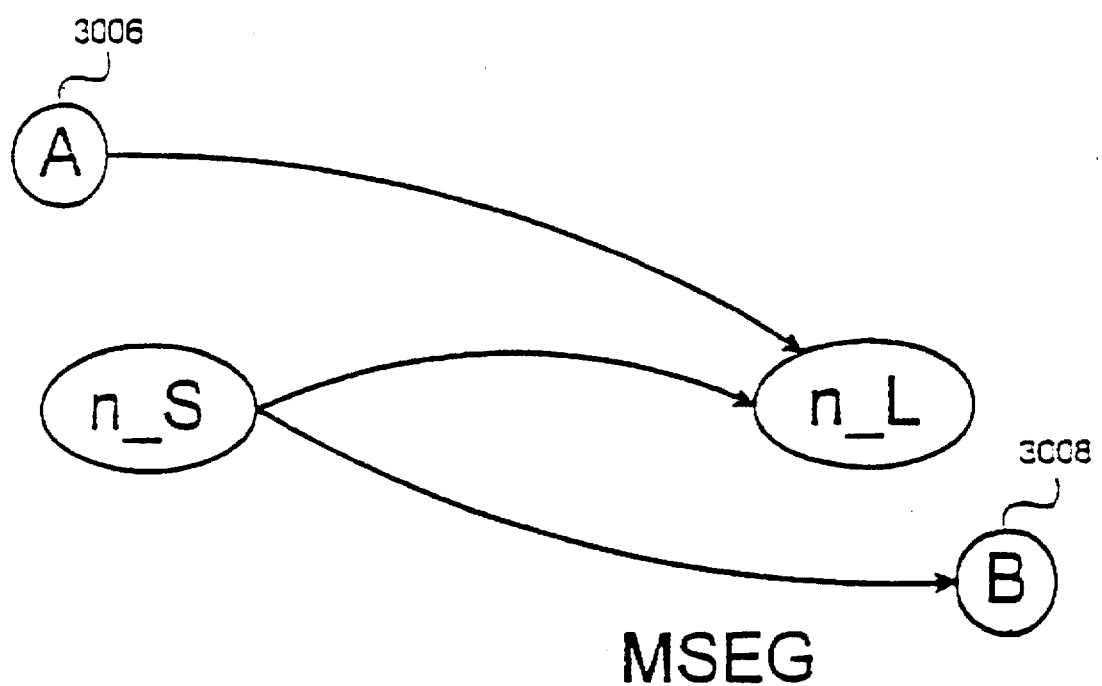

Referring to the FIG. 22a and FIG. 22b, there are shown simplified illustrative drawings of a sequential element graph (SEG) and a corresponding modified sequential element graph (MSEG). Referring to FIG. 22a, the SEG includes a node n which receives an input from node A and provides an output to node B. The node n also has a directed self-loop arc 3000. The MSEG is presumed to correspond to a netlist which is not shown. In particular, the node n corresponds to a sequential element. The self-loop arc 3000 corresponds to a group of netlist nodes that represent a group of combinational logic that propagates both to and from the sequential element to which node n corresponds. The directed arc 3002 directed from node A to node n also corresponds to a group of netlist nodes that represent a group of combinational logic that propagates signals from input A to the node. The directed arc 3004 between a node n and node B corresponds to yet another group of netlist nodes that represent another group of combinational logic that propagates signals from node n to node B.

In FIG. 22b, the node n has been split into two nodes, n_s and n_l. New pseudo primary input node 3006 has been created, and a new pseudo primary output node 3008 has been created. A directed arc has its origin at node 3006 and its destination at the split load node n_l corresponds to arc 3002. A directed arc has an origin at the split source node n_s and its destination split load node n_l. A directed arc has its origin at the split source node and its destination at node 3008.

The split source node n_s and the split load node n_l both represent the same node: n. Thus, they both correspond to the same single sequential element that corresponds to node n. Moreover, directed arcs 3002 and 3002' both correspond to the same group of combinational logic represented by the same group of netlist nodes stored in memory. Similarly, the directed arcs 3000 and 3000' both correspond to the same group of combinational logic that is represented by the same group of netlist nodes stored in memory. Finally, the directed arcs 3004 and 3004' both represent the same group of combinational logic represented by the same netlist nodes stored in electronic memory.

The creation of two split nodes n_s and n_l provides a guide in the form of the MSEG for serial processing of the netlist stored in the electronic memory. Self-loop arc 3000 has been replaced by an acyclic arc 3000'. Thus, there are no more cycles in the MSEG. The techniques of the present invention advantageously use an MSEG as a guide for serial processing of cyclic sequential circuits for the purpose of estimating average power consumption in accordance with the invention.

Figure 23A:
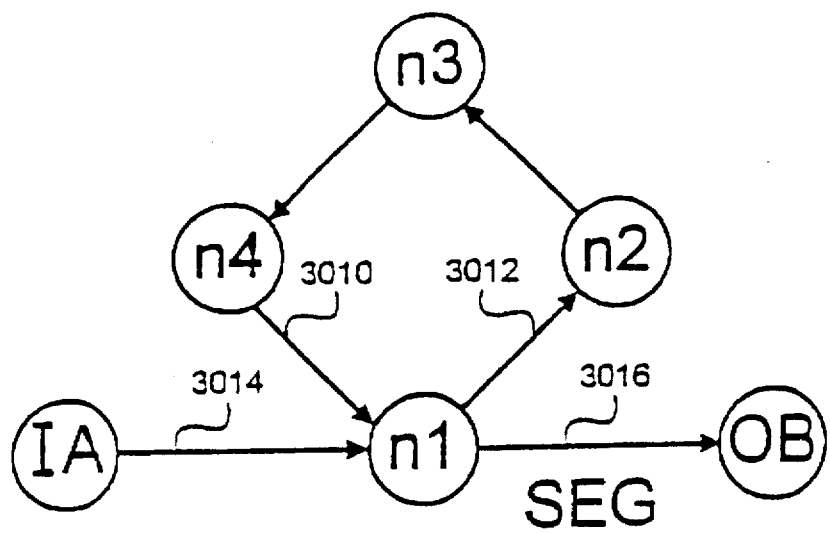
FIG. 23A and FIG. 23B illustrate a SEG which contains a node loop (e.g., a cyclic graph) and a corresponding MSEG (without cycles).
Figure 23B:
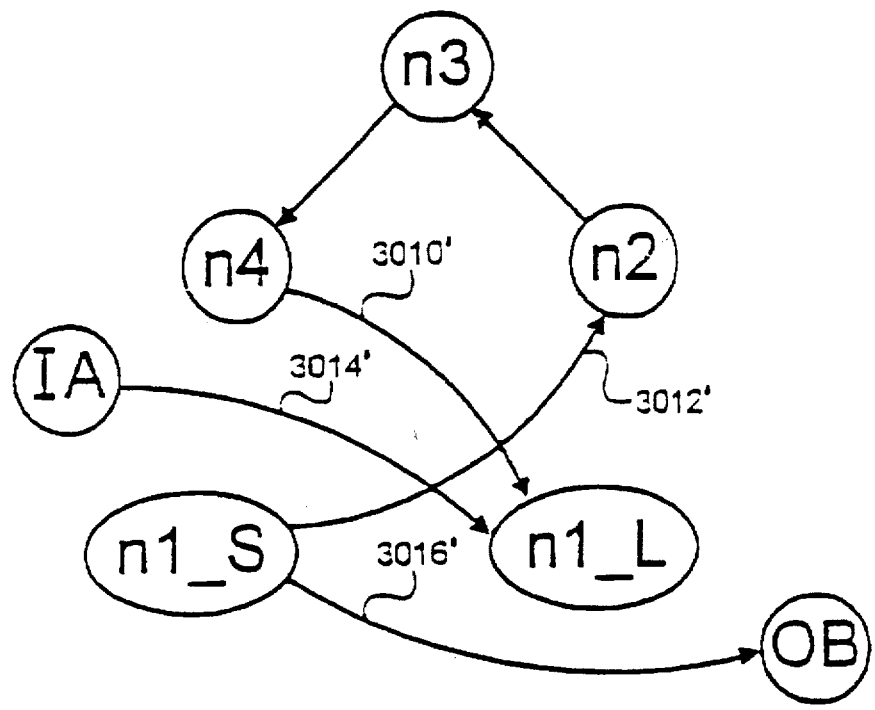

Referring to the illustrative drawings of FIG. 23a and FIG. 23b, there is shown a SEG and a corresponding MSEG. The SEG includes node n1–n4 and IA and OB, in a directed graph as shown. Nodes n1–n4 form a loop. Hence, the SEG in FIG. 23a represents a cyclic graph. The loop is broken by removing node n1 and substituting in place of it source node n1_s and load node n1_l. The directed arc 3110 which originates at n4 and has a destination at n1 is replaced by arc 3110' which originates at n4 and has a destination at n1_l. In practice, directed arc 3110' can be produced by merely changing its destination pointer to indicate that n1_l is its new destination. Similarly, directed arc 3012 is replaced by directed arc 3012'. Arc 3014 is replaced by arc 3014', and arc 3016 is replaced by arc 3016'.

Figure 24:
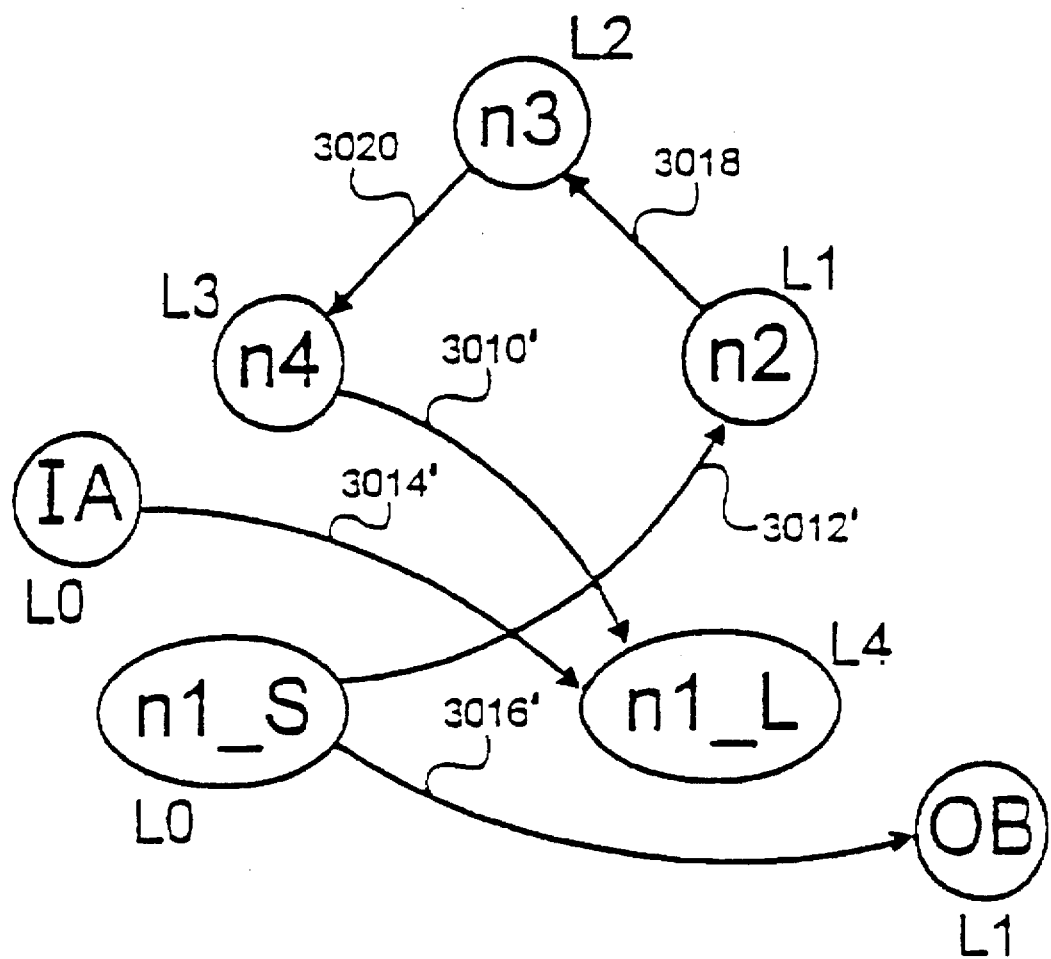
FIG. 24 illustrates a leveling process used in accordance with the present invention to group netlist nodes which are to be processed together.

Since there are no cycles in the MSEG, the combinational logic between the sequential elements represented by the nodes n1_s, n1_l, and n2–n4, can be processed serially to produce switching activity values. However, before such processing can occur, a determination must be made as to which groups of netlist nodes can be processed together. This grouping of netlist nodes to be processed together is accomplished through a levelization process described in relation to FIG. 24.

Primary inputs such as IA are set to level L0. n1_s also is grouped at L0 since it has no arcs directed to it. Since n2 receives its sole directed arc 3012' from n1_S, n2 is at L1. n3 receives its sole directed arc 3018 from n3. Hence, n3 is at L2. n4 receives its only directed arc 3020 from N3. Thus, n4 is at L3. n1_l receives directed arc 3010' from n4 which is at L3. n1_l also receives directed arc 3014' from IA which is L0. Since the highest level node that n1_l receives an arc from is L3, n1_l is placed at L4. Finally, OB receives a directed arc 3016' from N1_s. Consequently, OB is at L1.

The following chart summarizes the levelization results.

| LEVEL | NODES |
| --- | --- |
| L0 | IA, n1_s |
| L1 | n2, OB |
| L2 | n3 |
| L3 | n4 |
| L4 | n1_l |

Once the MSEG has been levelized, the netlist stored in electronic memory can be processed to estimate the average power consumption. For example, L1 processing begins by computing activity values for the group of netlist nodes that correspond to the arc 3012' and 3016'. Arcs, 3012' and 3016' are grouped in L1 since each feed nodes, n2 and OB respectively, in L1. The starting SP and TR values provided by n1_s are assigned and are refined iteratively as explained below.

L2 processing commences as the activity values computed for the group of netlist nodes that correspond to directed arc 3012' are transferred across n2 and are used as primary inputs during the computation of activity level values for the group of netlist nodes that correspond to the directed arc 3018 which originates at n2 and terminates at N3. Arc 3018 is in L2 since it feeds n3 which is in L2.

L3 processing starts as the activity values computed in connection with are 3018 are transferred across n3 and are used as primary inputs for the computation of activity values for the group of netlist nodes that correspond to are 3020. Arc 3020 is in L3 since n4 which receives are 3020 is in L3.

L4 processing begins as the activity values calculated in connection with are 3020 are transferred across n4 and are used as primary inputs in connection with the computation of activity values for a group of netlist nodes that correspond to are 3010'. Similarly, the primary input IA is used in computation of activity values for the group of netlist nodes that correspond to the arc 3014'. Arcs 3010' and 3014' each are in L4 since n1_l which they both feed is in L4. When activity values have been computed for the entire MSEG, a comparison is made between the activity values originally assigned to n1_s and the activity values computed for n1_l. If they have not converged to within a predefined threshold value, values computed values for n1_l are used in a next iteration as assigned values for n1_s. The entire process described above repeats. If at the end of the process, the assigned values for n1_s have not converged sufficiently with the computed values of n1_s, then, once again, the newly computed input values to n1_l become the assigned values for n1_s during a next iteration of the process. This interative process repeats until the computed values of n1_l converge with the assigned values of n1_s, or until the system has reached a predefined maximum number of allowable iterations.

A reason for seeking convergence is that nodes n1_s and n1_l in fact represent the same node n1. Thus, the assigned value of that node's split source n1_s should be the same as the computed value of that node's split load n1_l. If the values are different, then there may have been significant error introduced by splitting node n1. The iteration process aims to reduce that error through convergence of assigned n1_s values and computed n1_l values.

2.4.5 Transferring Static Probabilities and Toggle-rates Across Sequential Elements Step 5060 helps establish accurate static probabilities and toggle rates in electronic circuits containing sequential elements like flip-flops and latches. It involves computing the static probabilities and the toggle rates of the output of a sequential element from the static probabilities and toggle rates of the inputs. Step 5060 is decomposed into 5 sub-tasks explained in detail below.

The first task is to identify a genetic sequential element that can capture the general synchronous and asynchronous behaviors of many types of commonly encountered sequential elements.

The second task is to describe each type of commonly encountered sequential element as combinational logic connected to the inputs of the generic sequential element selected in the first step.

The third task is to characterize the toggle rates and the static probabilities of the outputs of the generic sequential element as relatively simple functions of the inputs.

The fourth task is to replace each actual sequential element in the circuit with its generic equivalent.

The fifth task is to use the methods for computing static probabilities and toggle rates described in earlier sections to compute each sequential element's static probability and toggle rate.

Each of these tasks will be described in turn in the following sections.

2.4.5.1 Task 1: Defining and Using a Generic Sequential Element

This section introduces a model for sequential element. This model can represent all flip-flops and latches, and in general any sequential element that consists of a single state. Sequential elements that encompass multiple states, like Master-Slave latches, counters and RAM's, are not covered by the model. That is, multiple state sequential elements cannot be represented by a single instance of the proposed model. However, they can be represented by multiple instances of the general sequential model. The generic model of a sequential element (GEN) is a cell with 6 inputs and 2 outputs. Table 1 explains the meaning of these pins. Table 2 describes commonly used sequential elements using this model.

TABLE 1

Generic sequential cell (GEN)

| Pin | Type | Function |
|-----|------|----------|
| sync | Input | synchronous behavior of cell (fsync) is input to this pin. |
| ck | Input | function driving the clock pin. (fclk) |
| f00 | Input | asynchronous behavior resulting in Q=0, QB=0($f_{00}$) |
| f01 | Input | asynchronous behavior resulting in Q=0, QB=1($f_{01}$) |
| f10 | Input | asynchronous behavior resulting in Q=1, QB=0($f_{10}$) |
| f11 | Input | asynchronous behavior resulting in Q=1, QB=1($f_{11}$) |
| Q | Output | output function 1 |
| QB | Output | output function 2 |

TABLE 2

Commonly used sequential gates

| Cell | Nu | $f_{sync}$ | $f_{clk}$ | $f_{00}$ | $f_{01}$ | $f_{10}$ | $f_{11}$ |
|------|----|-----------|-----------|----------|----------|----------|----------|
| D flop | 1 | D | CK | 0 | 0 | 0 | 0 |
| Scan D | 2 | D*!T+I*T | CK | 0 | 0 | 0 | 0 |
| D w/clear | 3 | D | CK | 0 | CL | 0 | 0 |
| Scan D /clear | 4 | D*!T+I*T | CK | 0 | CL | 0 | 0 |
| D w/clear/set | 5 | D | CK | CL * ST | CL * !ST | !CL * ST | 0 |
| Scan D cl/set | 6 | D*!T+I*T | CK | CL * ST | CL * !ST | !CL * ST | 0 |
| D flop w/set | 7 | D | CK | 0 | 0 | ST | 0 |
| Scan D w/set | 8 | D*!T+I*T | CK | 0 | 0 | ST | 0 |
| JK flop | 9 | !J*!K*Q<br>+J*!K<br>+J*K*!Q | CK | 0 | 0 | 0 | 0 |
| Scan JK | 10 | !J*!K*!T*!Q<br>+J*!K*!T<br>+J*K*!T*!!Q<br>+I*T | CK | 0 | 0 | 0 | 0 |
| JK w/clear | 11 | !J*!K*Q<br>+J*!K<br>+J*K*!Q | CK | 0 | CL | 0 | 0 |
| Scan JK w/clear | 12 | !J*!K*!T*!Q<br>+J*!K*!T<br>+J*K*!T*!!Q<br>+I*T | CK | 0 | CL | 0 | 0 |

TABLE 2-continued

Commonly used sequential gates

| Cell | Nu | $f_{sync}$ | $f_{clk}$ | $f_{00}$ | $f_{01}$ | $f_{10}$ | $f_{11}$ |
|---|---|---|---|---|---|---|---|
| JK flop w/clear/set | 13 | !J*!K*Q +J*!K +J*K*!Q | CK | CL * ST | CL * !ST | !CL * ST | 0 |
| Scan JK w/clear/set | 14 | !J*!K*!T*!Q +J*!K*!T +J*K*!T*!Q +I*T | CK | CL * ST | CL * !ST | !CL * ST | 0 |
| Latch | 15 | 0 | | 0 | G*!D | G*D | 0 |
| Latch inv | 16 | 0 | | 0 | !G*!D | !G*D | 0 |
| Latch w/clear | 17 | 0 | | 0 | G*!D+C | G*D*!C | 0 |
| Latch inv w/clear | 18 | 0 | | 0 | !G*!D+ | !G*D*!C | 0 |
| Sync en D | 19 | D * EN | CK | 0 | 0 | 0 | 0 |
| Sync enable feedback D | 20 | EN * (D*S +Q*!S) | CK | 0 | 0 | 0 | 0 |
| T flop w/clear | 21 | !Q | CK | 0 | CL | 0 | 0 |
| T flop w/set | 22 | !Q | CK | 0 | 0 | ST | 0 |
| SR latch | 23 | 0 | | 0 | S*R | !S*R | S*!R | 0 |
| set/clear D | 24 | D | CK | 0 | CL*!ST | !CL*ST | 0 |
| mux D w/clear | 25 | S*D+!S*Q | CK | 0 | CL | 0 | 0 |
| Gated clock | 26 | D | E*C | S*R | !S*R | S*!R | 0 |

TABLE 3

Application of the sequential model equation

| Cell | Nu | Sequential model equation (for Q plus) |
|---|---|---|
| D flop | 1 | CK*!CKP*D+(!CK+CKP)*Q |
| Scan D | 2 | CK*!CKP*(D*!T+I*T)+(!CK+CKP)*Q |
| D w/clear | 3 | (CK*!CKP*D+(!CK+CKP)*Q)*!CL |
| Scan D /clear | 4 | (CK*!CKP*(D*!T+I*T)+(!CK+CKP)*Q)*!CL |
| D w/clear/set | 5 | (CK*!CKP*D+(!CK+CKP)*Q+ST)*!CL |
| Scan D cl/set | 6 | (CK*!CKP*(D*!T+I*T)+(!CK+CKP)*Q+ST)*!CL |
| D flop w/set | 7 | CK*!CKP*D+(!CK+CKP)*Q+ST |
| Scan D w/set | 8 | CK*!CKP*(D*!T+I*T)+(!CK+CKP)*Q+ST |
| JK flop | 9 | CK*!CKP*(!J*!K*Q+J*!K+J*K*!Q)+(!CK+CKP)*Q |
| Scan JK | 10 | CK*!CKP*(!J*!K*!T*Q+J*!K*!T+J*K*!T*!Q+I*T)+(!CK+CKP)*Q |
| JK w/clear | 11 | (CK*!CKP*(!J*!K*Q+J*!K+J*K*!Q)+(!CK+CKP)*Q)*!CL |
| Scan JK w/clear | 12 | (CK*!CKP*(!J*!K*!T*Q+J*!K*!T+J*K*!T*!Q+I*T) +(!CK+CKP)*Q)*!CL |
| JK flop w/clear/set | 13 | (CK*!CKP*(!J*!K*Q+J*!K+J*K*!Q)+(!CK+CKP)*Q+ST)*!CL |
| Scan JK w/clear/set | 14 | (CK*!CKP*(!J*!K*!T*Q+J*!K*!T+J!K*!T*!Q+I*T) +(!CK+CKP)*Q+ST)*!CL |
| Latch | 15 | G*D+!G*Q |
| Latch inv | 16 | !G*D+G*Q |
| Latch w/clear | 17 | (G*D+!G*Q)*!CL |
| Latch inv w/clear | 18 | (!G*D+G*Q)*!CL |
| Sync en D | 19 | !CK*CKP*D*EN+(CK+!CKP)*Q |
| Sync enable feedback D | 20 | !CK*CKP*EN*(D*S+Q*!S)+CK+!CKP)*Q |
| T flop w/clear | 21 | (!CK*CKP*!Q+(CK+!CKP)*Q)*!CL |
| T flop w/set | 22 | (!CK*CKP*!Q+(CK+!CKP)*Q)+ST |
| SR latch | 23 | (Q+S)*!R |
| set/clear D | 24 | (!CK*CKP*D+(CK+!CKP)*Q)*(!CL+ST)+ST*!CL |
| mux D w/clear | 25 | !CK*CKP*(S*D+!S*Q)+(CK+!CKLP)*Q |
| Gated clock | 26 | ((!C+!E)*(CP*EP)*D+(C*E+!CP+!EP)*Q+ST)*!CL |

A sequential cell usually has two outputs Q and QB. If Q and QB are opposite to each other (e.g., flip-flops with no asynchronous behavior, D-latches, etc.), Q and QB are said to be "related." When Q and QB are not opposite to each other, the two outputs are said to be "unrelated."

A1. Assumption: The asynchronous functions are pairwise disjoint.

An important assumption made in the generic model is that for a given input stimulus, at most one of the four asynchronous functions is equal to 1. This assumption is valid because none of the outputs are ever driven to 0 and 1 at the same time. Assumption A1 implies that the assertions: all asynchronous inputs to a sequential elements are always logically disjoint. That is, applying the logic AND operation to any pair of asynchronous inputs of the same sequential element would always produce the logic value '0'.

The formulation of a generic sequential model begins with the introduction of the "plus"(+) operator. The "plus" operator is used to represent the value of a variable or a function at an instant that is just after the present time. To understand this new operator, consider some of its properties. Let f be a function of n input variables $(x_1, x_2, \ldots, x_n)$.

P1. If f is a constant valued function, i.e., f is either a tautology or the zero function, then $f^+ = f$ $$f(x_1, x_2, x_3, \ldots, x_n)^+ = f(x_1^+, x_2^+, x_3^+, \ldots, x_n^+) \quad \text{P2}$$

$$\neg f(x_1, x_2, x_3, \ldots, x_n)^+ = (\neg f(x_1, x_2, x_3, \ldots, x_n))^+ \quad \text{P3}$$

Given a variable $x_i$ whose value is known at time t, $x_i^+$ is just another variable that denotes the value of $x_i$ at a time (t+ε), that is just after t. Equation E1, given below, presents a logic function that accurately captures the value of the Q output of a sequential element at a time ε after the present.

$$Q^+ = [<\neg f_{clk} f_{clk}^+ \cdot f_{sync} + <f_{clk} + \neg f_{clk}^+ > \cdot Q > \cdot \neg f_{00} \cdot \neg f_{01}] + f_{10} f_{11} \quad \text{(E1)}$$

The above model is what makes possible the computation of static probabilities and toggle rams of the outputs of sequential elements, because it relates each output's logic function to that of the inputs. In essence, the model transforms a sequential element into a combinational one, which then enables the use of combinational techniques previously described.

2.4.5.2 Task 2: Describing commonly encountered Sequential Elements

Let us try to express a D flip-flop (Table 2) using this formulation. A D flip-flop exhibits the following behavior: Whenever the clock input (CK) rises from 0 to to 1, the output Q is equal to the value at the data pin D. At all other times, the flip-flop stores its "previous" state. The "previous" state of the flip-flop is the value at the Q output of the flip-flop. Q+ can be written as:

$$Q^+ = \neg CK \cdot CK^+ \cdot D + <CK + \neg CK^+ > \cdot Q \quad \text{(E2)}$$

Consider a D-latch (Table 2). Note that a latch does not have any synchronous behavior as per our sequential model. Assuming that the latch has a data pin D and an enable pin G, we can write the equation for a latch in the following manner:

$$Q^+ = Q \cdot \neg G + D \cdot G \quad \text{(E3)}$$

Equation E3 states that the output of a latch is 1 whenever both D and G pins are 1. This depicts the transparent behavior of a latch. Equation E3 also shows that when the enable pin G is 0, the output is the previous state. Note the absence of the clock variables CK, CK+ in E3.

Equation E1 has two parts: a part that depicts the synchronous behavior of the sequential cell and a part that depicts the asynchronous behavior. If either of the asynchronous functions $f_{10}$ or $f_{11}$ is equal to 1, then the value of $Q^+$ must be equal to 1 regardless of any of the other components of the equation. Similarly if either of $f_{01}$ or $f_{00}$ are equal to 1, the value of $Q^+$ must be 0. The synchronous behavior is always expressed in relation to a clock edge. If there is a transition in the clock function ($f_{clk}$) from 0 to 1, the output should follow the value of the synchronous functionality ($f_{sync}$) of the cell. At all other times, $Q^+$ remains in the "previous" state (Q).

In an analogous manner, the QB output of the cell can be written as:

$$QB^+ = [\neg f_{clk} f_{clk}^+ \cdot \neg f_{sync} + <f_{clk}^+ + \neg f_{clk}^+ > \cdot QB > \cdot \neg f_{00} \cdot \neg f_{01}] + f_{01} + f_{11} \quad \text{(E4)}$$

Lemma 1: If $f_{00}=0$ and $f_{11}=0$ then $Q^+ = \neg QB^+$

2.4.5.3 Task 3: Characterizing the Generic Sequential Element

As described in the previous section, the generic sequential element has inputs sync, ck, $f_{00}$, $f_{01}$, $f_{10}$ and $f_{11}$. These inputs are assumed to be Boolean logic functions of primary variables $x_j$.

These primary variables are assumed to have a static probability and a toggle rate. The generic sequential elements also have outputs Q and QB.

For flip-flops, the static probability for Q is given by:

$$Pr(Q) = Pr(sync) Pr(\overline{f_{00} f_{01}} f_{10} f_{11}) + Pr(f_{10} + f_{11})$$

The static probability for QB is given by:

$$Pr(QB) = Pr(\overline{sync}) Pr(\overline{f_{00} f_{01}} f_{10} f_{11}) + Pr(f_{10} + f_{11}).$$

The toggle rate for Q is given by:

$$Tr(Q) = Pr(sync \oplus Q) \left( \frac{Tr(clk)}{2} \right) Pr(\overline{f_{00} f_{01}} f_{10} f_{11}) + \left( \frac{Tr(f_{10}) + Tr(f_{11})}{2} \right)(1 - Pr(Q)) + \left( \frac{Tr(f_{00}) + Tr(f_{01})}{2} \right) Pr((Q))$$

The toggle rate for QB is given by:

$$Tr(QB) = Pr(sync \oplus Q) \left( \frac{T(clk)}{2} \right) Pr(\overline{f_{00} f_{01}} f_{10} f_{11}) + \left( \frac{Tr(f_{01}) + Tr(f_{11})}{2} \right)(1 - Pr(QB)) + \left( \frac{Tr(f_{00}) + Tr(f_{10})}{2} \right) Pr(QB)$$

To compute Pr(sync⊕Q) and Pr(sync⊕QB) ,treat Q and QB as primary inputs with the static probabilities computed above. Note that sync can be a function of Q or QB. If sync is a function of Q or QB, then this sequential cell has a combinational feedback path from the flip-flop's output back to one of its inputs. As described in Section 2.4.2 all such self-loops were identified and flagged in step 5015. That was performed specifically to provide information for this step of computing the static probabilities and toggle rates. If the examined flip-flop was not flagged as a self-loop node, sync can also be treated as a primary input simplifying the computation of the static probability and toggle rate values. However, if the flip-flop was flagged as a self-loop node, sync must be expanded as a function of the primary inputs feeding that level of the SEG.

The equations are different for sequential elements that are latches.

$$Pr(Q) = \frac{Pr(f_{10} + f_{11})}{1 - Pr(\overline{f_{00} f_{01}}) + Pr(\overline{f_{00} f_{01}}(f_{10} + f_{11}))}$$

$$Pr(QB) = \frac{Pr(f_{01} + f_{11})}{1 - Pr(\overline{f_{00} f_{10}}) + Pr(\overline{f_{00} f_{10}}(f_{01} + f_{11}))}$$

The toggle rates are given by:

$$Tr(Q) = \left( \frac{Tr(f_{10} + f_{11})}{2} \right)(1 - Pr(Q)) + \left( \frac{Tr(f_{00} + f_{01})}{2} \right) Pr(Q)$$

-continued $$Tr(QB) = \left(\frac{Tr(f_{01}+f_{11})}{2}\right)(1-Pr(QB)) + \left(\frac{Tr(f_{10}+f_{00})}{2}\right)Pr(QB)$$

2.5 Examples of Transfers Across Sequential Logic Elements

Figure 25:
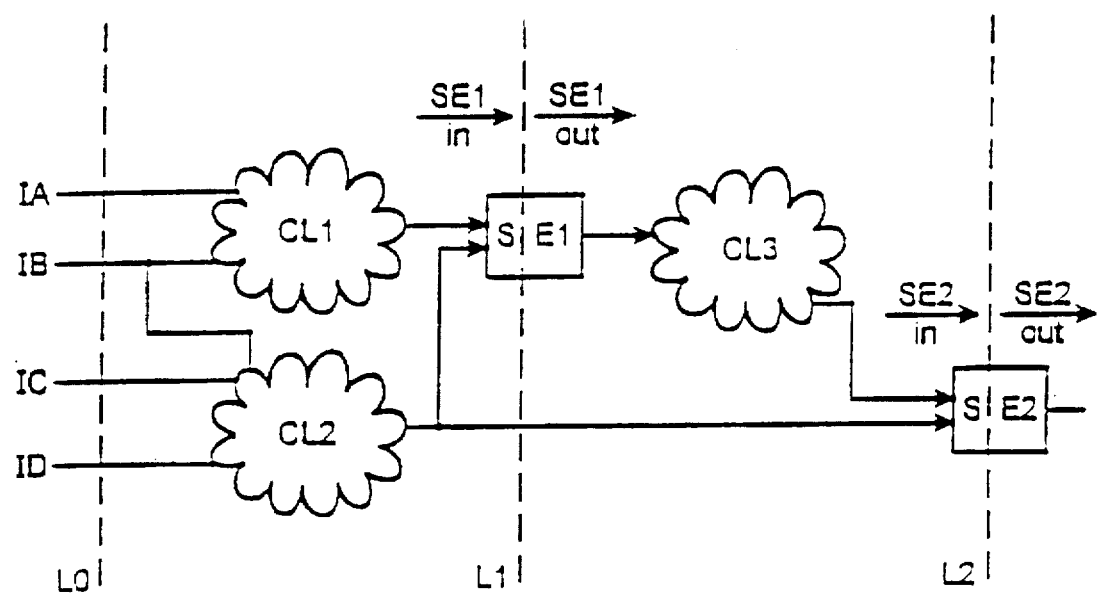
FIG. 25 illustrates a generalized logic diagram illustrating an exemplary electronic circuit and the organization of a corresponding netlist stored in memory that represents the gates and wires of such circuit.

Referring to FIG. 25, there is shown a generalized logic diagram illustrating an exemplary electronic circuit and the organization of a corresponding netlist stored in electronic memory that represents the gates and wires of such circuit. The circuit has primary inputs IA–ID. It has groups of combinational logic, CL1, CL2 and CL3. It includes sequential elements SE1 and SE2. Primary inputs IA, and IB feed CL1. Primary inputs IB, IC and ID feed CL2. CL1 feeds SE1. SE1 feeds CL3. CL2 feeds both SE1 and SE2. CL3 feeds SE2.

The circuit is presumed to correspond to an MSEG (not shown) which has been levelized. The levelization has resulted in a grouping of sequential elements and a grouping of combinational logic into different graph levels. Specifically, the primary inputs IA–ID are grouped in level L0. The group of combinational logic represented by CL1 is grouped in L1 since it feeds SE1, and since there is no other sequential element interposed between CL1 and the primary inputs that feed CL1. The group of combinational logic represented by CL2 is grouped in both L1 and L2 since the group of logic represented by CL2 propagates signals to SE1 and SE2. In general, a group of combinational logic is placed in the same level(s) as the sequential element(s) fed by such group of combinational logic. Thus, although CL2 feeds both SE1 and SE2, SE1 is considered to be part of L1, and SE2 is considered to be part of L2. CL3 is grouped in L2 since it only feeds SE2.

Stated differently, SE1 is a "lower" or "earlier" or "prior" graph level to SE2, and SE2 is at a "higher" or "later" or "subsequent" graph level SE1. Similarly, logic CL3 is at a subsequent graph level to CL1, and CL1 is at a prior graph level to CL2 and CL3. Prior logic levels feed subsequent levels in the logic flow of FIG. 25.

The MSEG (not shown) that corresponds to the circuit of FIG. 25 includes a directed arc(s) that corresponds to the group of logic represented by CL1 Other directed arc(s) corresponds to the group of logic represented by CL2. Yet another directed arc corresponds to the group of logic represented by CL3. The MSEG includes a graph node which corresponds to SE1 and includes another graph node that corresponds to SE2. Of course, if loops have been broken, in the course of producing the MSEG, then a graph node corresponding to SE1 may have been removed and replaced by a split source node and a split load node. Similarly, a graph node corresponding to SE2 may have been removed and replaced by a split source node and a split load node.

Processing of the netlist that represents the circuit involves first identifying arcs in L1 of the MSEG (not shown) and correlating those L1 arcs with the group of combinational logic of the circuit represented by combinational logic CL1 and CL2. Switching activity values are computed for the group of netlist nodes stored in memory that represent CL1 and CL2. The computed switching activity values are provided to the input side of SE1. The values are transferred across SE1 to the output side of SE1 where they become available as primary inputs to the netlist nodes and nets that represent the group of combinational logic CL3.

Once processing of L1 of the graph is complete, then processing of L2 begins. An MSEG arc that corresponds to combinational logic CL3 is used to identify a group of netlist nodes stored in memory that represent the group of combinational logic CL3. Similarly, an are of the MSEG that corresponds to CL2 is used to identify a group of netlist nodes stored in memory that correspond to the group of combinational logic CL2. The processing of the groups of combinational logic CL2 and CL3 results in the provision of primary outputs from L2 which are provided to the input side of SE2. These primary outputs from L2 are transferred across SE2 and serve as a basis for computing the outputs of SE2.

It should be appreciated that there are a number of techniques for computing switching activity values for nets representing combinational logic in a particular level. In a presently preferred implementation of the invention, static probabilities (SPs) and transition rates (TRs) are computed using BDDs. However, alternatively, different switching activity measures and computation techniques may be employed. For example, correlation coefficients or transition probabilities may be calculated instead. Moreover, the computation of switching activity levels may be accomplished using netlist nodes rather than BDDs. Note that nets corresponding to different graph level are processed substantially independently of each other. Although outputs from one level may serve as a basis for inputs to a next level, actual computations of switching activity values progresses on a level-by-level basis.

Techniques in accordance with a current implementation of the invention provide an efficient mechanism for accomplishing a transfer of primary output switching activity values computed for one level of a graph across a node representing a sequential logic element so that those primary output values can serve as a basis for primary inputs for a next level of the graph. For example, in FIG. 25, there is a transfer of values computed for L1 across a sequential element SE1, and there is transfer of values computed for L2 across sequential element SE2. The transfer across SE1 involves input of values to SE1 which, in essence, are the primary outputs of the group of combinational logic CL1. Likewise, CL3 primary output values provided as input to SE2 serve as a basis for values output from SE2.

A transfer across a sequential element such as SE1 or SE2 can be challenging because there are numerous types of sequential elements. For example, see the list of sequential element identified in Tables 2 and 3. While certain sequential elements merely require relatively straight forward transfer of an input value to an output terminal (see D flip flop for example), other sequential elements involve outputs that are complex functions of logical inputs, timing signals and prior logical outputs. The current invention provides mechanisms for transfer of input values across a wide variety of types of simple or complex sequential elements.

Figure 26:
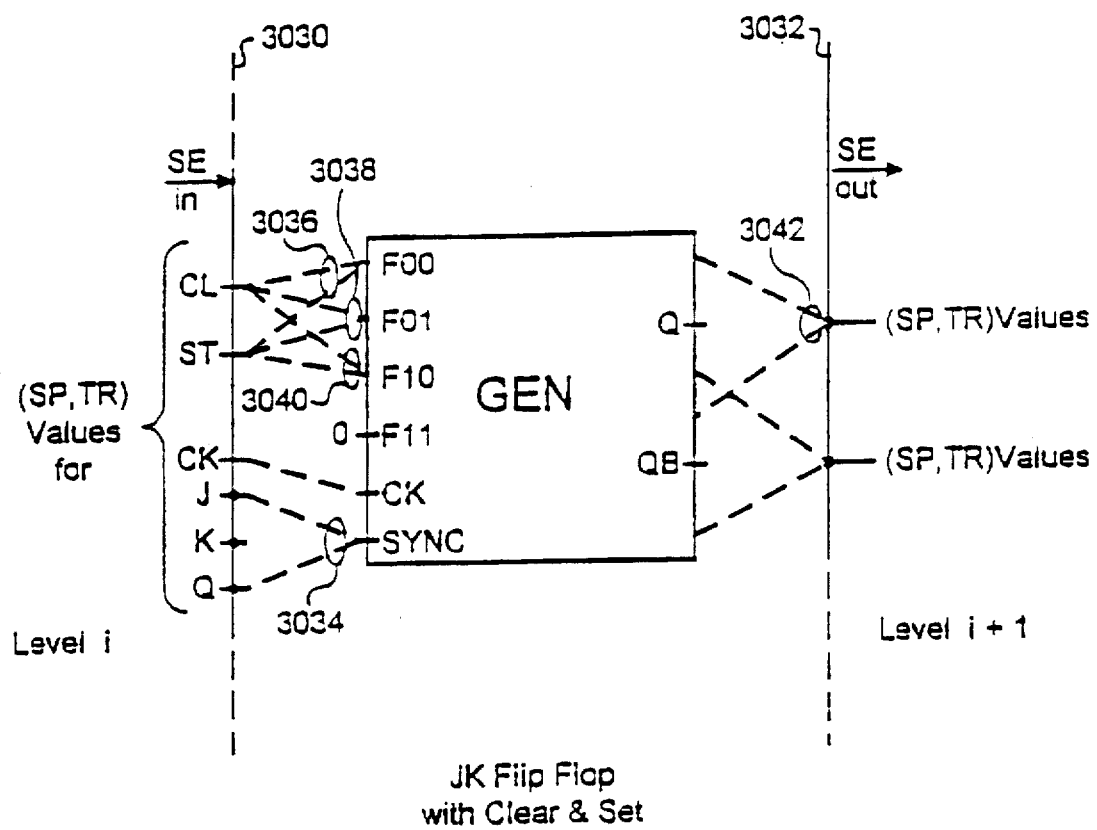
FIG. 26 illustrates a logical representation of a generic sequential cell (GEN) used in accordance with an embodiment of the present invention.

A currently preferred embodiment of the invention employs a generic sequential cell (GEN) which is illustrated in FIG. 26. Table 1 explains the functionality of the various input and output pins of the GEN cell. The generic model provided by the GEN serves as a basis for the transfer of switching activity values across any of numerous types of sequential elements. In FIG. 26, dashed line 3030 represents an input side of a given sequential element (SE) that can be modeled using the GEN cell. Dashed line 3032 represents an output side of the given sequential element (SE).

In the example shown in FIG. 26, the given SE is a JK flip flop with clear and set. This type of sequential element is indicated as entry "13" in Table 2. The GEN driving function identified as $f_{sync}$ is derived for the JK flip flop using the logic equation indicated for entry 13 in the column headed $f_{sync}$. The GEN $f_{clk}$ driving function is provided as the CK input. The respective $f_{00}$, $f_{01}$ and $f_{10}$ driving functions are derived from the corresponding logic functions indicated in entry 13. $f_{11}$ is set to a logic zero. Referring to Table 3, a Q plus output is derived from the logic function indicated at entry 13. The value of QB is derived from its logic function in table 3, entry 13.

In operation, the JK flip flop with clear and set is modeled using the GEN cell. Combinational logic in level i produces switching activity values for CL, ST, CK, J, K, and Q. These values are provided as an SE input. In accordance with the currently preferred techniques of the present invention, BDDs are constructed to represent the logic functions indicated for each of the inputs to the GEN cell. For example, BDDs representative of the logic function of column $f_{sync}$, entry 13 are produced within the logic cone indicated by dashed lines 3034. When the BDD for logic cone 3034 is evaluated, it produces an SP, TR or switching activity value for $f_{sync}$. Similarly, respective BDD logic cones 3036, 3038, and 3040 represent BDDs corresponding to entries under respective columns $f_{00}$, $f_{01}$ and $f_{10}$. The value of $f_{clk}$ is the value provided by the level i logic as the SE input as for CK. The value of $f_{11}$ is fixed at zero.

Referring to Table 3, the value of Q plus is evaluated according to table entry 13. As indicated in FIG. 26, a BDD logic cone represents the logical function indicated by entry 13. When that BDD is evaluated, the switching activity value it provides is the value for Q plus. That value serves as the SE output. The SE output can serve as a primary input to a level i+1 of logic. The QB plus switching activity value is computed in a similar manner.

Thus, the GEN serves as a primitive electronic structure in memory which supports generic forcing functions and is used to compute generic outputs. In order to model a specific sequential element using the primitive electronic structure, a data structure is provided in memory which relates behavioral information about specific sequential elements to be modeled to forcing functions and outputs of the GEN primitive. Tables 2 and 3 provide these behavioral relationships in the present invention. Logic is generated in memory to convert specific sequential element inputs and outputs into generic cell inputs and outputs. In the present embodiment, the generated values are used in accordance with the equations below to compute SPs and TRs.

3.0 Mixing Simulation-based and Probability-based Analysis

The previous sections described the process for computing the static probabilities and the toggle rates for all nets in a design given the static probabilities and toggle rates of the design's primary input ports. The described method also allows the setting of the static probability and toggle rate of internal nets. Those nets are then considered as start-points and are treated like primary input ports. By setting their static probability toggle-rate, the designer indicates that those values should not be changed during the processing.

Setting the static probabilities and toggle rates of select nets allows improved accuracy and shorter run-times. The accuracy improvements come about because there are fewer nets that have estimated static probability and toggle rate values. The run-time improvements are achieved because the sequential processing may not require iteration, or it may require less iteration as a result of the additional start-point nodes.

The ability to support a hybrid analysis technique that combines simulation-based and probability-based techniques enables this additional improvement to the accuracy and efficiency of the power estimation.

User Interface for Power Estimation

The following is description of user interface command which provide access and control of power estimation tool.

Key attributes of the power estimation user interface are as follows:

Allows user to define a clock, which can is referred to either explicitly or implicitly by other commands. The clock is the synchronous signal which typically determines the maximum frequency of the network. This clock signal is referred to in the next section.

Allows report_power to be run with partial or no information for toggle_rate and static probability on input ports of the design. If the user does not provide toggle rate for an input port, then a a default assumption of 0.5 *related_clock is assumed. The related_clock is determined by traversing network from input to a sequential element. The net driving the clock pin is assumed to be the related clock. If there is no sequential element then the highest frequency clock is assumed to be the related_clock. If the user does not provide static_probability, then a value of 0.5 is assumed. This is a key advantage of the user interface in that it allows user to run report_power after only providing information about the design's clock. This reduces the amount of input before a power estimate can be performed. In contrast, the simulation method requires a set of test vectors before power estimation can occur.

The user interface allows for any points in the network to be annotated with toggle rate and static probability. This allows for a power simulation with partially annotated network, in which switching information is provided for a subset of the nodes. Probabilistic propagation of activity will occur to determine the toggle rate and static probability for the remaining (non annotated) signals in the network. This allows the user to extract simulation data from either a higher level simulation (i.e. RTL level) or from selected nets. By extracting from a different level or from selected nets, the user can speed the extraction of simulation information.

Following is command description (manual pages) for the power estimation user interface.

NAME report_power

Calculates and reports dynamic and static power for a design or instance.

SYNTAX int report_power [-net][-cell][-only cell_or_net_list]
[-cumulative][-flat][-exclude_boundary_nets]
[-analysis_effort low|medium|high][-verbose]
[-nworst number][-sort_mode mode]
[-histogram [-exclude_leq le_val|-exclude_geq ge_val]
[-nosplit]
object_list cell_or_net_list
int number
string mode
float le_val
float ge_val

ARGUMENTS

"-net -cell"

Indicates whether power consumption of nets and/or cells is to be reported. By default, neither option is enabled, and only the design's summary power information is reported. The -cell and -net options can be used singly or together.

"-only cell_or_net_list"

Specifies a list of cells and/or nets to be displayed with -net or -cell. With this option, only the cells and/or nets in the cell_or_net_list are listed in the power report. If both the -net and -only options are specified, then the cell_or_net_list should contain at least one net. Similarly, if both the -cell and -only options are specified, then the cell_or_net_list should contain at least one cell. If the -net, -cell, and -only options are specified together, the cell_or_net_list should contain at least one net and one cell.

-cumulative

Indicates that cumulative power is to computed and displayed for every net and/or cell in the power report. The fanin cumulative power of a cell or net is the sum of all power values for cells and nets in the transitive fanin of the start point. Similarly, the fanout cumulative power of a cell or net is the sum of all power values for cells and nets in the transitive fanout of the start point. The cumulative report is displayed after the standard cell or net report. The -cumulative option is valid only if -net and/or -cell are specified. report_power annotates the cumulative power values for the specified cells and/or nets.

-flat

Indicates that the power report should traverse the hierarchy and report objects at all lower-levels (as if the design's hierarchy were flat). The default is to report objects at only the current level of hierarchy. For cell reports, if -flat is not specified, the power reported for a subdesign is the total power estimate for that subdesign, including all of its contents.

-exclude_boundary_nets

Indicates that the power of boundary nets is to be excluded from the power report; the default is to include all nets. At the top level of a design, only the primary input nets qualify as boundary nets. For a lower level block of the design, nets that feed into that block are considered boundary nets. For boundary nets that are also driven by an enclosed cell, the switching power is scaled according to the number of internal (versus external) drivers. This option affects the nets that are chosen to display in the net-specific report as well as the values of the design's switching power. This option does not affect leakage power or internal power values.

"-analysis_effort low|medium|high"

Provides a tradeoff between runtime and accuracy. The default is low. Low effort results in the fastest runtime and the lowest accuracy of power estimates; medium and high efforts result in a longer run that has increasing levels of accuracy. The analysis effort controls the depth of logic that is traversed to detect signal correlation. Variations of runtime and accuracy depend greatly on circuit structure.

-verbose

Indicates that additional detailed information is to be displayed about the power of the cells and/or nets. This option is valid only if -net and/or -cell are specified.

"-nworst number"

Indicates that the report is to be filtered so that it displays only the highest number power objects. This option is valid only if either -net and/or -cell is specified.

"-sort_mode mode"

Determines the sorting mode for report order and -nworst selection. The available sorting modes for the -net or -cell options are listed below.

| -net option | -cell option |
|---|---|
| name | name |
| cumulative_fanout | cumulative_fanout |

-continued

| -net option | -cell option |
|---|---|
| cumulative_fanin | cumulative_fanin |
| net_static_probability | cell_internal_power |
| net_switching_power | cell_leakage_power |
| net_toggle_rate | dynamic_power |
| total_net_load | |

If both the -net and -cell options are specified and a sorting mode is explicitly selected, the selected sorting mode is used for both cell and net reports. Therefore, you must select a sorting mode that applies to both the -net and -cell options.

If the sorting mode is not explicitly set, a default is chosen based on the mode of the report_power command:

| Mode | Implicit Default |
|---|---|
| -net | net_switching_power |
| -cell | cell_internal_power |
| -net -cell | dynamic_power |

"histogram [-exclude_leq le_val|-exclude_geq ge_val]"

Indicates that a histogram-style report is to be displayed showing the number of nets in each power range. _exclude_leq and -exclude_geq can be used to exclude data values less than le_val or greater than ge_val, respectively. Useful for displaying the range and variation of power in the design. This option displays the histogram report only if either -net or -cell is specified.

-nosplit

Most of the design information is listed in fixed-width columns. If the information for a given field exceeds its column's width, the next field begins on a new line, starting in the correct column. This option prevents line-splitting and facilitates writing software to extract information from the report output.

DESCRIPTION

Calculates and reports power for a design. The probabilistic estimation algorithm functions on nets that were not explicitly annotated with switching activity values. During the probabilistic propagation, report_power uses the start point nets' switching activities values, if available, when computing the switching activity values for internal nets. The switching activity values are retained for any nets that were annotated with the set_switching_activity command; that is the values are not overwritten during the probabilistic propagation.

Options allow you to specify cells and/or nets for reporting. The default operation is to display the summary power values for only the current_design. If a current_instance is specified, report_power instead displays the summary power values for that instance. The instance's power is estimated in the context of the higher-level design; that is, using the switching activity and load of the higher-level design.

The -verbose option causes more detailed power information to be displayed. The -flat, -exclude_boundary_nets, -nworst, and -sort_mode options allow filtering of objects that are selected by report_power. The -exclude_boundary_nets option also affects the way that the design's power values are computed by excluding certain nets from the design's totals. The -sort_mode option also affects the formatting of the power reports by modifying the order of nets and/or cells that are displayed by report_power.

The -cumulative and -histogram options cause additional sections to be displayed in the power reports. The cumulative power section contains transitive fanin and fanout values for cells and/or nets in the design. The power histogram classifies the nets or cells into groups of power values, allowing for easier visual analysis of the range of power values and of the distribution of the nets/cells across that range. Suboptions allow pruning of objects in the histogram by excluding values greater than or less than specified values.

If they are not specifically annotated with switching activity information, all input ports and black-box cell outputs are assumed to have a default static probability of 0.5 and a toggle rate of (0.5*fclk), where fclk is the toggle rate of the object's related clock.

Power analysis uses any back-annotated net loads during the power calculation. For nets that do not have back-annotated capacitance, the net load is estimated from the appropriate wireload model. If any cluster information has been annotated on the design (Floorplan Manager), Design-Power uses the improved capacitance estimates from the cluster's wireloads.

When invoked from within dc_shell (Design Compiler), the report_power command first checks out a DesignPower license. If a license is not available, the command terminates with an error message. Otherwise, the command proceeds normally. At the completion of the command, the Design-Power license is released. To prevent the release of the license at the completion of the report_power command, you can set the environment variable power_keep_licens_after_power_commands to false.

The above variable is valid only under dc_shell (Design Compiler). Under dp_shell (standalone DesignPower), the DesignPower license can never be released because it is required to run the executable.

EXAMPLES

The following example shows a report_power summary report. A medium effort analysis is performed to estimate the design's power values.

```
dc_shell> report_power -analysis medium
Information: Updating design information... (UID-85)
Performing probabilistic propagation through design.
*******************************************
Report : power
        -analysis_effort medium
Design : ALARM_BLOCK
Version : v3.2a
Date : Sun Jun 19 15:45:24 1994
*******************************************
Library(s) Used:
        power_libdb (File: /remote/libraries/power_lib.db)
Operating Conditions:
Wire Loading Model Mode: enclosed
```

| Design | Wire Loading Model | Library |
| --- | --- | --- |
| ALARM_BLOCK | 0.5K_TLM | power_lib.db |
| ALARM_STATE_MACHINE | 0.5K_TLM | power_lib.db |
| ALARM_COUNTER | 0.5K_TLM | power_lib.db |
| ALARM_COUNTER_DW10_inc_6_0 | 0.5K_TLM | power_lib.db |

Global Operating Voltage = 4.75

-continued

```
Power-specific unit information:
Voltage Units = 1V
Capacitance Units = 50.029999ff
Time Units = 1ns
Dynamic Power Units = 10uW (derived from V,C,T units)
Leakage Power Units = 1nW
Cell Internal Power = 165.1648 uW (32%)
Net Switching Power = 348.8617 uW (67%)
        ------
Total Dynamic Power = 514.0266 uW (100%)
Cell leakage Power = 76.0000 nW
```

The following example shows a net power report sorted by net_switching_power and filtered to display only the 5 nets with highest switching power. A low effort analysis is performed to estimate the design's power values.

```
dc_shell>report_power -net -flat -nworst 5
Report : power
        -net
        -analysis_effort low
        -nworst5
        -flat
        -sort_mode net_switching_power
Design : ALARM_BLOCK
Version: v3.2a
Date : Sun Jun 19 15:45:26 1994
*******************************************
Library(s) Used:
power_lib.db (File: /remote/libraries/power_lib.db)
Operating Conditions:
Wire Loading Model Mode: enclosed
```

| Design | Wire Loading Model | Library |
| --- | --- | --- |
| ALARM_BLOCK | 0.5K_TLM | power_lib.db |
| ALARM_STATE_MACHINE | 0.5K_TLM | power_lib.db |
| ALARM_COUNTER | 0.5K_TLM | power_lib.db |
| ALARM_COUNTER_DW10_inc_6_0 | 0.5K_TLM | power_lib.db |

```
Global Operating Voltage = 4.75
Power-specific unit information:
Voltage Units = 1V
Capacitance Units = 50.029999ff
Time Units = 1ns
Dynamic Power Units = 10uW (derived from V,C,T units)
Leakage Power Units = 1nW
```

| Net | Total Net Load | Static Prob. | Toggle Rate | Switching Power Attrs |
| --- | --- | --- | --- | --- |
| ACOUNT/CLK | 20.467 | 0.500 | 0.1000 | 115.5149 |
| ACOUNT/n493 | 23.193 | 0.985 | 0.0250 | 32.7255 |
| ASM/n225 | 9.165 | 0.985 | 0.0250 | 12.9314 |
| ACOUNT/HRS_OUT[3] | 6.365 | 0.537 | 0.0303 | 10.8763 |
| ACOUNT/HR_OUT[2] | 5.161 | 0.537 | 0.0303 | 8.8202 |
| Total (5 nets) | | | | 18.0868 uW |

The following example displays a cell report, in which an additional cumulative cell power report is generated. The cells are sorted by cumulative fanout power values, and only the top 5 are reported. A low effort analysis is performed to estimate the design's power values.

```
dc_shell > report_power -cell -flat -cumulative -sort_mode
cumulative_fanout -nworst 5
```

-continued

```
*********************************************
Report : power
      -cell
      -analysis_effort low
      -nworst 5
      -cumulative
      -flat
      -sort_mode cumulative_fanout
Design : ALARM_BLOCK
Version: v3.2a
Date : Sun Jun 19 15:45:28 1994
*********************************************
Library(s) Used:
power_lib.db (File: /root/libraries/power_lib.db)
Operating Conditions:
Wire Loading Model Mode: enclosed
```

| Design | Wire Loading Model | Library |
|---|---|---|
| ALARM_BLOCK | 0.5K_TLM | power_lib.db |
| ALARM_STATE_MACHINE | 0.5K_TLM | power_lib.db |
| ALARM_COUNTER | 0.5K_TLM | power_lib.db |
| ALARM_COUNTER_DW01_inc_6_0 | 0.5K_TLM | power_lib.db |

Global Operating Voltage = 4.75
Power-specific unit information:
Voltage Units = 1V
Capacitance Units = 50.029999ff
Time Units = 1ns
Dynamic Power Units = 10uW (derived from V,C,T units)
Leakage Power Units = 1nW
Attributes
--------
h - Hierarchical cell

| Cell | Driven Net Internal Power | Tot Dynamic Switching Power | Cell Power (% Cell/Tot) | Cell Leakage Power Attrs |
|---|---|---|---|---|
| ACOUNT/MINS_OUT_reg[1] | 3.8997 | 13.2200 | 17.120(22%) | 1.0000 |
| ACOUNT/MINS_OUT_reg[3] | 10.8977 | 2.0806 | 12.978(83%) | 1.0000 |
| ACOUNT/MINS_OUT_reg[0] | 10.8987 | 2.0744 | 12.973(84%) | 1.0000 |
| ACOUNT/MINS_OUT_reg[4] | 10.8974 | 2.0869 | 12.984(83%) | 1.0000 |
| ACOUNT/MINS_OUT_reg[5] | 10.8977 | 2.0770 | 12.975(83%) | 1.0000 |
| Totals (5 cells) | 4.7491uW | 2.1538uW | 6.903uW(68%) | 5.0000nW |

| Cell | Cumulative Transitive Fanin Power | Cumulative Transitive Fanout Power |
|---|---|---|
| ACOUNT/MINS_OUT_reg[1] | 17.11972 | 182.40425 |
| ACOUNT/MINS_OUT_reg[3] | 12.97823 | 173.69908 |
| ACOUNT/MINS_OUT_reg[0] | 12.97306 | 173.68782 |
| ACOUNT/MINS_OUT_reg[4] | 12.98429 | 172.32205 |
| ACOUNT/MINS_OUT_reg[5] | 12.97466 | 172.30254 |

(5 cells)
.EC
"SEE ALSO"
set_switching_activity (2);
power_keep_license_after_power_commands (3).
NAME "set_switching_activity"
Sets (or resets) switching activity information (toggle_rate,
static_probability) for nets, pins or ports of the design.
SYNTAX
int set_switching_activity [-static_probability sp_value]
[-toggle_rate tr_value] [-period period_value | -clock clock_name]
object_list
float sp_value
float tr_value
float period_value
string clock_name
list object-list
ARGUMENTS
-static_probability sp_value Indicates the probability that the signal is in the logic 1 (high) state. sp_value is a floating point number that specifies the percentage of time that the signal is in the logic 1 state. For example, an sp_value of 0.25 indicates that the signal is in the logic 1 state 25% of the time. If this option is not specified, then no value will annotated and report_power will assume a value of 0.5.

-toggle_rate tr_value

Specifies the toggle rate; that is, the number of 0->1 AND 1->0 transitions that the signal makes during a period of time. The period can be specified with the -clock option (in which case the clock's base period will be used) or with the -period option (in case which case period_value will be used as the signal's period). tr_value can be any positive floating point number. If this option is not specified, then the toggle rate will not be annotated and report_power will assume a value of 2*sp(1-sp)*fclk. fclk represents the frequency of the signal's related clock (if one can be determined). If a related clock cannot be determined, the highest-activity clock in the design will be used to scale the toggle_rate of this net.

-period period_value

Specifies the time period in which the toggle rate tr value occurs; usually the simulation time or the clock period. The units of time are that of the technology library (typically ns). If neither -clock nor -period is specified, a period_value of 1 time unit is assumed. -period and -clock are mutually exclusive.

-clock clock_name

Specifies the clock object to which tr_value is related. The provided clock object must have already been created using create_clock. The period of clock_name is divided into the toggle rate tr_value to calculate the internal absolute toggle rate. If neither -clock nor -period is specified, a period_value of 1 time unit is assumed. -period and clock are mutually exclusive.

DESCRIPTION

Sets switching activity information (toggle_rate, static_probability) for nets, pins or ports of the design. report_power uses this information to calculate dynamic power values. The toggle_rate and static_probability should be defined for all inputs of a design in order to achieve accurate results from the report_power dynamic analysis. If the set_switching_activity command is used without any options, then the switching activity attributes for the specified nets will be reset (uninitialized). For details about power reports, refer to the report_power command man page.

EXAMPLES

The following example shows a simulation period of 1320 in which 33 net toggles were recorded. A static probability of 0.015 is set. Note that the internal toggle rate computed is (toggle_rate/clock_period=33/1320=0.025).

```
dc_shell > set_switching_activity -period 1320 -toggle_rate 33
-static_prob 0.015
all_inputs()
```

The following example shows how the same values can be set using the -clock option.

The example assumes that a clock named CLK has been created with a clock period of 20. Note that the internal toggle rate computed is (toggle_rate/clock_period: 0.5/20= 0.025).

```
dc_shell > set_switching_activity -clock CLK -toggle_rate .5
-static_prob 0.015 all_inputs()
```

The following example shows the use of set_switching_activity to set activities on internal nets in the design by referencing a pin. Typically, this is the best way to back-annotate simulation toggle rate information.

```
dc_shell > set_switching-activity -clock CLK -toggle_rate .005
find(pin,"ASM/CURRENT_STATE_reg[0]/QZ")
"SEE ALSO"
create_clock (2),
report_power (2).
```

Sample Input

```
/* Indicates synthesis library which contains cell models */
link_library = power_COM_MAX.db
/* Read in Compiled Gate Level Design Database */
read onehot_gated_compiled.db /* Define Clock Object */
create_clock clk -period 20
set_load 1.03 all_outputs()

/* Reads list of commands which set port toggle Activity */ include port_toggle.scr

/* Report's power using probabilistic propagation */
report_power report_power -net -cumulative -sort_mode net_switching_power -nworst 20
```

-85-

```
     /* Report power by cell with histogram */ report_power cell -cumulative -sort_mode dynamic-power -nworst 20
     -histogram
 5
     /* Report power by cell with -flat (thru hierarchy) */ report_power -cell -flat
10   /*=================================*/
     */Include Simulation Toggles for Some Internal Nets */
     /*=================================*/ include partial_sim_toggle.scr
15
     /* Report power using hybrid mixture of simulation and probabilistic
     propagation */
     report_power -net -nworst 10

20   /*=================================*/
     /*Include Simulation Toggles for Some Internal Nets  */
     /*=================================*/ include sim_toggle.scr
25
     /* Report power using hybrid mixture of simulation annotation only */
     report_power -net -nworst 10 quit
```

-86-

Sample Output

Behavioral Compiler (TM)
DC Professional (TM)
5            DC Expert (TM)
ECL Compiler (TM)
FPGA Compiler (TM)
VHDL Compiler (TM)
HDL Compiler (TM)
10           Library Compiler (TM)
Test Compiler (TM)
Test Compiler Plus (TM)
CTV-Interface
DesignWare Developer (TM)
15           DesignTime (TM)
DesignPower (TM)

Version v3.3a-slot3a -- Feb 27, 1995
Copyright (c) 1988-1995 by Synopsys, Inc.
20           ALL RIGHTS RESERVED This program is proprietary and confidential information of Synopsys, Inc. and may be used and disclosed only as authorized in a license agreement controlling such use and disclosure.

25

Initializing...

/* Indicates synthesis library which contains cell models */
link_library = power_COM_MAX.db

-87-

{"power_COM_MAX.db"}

/* Read in Compiled Gate Level Design Database */

5    read onehot_gated_compiled.db
     Loading db file '/remote/rd24/smeier/design/power/tutorial/onehot_gated_compiled.db Current design is now '/remote/rd24/smeier/design/power/tutorial/
10   onehot_gated_compiled.db:ONEHOT_gated'
     {"ONEHOT_gated"}

/* Define Clock Object */
     create_clock clk -period 20
15   Loading db file '/am/remote/dac1/Power_Demo/lib/power__COM_MAX.db'
     Information: Updating technology library (please save) ... (UIL-34)
     Loading db file '/remote/src/syn/ice/dev/libraries/syn/gtech.db'
     Loading db file '/remote/src/syn/ice/dev/libraries/syn/standard.sldb'
20   Performing create_clock on port 'clk'.
     1
     set_load 1.03 all_outputs()

Performing set_load on port 'count[15]'.
25   Performing set_load on port 'count[14]'.
     Performing set_load on port 'count[13]'.
     Performing set_load on port 'count[12]'.
     Performing set_load on port 'count[11]'.
     Performing set_load on.port 'count[10]'.

-88-

Performing set_load on port 'count[9]'.
Performing set_load on port 'count[8]'.
Performing set_load on port 'count[7]'.
Performing set_load on port 'count[6]'.
Performing set_load on port 'count[5]'.
Performing set_load on port 'count[4]'.
Performing set_load on port 'count[3]'.
Performing set_load on port 'count[2]'.
Performing set_load on port 'count[1]'.
Performing set_load on port 'count[0]'.
1

/* Reads list of commands which set port toggle Activity */
include port_toggle.scr set_switching_activity -period 340 -toggle_rate 1 -static_prob 0.944444 find(port,"reset");
Performing set_switching_activity on port 'reset'.
1 set_switching-activity -period 340 -toggle_rate 1 -static_prob 0.5 find (port,"gate");

Performing set_switching-activity on port 'gate'.
1
set_switching_activity -period 20 -toggle_rate 2 -static_prob 0.5 find (port,"clk");

Performing set_switching-activity on port 'clk'.

-89-

1
1

/* Report's power using probabilistic propagation */
5   report_power
Information: Updating design information... (UID-85)
Performing probabilistic propagation through design.

****************************************************************
10  Report: power
            -analysis_effort low
    Design : ONEHOT_gated
    Version: v3.3a-slot3a
    Date   : Wed Mar 1 20:45:52 1995
15  ****************************************************************

Library(s) Used:

power_COM_MAX.db (File: /am/remote/dac1/Power_Demo/
20  lib/power_COM_MAX.db)

Operating Conditions:
Wire Loading Model Mode: enclosed

25  Design      Wire Loading Model      Library
    -----------------------------------------------
    ONEHOT_gated    0.5K_TLM    power_COM_MAX.db Global Operating Voltage = 4.75

-90-

Power-specific unit information:

Voltage Units = 1V

Capacitance Units = 50.029999ff

Time Units = 1ns

Dynamic Power Units = 10uW (derived from V,C,T units)

Leakage Power Units = 1nW

Cell Internal Power = 300.2616 uW (24%)

Net Switching Power = 955.5177 uW (76%)

---------------------------

Total Dynamic Power = 1.2558 mW (100%)

Cell Leakage Power = 18.0000 nW

1 report_power -net -cumulative -sort_mode net_switching_power -nworst 20

```
****************************************************************
*
```

Report: power

-net

-analysis_effort low

-nworst 20

-cumulative

-sort_mode net_switching_power

Design : ONEHOT_gated

Version: v3.3a-slot3a

Date   : Wed Mar 1 20:45:53 1995

```
****************************************************************
```

-91-

Library(s) Used:

power_COM_MAX.db (File: /am/remote/dac1/Power_Demo/lib/power_COM_MAX.db)

Operating Conditions:
Wire Loading Model Mode: enclosed

Design     Wire Loading Model     Library
-----------------------------------------------------------
ONEHOT_gated    0.5K_TLM    power_COM_MAX.db Global Operating Voltage = 4.75
Power-specific unit information:
    Voltage Units = 1V
    Capacitance Units = 50.029999ff
    Time Units = 1ns
    Dynamic Power Units = 10uW (derived from VC,T units)
    Leakage Power Units = 1nW Attributes
------------------
    a - Switching activity information annotated on net

| Net | Net Loan Prob. | Total Static Rate | Toggle Power | Switching Attrs |
|---|---|---|---|---|
| gated_clock | 21.730 | 0.250 | 0.0515 | 63.1248 |
| clkb | 2.624 | 0.500 | 0.1000 | 14.8124 a |

-92-

|     | Net | | | | |
| --- | --- | --- | --- | --- | --- |
|     | resetb | 32.580 | 0.944 | 0.0029 | 5.4082 a |
|     | count35x1x | 3.908 | 0.101 | 0.0047 | 1.0379 |
|     | count35x2x | 3.908 | 0.095 | 0.0044 | 0.9795 |
|     | count35x3x | 3.908 | 0.090 | 0.0042 | 0.9305 |
| 5   | count35x4x | 3.908 | 0.085 | 0.0040 | 0.8836 |
|     | count35x5x | 3.908 | 0.080 | 0.0038 | 0.8388 |
|     | count35x6x | 3.908 | 0.076 | 0.0036 | 0.7961 |
|     | count35x7x | 3.908 | 0.072 | 0.0034 | 0.7553 |
|     | count35x8x | 3.908 | 0.068 | 0.0032 | 0.7164 |
| 10  | count35x9x | 3.908 | 0.064 | 0.0031 | 0.6793 |
|     | count35x12x | 3.908 | 0.060 | 0.0029 | 0.6441 |
|     | count35x10x | 3.908 | 0.060 | 0.0029 | 0.6440 |
|     | count35x13x | 3.908 | 0.057 | 0.0028 | 0.6105 |
|     | count35x11zx | 3.908 | 0.057 | 0.0028 | 0.6104 |
| 15  | count35x14x | 3.908 | 0.054 | 0.0026 | 0.5785 |
|     | count35x15x | 3.908 | 0.051 | 0.0025 | 0.5481 |
|     | count35x0x | 3.908 | 0.048 | 0.0024 | 0.5192 |
|     | gateb | 2.614 | 0.500 | 0.0029 | 0.4340 a |

20 Totals (20 nets)                                      955.5177 uW

| Net | Cumulative Transitive Fanin Power | Cumulative Transitive Fanout Power |
| --- | --- | --- |
| gated_clock | 79.91534 | 64.66894 |

-93-

|  |  |  |
|---|---|---|
| clkb | 14.81240 | 14.81240 |
| resetb | 5.40824 | 5.40824 |
| count35x1x | 2.84542 | 2.84542 |
| count35x2x | 2.78174 | 2.78174 |
| count35x3x | 2.72829 | 2.72829 |
| count35x4x | 2.67717 | 2.67717 |
| count35x5x | 2.62832 | 2.62832 |
| count35x6x | 2.58167 | 2.58167 |
| count35x7x | 2.53717 | 2.53717 |
| count35x8x | 2.49474 | 2.49474 |
| count35x9x | 2.45430 | 2.45430 |
| count35x12x | 2.41597 | 2.41597 |
| count35x10x | 2.41579 | 2.41579 |
| count35x13x | 2.37930 | 2.37930 |
| count35x11x | 2.37913 | 2.37913 |
| count35x14x | 2.34441 | 2.34441 |
| count35x15x | 2.31124 | 2.31124 |
| count35x0x | 2.27970 | 2.27970 |
| gateb | 0.43400 | 0.43400 |

----------------------------------------------------

(20 nets)

}

/* Report power by cell with histogram */ report_power -cell -cumulative -sort_mode dynamic_power -nworst 20 -histogram

-94-

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

Report: power

-cell

-analysis_effort low

5    -nworst 20

-cumulative

-histogram

-sort_mode dynamic_power

10  Design : ONEHOT_gated

Version: v3.3a-slot3a

Date  : Wed Mar 1 20:45:53 1995

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

15  Library(s) Used:

power_COM_MAX.db (File: /am/remote/dac1/Power_Demo/lib/power_COM_MAX.db)

20  Operating Conditions:

Wire Loading Model Mode: enclosed

| Design | Wire Loading Model | Library |
| --- | --- | --- |

-95-

ONEHOT_gated  0.5K_TLM  power_COM_MAX.db

Global Operating Voltage = 4.75
Power-specific unit information:
   Voltage Units = 1V
   Capacitance Units = 50.029999ff
   Time Units = 1ns
   Dynamic Power Units = 10uW (derived from V,C,T units)
   Leakage Power Units = 1nW Attributes
-------------------
   h - Hierarchical cell
   Cell   Driven Net Tot Dynamic   Cell
   Internal Switching Power    Leakage

| Cell | Power | Power | (% Cell/Tot) | Power | Attrs |
|---|---|---|---|---|---|
| U33 |  | 1.5441 | 63.1248 | 64.669(2%) | 2.0000 |
| COUNT_REGX0X | 1.8075 | 1.0379 | 2.845(64%) | 1.0000 | |
| COUNT_REGX1X | 1.8022 | 0.9795 | 2.782(65%) | 1.0000 | |
| COUNT_REGX2X | 1.7978 | 0.9305 | 2.728(66%) | 1.0000 | |
| COUNT_REGX3X | 1.7935 | 0.8836 | 2.677(67%) | 1.0000 | |
| COUNT_REGX4X | 1.7895 | 0.8388 | 2.628(68%) | 1.0000 | |
| COUNT_REGX5X | 1.7856 | 0.7961 | 2.582(69%) | 1.0000 | |
| COUNT_REGX6X | 1.7819 | 0.7553 | 2.537(70%) | 1.0000 | |
| COUNT_REGX7X | 1.7784 | 0.7164 | 2.495(71%) | 1.0000 | |
| COUNT_REGX8X | 1.7750 | 0.6793 | 2.454(72%) | 1.0000 | |

-96-

```
COUNT_REGX11X  1.7718   0.6441   2.416(73%)  1.0000
COUNT_REGX9X   1.7718   0.6440   2.416(73%)  1.0000
COUNT_REGX12X  1.7688   0.6105   2.379(74%)  1.0000
COUNT_REGX10X  1.7688   0.6104   2.379(74%)  1.0000
COUNT_REGX13X  1.7659   0.5785   2.344(75%)  1.0000
COUNT_REGX14X  1.7631   0.5481   2.311(76%)  1.0000
COUNT_REGX15X  1.7605   0.5192   2.280(77%)  1.0000
-----------------------------------------------------------
Totals (17 cells)   300.262uW   748.971uW   1.049mW(29%)
18.000nW
```

|  | Cumulative Transitive Fanin | Cumulative Transitive Fanout |
|---|---|---|
| Cell | Power | Power |
| U33 | 79.91534 | 64.66894 |
| COUNT_REGX0X | 2.84542 | 2.84542 |
| COUNT_REGX1X | 2.78174 | 2.78174 |
| COUNT_REGX2X | 2.72829 | 2.72829 |
| COUNT_REGX3X | 2.67717 | 2.67717 |
| COUNT_REGX4X | 2.62832 | 2.62832 |
| COUNT_REGX5X | 2.58167 | 2.58167 |
| COUNT_REGX6X | 2.53717 | 2.53717 |
| COUNT_REGX7X | 2.49474 | 2.49474 |
| COUNT_REGX8X | 2.45430 | 2.45430 |
| COUNT_REGX11X | 2.41597 | 2.41597 |
| COUNT_REGX9X | 2.41579 | 2.41579 |
| COUNT_REGX12X | 2.37930 | 2.37930 |

-97-
```
COUNT_REGX10X      2.37913    2.37913
COUNT_REGX13X      2.34441    2.34441
COUNT_REGX14X      2.31124    2.31124
COUNT_REGX15X      2.27970    2.27970
-----------------------------------------------------------
```
(17 cells)
Number of Cells
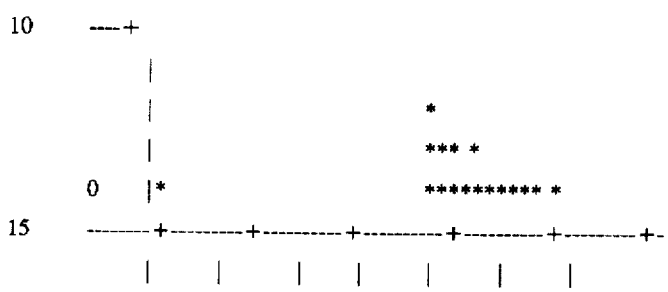
Cell Internal Power (10uW)
(17 Cells)
1
/* Report power by cell with -flat (thru hierarchy)*/
report_power -cell -flat
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*
Report: power
                -cell

-98-

-analysis_effort low
-flat
-sort_mode cell_internal_power

Design : ONEHOT_gated
Version: v3.3a-slot3a
Date : Wed Mar 1 20:45:54 1995
****************************************************************
*

Library(s) Used:

power_COM_MAX.db (File: /am/remote/dac1/Power_Demo/lib/power_COM_MAX.db)

Operating Conditions:
Wire Loading Model Mode: enclosed

Design     Wire Loading Model     Library
-------------------------------------------------
ONEHOT_gated    0.5K_TLM   power_COM_MAX.db Global Operating Voltage = 4.75
Power-specific unit information:
    Voltage Units = 1V
    Capacitance Units = 50.029999ff
    Time Units = 1ns
    Dynamic Power Units = 10uW (derived from V,C,T units)
    Leakage Power Units = 1nW

-99-

Attributes

-------------------- h - Hierarchical cell

| Cell | Cell Internal Power | Driven Net Switching Power | Tot Dynamic Power (% Cell/Tot) | Cell Leakage Power | Attrs |
|---|---|---|---|---|---|
| COUNT_REGX0X | 1.8075 | 1.0379 | 2.845(64%) | 1.0000 | |
| COUNT_REGX1X | 1.8022 | 0.9795 | 2.782(65%) | 1.0000 | |
| COUNT_REGX2X | 1.7978 | 0.9305 | 2.728(66%) | 1.0000 | |
| COUNT_REGX3X | 1.7935 | 0.8836 | 2.677(67%) | 1.0000 | |
| COUNT_REGX4X | 1.7895 | 0.8388 | 2.628(68%) | 1.0000 | |
| COUNT_REGX5X | 1.7856 | 0.7961 | 2.582(69%) | 1.0000 | |
| COUNT_REGX6X | 1.7819 | 0.7553 | 2.537(70%) | 1.0000 | |
| COUNT_REGX7X | 1.7784 | 0.7164 | 2.495(71%) | 1.0000 | |
| COUNT_REGX8X | 1.7750 | 0.6793 | 2.454(72%) | 1.0000 | |
| COUNT_REGX11X | 1.7718 | 0.6441 | 2.416(73%) | 1.0000 | |
| COUNT_REGX9X | 1.7718 | 0.6440 | 2.416(73%) | 1.0000 | |
| COUNT_REGX12X | 1.7688 | 0.6105 | 2.379(74%) | 1.0000 | |
| COUNT_REGX10X | 1.7688 | 0.6104 | 2.379(74%) | 1.0000 | |
| COUNT_REGX13X | 1.7659 | 0.5785 | 2.344(75%) | 1.0000 | |
| COUNT_REGX14X | 1.7631 | 0.5481 | 2.311(76%) | 1.0000 | |
| COUNT_REGX15X | 1.7605 | 0.5192 | 2.280(77%) | 1.0000 | |
| U33 | 1.5441 | 63.1248 | 64.669(2%) | 2.0000 | |

Totals (17 cells)   300.262uW   748.971uW   1.049mW(29%)   18.000nW

1

-100-

```
     /
     *=================================*/
5    /*Include Simulation Toggles for Some Internal Nets  */
     /
     *=================================*/ include partial_sim_toggle.scr
10   set_switching_activity -period 340 -toggle_rate 2
     find(pin,"COUNT_REGX2X/ Q");

Performing set_switching_activity on pin 'COUNT_REGX2X/Q'.
     1
15   set_switching_activity -period 340 -toggle_rate 2
     find(pin,"COUNT_REGX2X/
     QZ");

Performing set_switching_activity on pin 'COUNT_REGX2X/QZ'.
20   1
     set_switching_activity -period 340 -toggle_rate 2 find(pin,"COUNT_
     REGX1X/Q");

Performing set_switching_activity on pin 'COUNT_REGX1X/Q'.
25   1 set_switching_activity -period 340 -toggle_rate 2 find(pin,"COUNT_
     REGX1X/ QZ");
```

-101-

Performing set_switching_activity on pin 'COUNT_REGX1X/QZ'.
1
set_switching_activity -period 340 -toggle_rate 1 find(pin,"COUNT_REGX0X/ Q");

Performing set_switching_activity on pin 'COUNT_REGX0X/Q'.
1 set_switching_activity -period 340 -toggle_rate 1
find(pin,"COUNT_REGX0X/ QZ");

Performing set_switching_activity on pin 'COUNT_REGX0X/QZ'.
1
1

/*Report power using hybrid mixture of simulation and probabilistic propagation */
report_power -net -nworst 10
Information: Updating design information... (UID-85)
Performing probabilistic propagation through design.

****************************************************************

Report: power
          -net
          -analysis_effort low
          -nworst 10
          -sort_mode net_switching_power Design : ONEHOT_gated

-102-

Version: v3.3a-slot3a
Date : Wed Mar 1 20:45:59 1995
****************************************************************

5   Library(s) Used:

power_COM_MAX.db (File: /am/remote/dac1/Power_Demo/
    lib/power_COM_MAX.db)

10  Operating Conditions:
    Wire Loading Model Mode: enclosed

Design      Wire Loading Model      Library
    ---------------------------------------------------
15  ONEHOT_gated    0.5K_TLM    power_COM_MAX.db Global Operating Voltage = 4.75
    Power-specific unit information:
        Voltage Units = 1V
20      Capacitance Units = 50.029999ff
        Time Units = 1ns
        Dynamic Power Units = 10uW (derived from V,C,T units)
        Leakage Power Units = 1nW 25  Attributes
    -------------------
        a - Switching activity information annotated on net

-103-

Total Static Toggle Switching

| Net | Net Loan Prob. | Rate | Power | Attrs |
|---|---|---|---|---|
| gated_clock | 21.730 | 0.250 | 0.0515 | 63.1248 |
| clkb | 2.624 | 0.500 | 0.1000 | 14.8124 a |
| resetb | 32.580 | 0.944 | 0.0029 | 5.4082.a |
| count35x4x | 3.908 | 0.472 | 0.0128 | 2.8336 |
| count35x5x | 3.908 | 0.446 | 0.0127 | 2.8090 |
| count35x6x | 3.908 | 0.421 | 0.0126 | 2.7714 |
| count35x7x | 3.908 | 0.398 | 0.0123 | 2.7231 |
| count35x8x | 3.908 | 0.376 | 0.0121 | 2.6661 |
| count35x9x | 3.908 | 0.355 | 0.0118 | 2.6021 |
| count35x10x | 3.908 | 0.335 | 0.0115 | 2.5325 |

Totals (10 nets)                1.0228mW
1

/
*===============================*/
/*Include Simulation Toggles for Some Internal Nets   */
/
*===============================*/ include partial_sim_toggle.scr
set_switching_activity -period 340 -toggle_rate 2 find(pin, "COUNT_REGX2X/Q");

Performing set_switching_activity on pin 'COUNT_REGX2X/Q'.

-104-

```
1    set_switching_activity -period 340 -toggle_rate 2 find(pin,"COUNT_
     REGX2X/QZ");

5    Performing set_switching_activity on pin 'COUNT_REGX2X/QZ'.
     1
     set_switching_activity -period 340 -toggle_rate 2 find(pin,"COUNT_
     REGX1X/ Q");

10   Performing set_switching_activity on pin 'COUNT_REGX1X/Q'.
     1
     set_switching_activity -period 340 -toggle_rate 2
     find(pin,"COUNT_REGX1X/ QZ");

15   Performing set_switching_activity on pin 'COUNT_REGX1X/QZ'.
     1
     set_switching_activity -period 340 -toggle_rate 1
     find(pin,"COUNT_REGX0X/ Q");

20   Performing set_switching_activity on pin 'COUNT_REGX0X/Q'.
     1
     set_switching_activity -period 340 -toggle_rate 1
     find(pin,"COUNT_REGX0X/ QZ");

25   Performing set_switching_activity on pin 'COUNT_REGX0X/QZ'.
     1
     set_switching_activity -period 340 -toggle_rate 0 find(pin,"COUNT_
     REGX15X/Q");
```

-105-

Performing set_switching_activity on pin 'COUNT_REGX15X/Q'.
1
set_switching_activity -period 340 -toggle_rate 0 find(pin,"COUNT_REGX15X/QZ");

Performing set_switching_activity on pin 'COUNT_REGX15X/QZ'.
1
set_switching_activity -period 340 -toggle_rate 0 find(pin,"COUNT_REGX14X/Q");

Performing set_switching_activity on pin 'COUNT_REGX14X/Q'.
1
set_switching_activity -period 340 -toggle_rate 0 find(pin,"COUNT_REGX14X/QZ");

Performing set_switching_activity on pin 'COUNT_REGX14X/QZ'.
1
set_switching_activity -period 340 -toggle_rate 0 find(pin,"COUNT_REGX13X/Q");

Performing set_switching_activity on pin 'COUNT_REGX13X/Q'.
1
set_switching_activity -period 340 -toggle_rate 0 find(pin,"COUNT_REGX13X/QZ");

Performing set_switching_activity on pin 'COUNT_REGX13X/QZ'.
1
set_switching_activity -period 340 -toggle_rate 0 find(pin,"COUNT_REGX12X/Q");

-106-

Performing set_switching_activity on pin 'COUNT_REGX12X/Q'.

1 set_switching_activity -period 340 -toggle_rate 0 find(pin,"COUNT_REGX12X/QZ");

Performing set_switching_activity on pin 'COUNT_REGX12X/QZ'.

1 set_switching_activity -period 340 -toggle_rate 1 find(pin,"COUNT_REGX11X/Q");

Performing set_switching_activity on pin 'COUNT_REGX11X/Q'.

1 set_switching_activity -period 340 -toggle_rate 0 find(pin,"COUNT_REGX11X/QZ");

Performing set_switching_activity on pin 'COUNT_REGX11X/QZ'.

1 set_switching_activity -period 340 -toggle_rate 0 find(pin,"COUNT_REGX10X/Q");

Performing set_switching_activity on pin 'COUNT_REGX10X/Q'.

1 set_switching_activity -period 340 -toggle_rate 0 find(pin,"COUNT_REGX10X/QZ");

Performing set_switching_activity on pin 'COUNT_REGX10X/QZ'.

1 set_switching_activity -period 340 -toggle_rate 18 find(pin,"U33/Y");

-107-

```
    Performing set_switching_activity on pin 'U33/Y'.
    1
    set_switching_activity -period 340 -toggle_rate 0
    find(pin,"COUNT_REGX9X/ Q");
5

Performing set_switching_activity on pin 'COUNT_REGX9X/Q'.
    1
    set_switching_activity -period 340 -toggle_rate 0
    find(pin,"COUNT_REGX9X/ QZ");
10

Performing set_switching_activity on pin 'COUNT_REGX9X/QZ'.
    1
    set_switching_activity -period 340 -toggle_rate 1
    find(pin,"COUNT_REGX8X/ Q");
15

Performing set_switching_activity on pin 'COUNT_REGX8X/Q'.
    1
    set_switching_activity -period 340 -toggle_rate 1
    find(pin,"COUNT_REGX8X/ QZ");
20

Performing set_switching_activity on pin 'COUNT_REGX8X/QZ'.
    1
    set_switching_activity -period 340 -toggle_rate 2
25  find(pin,"COUNT_REGX7X/ Q");

Performing set_switching_activity on pin 'COUNT_REGX7X/Q'.
    1
```

-108-

```
    set_switching_activity -period 340 -toggle_rate 2
    find(pin,"COUNT_REGX7X/ QZ");

Performing set_switching_activity on pin 'COUNT_REGX7X/QZ'.
5   1
    set_switching_activity -period 340 -toggle_rate 2
    find(pin,"COUNT_REGX6X/ Q");

Performing set_switching_activity on pin 'COUNT_REGX6X/Q'.
10  1
    set_switching_activity -period 340 -toggle_rate 2
    find(pin,"COUNT_REGX6X/ QZ");

Performing set_switching_activity on pin 'COUNT_REGX6X/QZ'.
15  1
    set_switching_activity -period 340 -toggle_rate 2
    find(pin,"COUNT_REGX5X/ Q");

Performing set_switching_activity on pin 'COUNT_REGX5X/Q'.
20  1
    set_switching_activity -period 340 -toggle_rate 2
    find(pin,"COUNT_REGX5X/ QZ");

Performing set_switching_activity on pin 'COUNT_REGX5X/QZ'.
25  1
    set_switching_activity -period 340 -toggle_rate 2
    find(pin,"COUNT_REGX4X/ Q");

Performing set_switching_activity on pin 'COUNT_REGX4X/Q'.
```

-109-

```
 1
        set_switching_activity -period 340 -toggle_rate 2
        find(pin,"COUNT_REGX4X/ QZ");

5      Performing set_switching_activity on pin 'COUNT_REGX4X/QZ'.
        1
        set_switching_activity -period 340 -toggle_rate 1
        find(pin,"COUNT_REGX3X/ Q");

10      Performing set_switching_activity on pin 'COUNT_REGX3X/Q'.
        1
        set_switching_activity -period 340 -toggle_rate 2
        find(pin,"COUNT_REGX3X/ QZ");

15      Performing set_switching_activity on pin 'COUNT_REGX3X/QZ'.
        1
        1

/*Report power using hybrid mixture of simulation annotation only */
20
        report_power -net -nworst 10
        Information: Updating design information... (UID-85)
        Performing probabilistic propagation through design.
        ****************************************************************
25      Report: power
                        -net
                        -analysis_effort low
                        -nworst 10
                        -sort_mode net_switching_power
```

-110-

Design : ONEHOT_gated
Version: v3.3a-slot3a
Date   : Wed Mar 1 20:46:04 1995
***************************************************************

5   Library(s) Used:

power_COM_MAX.db (File: /am/remote/dac1/Power_Demo/
lib/power_COM_MAX.db)

10  Operating Conditions:
    Wire Loading Model Mode: enclosed

Design    Wire Loading Model    Library
    ------------------------------------------------------

15  ONEHOT_gated    0.5K_TLM  power_COM_MAX.db

Global Operating Voltage = 4.75
    Power-specific unit information:
        Voltage Units = 1V
20         Capacitance Units = 50.029999ff
        Time Units = 1ns
        Dynamic Power Units = 10uW (derived from V,C,T units)
        Leakage Power Units = 1nW 25  Attributes
    ------------------
        a - Switching activity information annotated on net Total Static Toggle Switching

-111-

| Net | Net Loan Prob. | Rate | Power | Attrs |
|---|---|---|---|---|
| gated_clock | 21.730 | 0.500 | 0.0529 | 44.0294 a |
| clkb | 2.624 | 0.500 | 0.1000 | 14.8124 a |
| resetb | 32.580 | 0.944 | 0.0029 | 5.4082 a |
| count35x2x | 3.908 | 0.500 | 0.0059 | 1.2974 a |
| count35x3x | 3.908 | 0.500 | 0.0059 | 1.2974 a |
| count35x4x | 3.908 | 0.500 | 0.0059 | 1.2974 a |
| count35x5x | 3.908 | 0.500 | 0.0059 | 1.2974 a |
| count35x6x | 3.908 | 0.500 | 0.0059 | 1.2974 a |
| count35x7x | 3.908 | 0.500 | 0.0059 | 1.2974 a |
| count35x8x | 3.908 | 0.500 | 0.0059 | 1.2974 a |

Totals (10 nets)                                        942.3093 uW

1 quit

1 dc_shell>

Memory usage for this session 9025 Kbytes.

CPU usage for this session 32 seconds.

What is claimed is:

1. In a computer system, a computer implemented improved method for managing the use of electronic memory in the course of estimating average power consumption of an electronic circuit represented as a netlist comprising the computer implemented steps of:
   (a) ranking, in the electronic memory, primary outputs of the netlist with respect to each other in an order that depends upon the number of logic levels between respective primary outputs and respective primary inputs that feed into circuitry which generates said respective primary outputs; and
   (b) performing a depth-first traversal of the netlist, in the electronic memory, that follows the primary output ranking order, wherein said step (b) comprises the steps of:
      (b1) constructing, in the electronic memory, a respective binary decision diagram (BDD) for each respective netlist node that feeds a first primary output of the netlist by constructing a respective BDD for each respective deeper logic level netlist node feeding such first primary output prior to constructing a respective BDD for a respective shallower logic level netlist node feeding such first primary output;
      (b2) computing a respective switching activity value for each respective constructed BDD; and
      (b3) releasing a respective BDD from the electronic memory when a respective BDD has been constructed for every respective fanout of the netlist node with such respective released BDD.

2. The method of claim 1,
wherein the step of constructing produces in the electronic memory at least one respective BDD for a deeper level netlist node that serves as a basis for construction of at least one respective BDD for a shallower logic level netlist node.

3. The method of claim 1,
wherein the step of constructing produces in the electronic memory a first BDD for a deeper level netlist node that both serves as a basis for construction of a second BDD for a second shallower logic level netlist node and also serves as a basis for construction of a third BDD for a third shallower logic level netlist node;
wherein the step of releasing includes releasing the first constructed BDD from the electronic memory when the second BDD and the third BDD have been constructed in the electronic memory.

4. The method of claim 1,
wherein the step of constructing produces in the electronic memory a first BDD for a deeper level netlist node that both serves as a basis for construction of a second BDD for a second shallower logic level netlist node and also serves as a basis for construction of a third BDD for a third shallower logic level netlist node; and further including the steps of:
   storing in the electronic memory a fanout status for the first deeper logic level netlist node; and
   in the course of performing the depth-first traversal,
      adjusting the fanout status when the second BDD and the third BDD are constructed;
wherein the step of releasing includes releasing the first constructed BDD from the electronic memory when the fanout status is adjusted.

5. The method of claim 1,
wherein the step of constructing produces in the electronic memory a first BDD for a deeper logic level netlist node that both serves as a basis for construction of a second BDD for a second shallower logic level netlist node and also serves as a basis for construction of a third BDD for a third shallower logic level netlist node; and further including the step of:
   storing in the electronic memory a fanout count for the first deeper logic level netlist node; and
   in the course of performing the depth-first traversal,
      decrementing the fanout count when the second BDD is constructed; and
      decrementing the fanout count when the third BDD is constructed;
wherein the step of releasing includes releasing the first constructed BDD from the electronic memory when the fanout count has been twice decremented.

6. The method of claim 1,
wherein the step of constructing produces in the electronic memory a first BDD for a deeper logic level netlist node that both serves as a basis for construction of n BDDs for n shallower logic level netlist nodes; and further including the steps of:
   storing in the electronic memory a fanout count for the first deeper logic level netlist node; and
   in the course of performing the depth-first traversal,
      decrementing the fanout count each time one of the n BDDs is constructed;
wherein the step of releasing includes releasing the first BDD from the electronic memory when the fanout count has been decremented n times.

7. The method of claim 1 including the steps of:
   in the course of performing the depth-first traversal,
      constructing in the electronic memory a respective BDD for each respective netlist node that feeds a second primary output of the netlist by constructing a respective BDD for each deeper logic level netlist node feeding such second primary output prior to constructing a respective BDD for a shallower logic level netlist node feeding such second primary output.

8. The method of claim 1 including the steps of:
   in the course of performing the depth-first traversal,
      constructing in the electronic memory a respective BDD for each respective netlist node that feeds a second primary output of the netlist by constructing a respective BDD for each deeper logic level netlist node feeding such second primary output prior to constructing a respective BDD for a shallower logic level netlist node feeding such second primary output, wherein a respective BDD constructed for a deeper logic level netlist node that feeds the second primary output may serve as a basis for construction of a respective BDD for a shallower logic level netlist node that feeds the second primary output.

9. The method of claim 1 including the steps of:
   in the course of performing the depth-first traversal,
      constructing in the electronic memory a respective BDD for each respective netlist node that feeds a second primary output of the netlist by constructing a respective BDD for each deeper logic level netlist node feeding such second primary output prior to constructing a respective BDD for a shallower logic level netlist node feeding such second primary output; and
      constructing in the electronic memory a respective BDD for each respective netlist node that feeds a third primary output of the netlist by constructing a respective BDD for each deeper logic level netlist node feeding such third primary output prior to constructing a respective BDD for a shallower logic level netlist node feeding such third primary output.

10. The method of claim 1 including the steps of:

in the course of performing the depth-first traversal, constructing in the electronic memory a respective BDD for each respective netlist node that feeds a second primary output of the netlist by constructing a respective BDD for each deeper logic level netlist node feeding such second primary output prior to constructing a respective BDD for a shallower logic level netlist node feeding such second primary output, wherein a respective BDD constructed for a deeper logic level netlist node that feeds the second primary output may serve as a basis for construction of a respective BDD for a shallower logic level netlist node that feeds the second primary output; and constructing in the electronic memory a respective BDD for each respective netlist node that feeds a third primary output of the netlist by constructing a respective BDD for each deeper logic level netlist node feeding such third primary output prior to constructing a respective BDD for a shallower logic level netlist node feeding such third primary output, wherein a respective BDD constructed for a deeper logic level netlist node that feeds the third primary output may serve as a basis for construction of a respective BDD for a shallower logic level netlist node that feeds the third primary output.

11. The method of claim 1 including the step of:

constructing in the electronic memory a respective BDD for each respective netlist node that feeds a second primary output of the netlist by constructing a respective BDD for each deeper logic level netlist node feeding such second primary output prior to constructing a respective BDD for a shallower logic level netlist node feeding such second primary output;

wherein the steps of constructing produce in the electronic memory a first constructed BDD for a deeper level netlist node that both feeds the first primary input and that also feeds the second primary input and that both serves as a basis for a shallower logic level netlist node that feeds the first primary input and also serves as a basis for a shallower logic level netlist node that feeds the second primary input.

12. The method of claim 1 including the step of:

constructing in the electronic memory a respective BDD for each respective netlist node that feeds a second primary output of the netlist by constructing a respective BDD for each deeper logic level netlist node feeding such second primary output prior to constructing a respective BDD for a shallower logic level netlist node feeding such second primary output;

wherein the steps of constructing produce in the electronic memory a first BDD for a deeper level netlist node that both feeds the first primary input and that also feeds the second primary input and that both serves as a basis for construction of a second BDD for a shallower logic level netlist node that feeds the first primary input and also serves as a basis for construction of a third BDD for a shallower logic level netlist node that feeds the second primary input; and wherein the step of releasing includes releasing the first constructed BDD from the electronic memory when both the second BDD and the third BDD have been constructed in the electronic memory.

13. The method of claim 1 wherein the step of computing involves computing a respective static probability and a respective toggle rate for each respective constructed BDD.

14. In a computer system, a computer implemented improved method for managing the use of computer readable memory in the course of estimating average power consumption of an electronic circuit represented as a netlist comprising the computer implemented steps of:

(a) ranking, in the computer readable memory, primary outputs of the netlist with respect to each other in an order that depends upon the number of logic levels between respective primary outputs and respective primary inputs that feed into such respective primary outputs; and (b) performing a depth-first traversal of the netlist, in the computer readable memory, that follows the primary output ranking order, wherein said step (b) comprises the steps of:

(b1) constructing, in the computer readable memory, a respective binary decision diagram (BDD) for each respective netlist node that feeds a first primary output of the netlist by constructing a respective BDD for each respective deeper logic level netlist node feeding such first primary output prior to constructing a respective BDD for a respective shallower logic level netlist node feeding such first primary output;

(b2) releasing each respective deeper logic level BDD from the computer readable memory for which a respective shallow logic level BDD has been constructed for each respective fanout of a respective netlist node associated with such respective released BDD;

(b3) storing in the computer readable memory identification of the respective frontier BDD which are nonreleased BDDs produced in the computer readable memory;

(b4) determining when the amount of computer readable memory used exceeds a defined limit; and (b5) releasing from the computer readable memory a first frontier BDD when the amount of computer readable memory used exceeds the defined limit.

15. The method of claim 14 wherein said step (b) comprises the further step of:

substituting a first pseudo-primary input for the first frontier BDD released from the computer readable memory.

16. The method of claim 14 wherein said step (b) comprises the further step of:

computing a respective switching activity value for each respective constructed BDD.

17. The method of claim 14 wherein said step (b) comprises the further step of:

computing a respective toggle rate and a respective static probability for each respective constructed BDD.

18. The method of claim 14 wherein the step of (b4) determining when the amount of computer readable memory used exceeds a defined limit involves determining when the amount of computer readable memory occupied by BDDs exceeds the defined limit.

19. A computer readable memory containing instructions that when executed causing a computer system to implement a method for managing the use of computer readable memory in the course of estimating average power consumption of an electronic circuit represented as a netlist, said instructions comprising:

(a) first code for ranking, in the computer readable memory, primary outputs of the netlist with respect to each other in an order based on the number of logic levels between respective primary outputs and respective primary inputs that feed into circuitry which generates said respective primary outputs; and (b) second code for performing a depth-first traversal of the netlist, in the computer readable memory, that follows the primary output ranking order, wherein said second code comprises:

(b1) third code for constructing, in the computer readable memory, a respective binary decision diagram (BDD) for each respective netlist node that feeds a first primary output of the netlist by constructing a respective BDD for each respective deeper logic level netlist node feeding such first primary output prior to constructing a respective BDD for a respective shallower logic level netlist node feeding such first primary output;

(b2) fourth code for computing a respective switching activity value for each respective constructed BDD; and (b3) fifth code for releasing a respective BDD from the computer readable memory when a respective BDD has been constructed for every respective fanout of the netlist node with such respective released BDD.

20. The computer readable memory of claim 19 wherein said second code comprises code for substituting a first pseudo-primary input for said first frontier BDD released from said computer readable memory.

21. The computer readable memory of claim 19 wherein said second code comprises code for computing a respective switching activity value for each respective constructed BDD.

22. The computer readable memory of claim 19 wherein said second code comprises code for computing a respective toggle rate and a respective static probability for each respective constructed BDD.

23. A computer readable memory containing instructions that when executed causing a computer system to implement a method for managing the use of said computer readable memory in the course of estimating average power consumption of a computer readable circuit represented as a netlist, said instructions comprising:

(a) first code for ranking, in the computer readable memory, primary outputs of the netlist with respect to each other in an order based on the number of logic levels between respective primary outputs and respective primary inputs that feed into circuitry which generates said respective primary outputs; and (b) second code for performing a depth-first traversal of the netlist, in the computer readable memory, that follows the primary output ranking order, wherein said second code comprises:

(b1) third code for constructing, in the computer readable memory, a respective binary decision diagram (BDD) for each respective netlist node that feeds a first primary output of the netlist by constructing a respective BDD for each respective deeper logic level netlist node feeding such first primary output prior to constructing a respective BDD for a respective shallower logic level netlist node feeding such first primary output;

(b2) fourth code for computing a respective switching activity value for each respective constructed BDD; and (b3) fifth code for releasing a respective BDD from the computer readable memory when a respective BDD has been constructed for every respective fanout of the netlist node with such respective released BDD.

24. A computer readable memory as described in claim 23 wherein said second code comprises code for computing a respective static probability and a respective toggle rate for each respective constructed BDD.

25. In a computer system, a method for managing the use of a computer readable memory in the course of estimating average power consumption of an computer readable circuit represented as a netlist comprising the computer implemented steps of:

(a) ranking, in the computer readable memory, primary outputs of the netlist with respect to each other in an order based on the number of logic levels between respective primary outputs and respective primary inputs that feed into circuitry which generates said respective primary outputs; and (b) performing a depth-first traversal of the netlist, in the computer readable memory, that follows the primary output ranking order, wherein said step (b) comprises the steps of:

(b1) constructing, in the computer readable memory, a respective binary decision diagram (BDD) for each respective netlist node that feeds a first primary output of the netlist by constructing a respective BDD for each respective deeper logic level netlist node feeding such first primary output prior to constructing a respective BDD for a respective shallower logic level netlist node feeding such first primary output;

(b2) computing a respective switching activity value for each respective constructed BDD, wherein said step of computing involves computing a respective static probability and a respective toggle rate for each respective BDD and wherein further said step (b2) of computing a respective static probability comprises the steps of:

(i) grouping all Boolean difference of each BDD; and
(ii) computing all static probabilities simultaneously; and (b3) releasing a respective BDD from the computer readable memory when a respective BDD has been constructed for every respective fanout of the netlist node with such respective released BDD.

* * * * *